(12) United States Patent
Yeo et al.

(10) Patent No.: US 11,757,687 B2
(45) Date of Patent: Sep. 12, 2023

(54) METHOD AND APPARATUS FOR TRANSMITTING AND RECEIVING REFERENCE SIGNAL FOR SIDELINK DATA IN WIRELESS COMMUNICATION SYSTEM

(71) Applicant: Samsung Electronics Co., Ltd., Suwon-si (KR)

(72) Inventors: Jeongho Yeo, Suwon-si (KR); Cheolkyu Shin, Suwon-si (KR); Hyunseok Ryu, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/717,553

(22) Filed: Apr. 11, 2022

(65) Prior Publication Data
US 2022/0247609 A1    Aug. 4, 2022

Related U.S. Application Data

(63) Continuation of application No. 16/953,744, filed on Nov. 20, 2020, now Pat. No. 11,303,491.
(Continued)

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0051* (2013.01); *H04W 4/40* (2018.02); *H04W 72/02* (2013.01); *H04W 72/20* (2023.01)

(58) Field of Classification Search
CPC ... H04L 1/0057; H04L 1/0061; H04L 1/1812; H04L 27/2613; H04L 5/0007;
(Continued)

(56) References Cited

U.S. PATENT DOCUMENTS 11,303,491 B2 *  4/2022  Yeo ................. H04L 5/0053
2019/0342049 A1  11/2019 Baghel et al.
(Continued)

FOREIGN PATENT DOCUMENTS

KR     10-2019-0123787 A   11/2019
WO        2018/175842 A1   9/2018

OTHER PUBLICATIONS

Interdigital, Inc., Physical Layer Structure for NR V2X Sidelink, R1-1913274, 3GPP TSG RAN WG1 #99, Reno, U.S.A, Nov. 19, 2019.
(Continued)

*Primary Examiner* — Melvin C Marcelo
*Assistant Examiner* — Natali Pascual Peguero
(74) *Attorney, Agent, or Firm* — Jefferson IP Law, LLP

(57) ABSTRACT

The disclosure relates to a communication technique and a system for fusing a 5th generation (5G) communication system with Internet of Things (IoT) technology to support a higher data rate after a 4G system. The disclosure can be applied to intelligent services (e.g., a smart home, a smart building, a smart city, a smart car or a connected car, healthcare, digital education, retail, security- and safety-related services, or the like), based on 5G communication technology and IoT-related technology. The disclosure provides a method and an apparatus for assigning frequency and time resources for data transmission in a wireless communication system.

21 Claims, 45 Drawing Sheets

Related U.S. Application Data

(60) Provisional application No. 62/938,255, filed on Nov. 20, 2019, provisional application No. 62/938,898, filed on Nov. 21, 2019.

(51) Int. Cl.
*H04W 4/40* (2018.01)
*H04W 72/02* (2009.01)
*H04W 72/04* (2023.01)
*H04W 72/20* (2023.01)

(58) Field of Classification Search
CPC ... H04L 5/0048; H04L 5/0051; H04L 5/0053; H04L 5/0094; H04W 4/40; H04W 72/02; H04W 72/0446; H04W 72/1263; H04W 72/20; H04W 72/21; H04W 72/23; H04W 92/18
See application file for complete search history.

(56) References Cited

U.S. PATENT DOCUMENTS

2020/0053675 A1 2/2020 Khoryaev et al.
2020/0100230 A1 3/2020 Lee et al.

OTHER PUBLICATIONS

CATT, Physical layer structure for NR sidelink, R1-1908579, 3GPP TSG RAN WG1 Meeting #98, Prague, CZ, Aug. 17, 2019.
International Search Report dated Feb. 23, 2021, issued in International Application No. PCT/KR2020/016524.
LG Electronics, Discussion on physical layer structure for NR sidelink, R1-1911346, 3GPP TSG RAN WG1 #98bis, Chongqing, China, Oct. 22, 2019, XP051798626.
CATT, Physical layer structure for NR sidelink, R1-1912153, 3GPP TSG RAN WG1 Meeting #99, Reno, USA, Nov. 9, 2019, XP051823234.
European Search Report dated Dec. 23, 2021, issued in European Application No. 20890991.1.

\* cited by examiner

In case of assigning one resource

METHOD AND APPARATUS FOR TRANSMITTING AND RECEIVING REFERENCE SIGNAL FOR SIDELINK DATA IN WIRELESS COMMUNICATION SYSTEM

CROSS-REFERENCE TO RELATED APPLICATION(S)

This application is a continuation application of prior application Ser. No. 16/953,744, filed on Nov. 20, 2020, which will be issued as U.S. Pat. No. 11,303,491 on Apr. 12, 2022, which is based on and claimed priority under 35 U.S.C. § 119(e) of a U.S. Provisional application Ser. No. 62/938,255, filed on Nov. 20, 2019, in the U.S. Patent and Trademark Office, and of a U.S. Provisional application Ser. No. 62/938,898, filed on Nov. 21, 2019, in the U.S. Patent and Trademark Office, the disclosure of each of which is incorporated by reference herein in its entirety.

BACKGROUND

1. Field

The disclosure relates to a wireless mobile communication system. More particularly, the disclosure relates to a method and an apparatus for finding a frequency-time resource to be transmitted and transmitting a frequency-time resource through which data is transmitted to a receiving terminal, that is, resource allocation, in a process in which a vehicle terminal supporting vehicle communication (vehicle-to-everything, hereinafter referred to as "V2X") transmits and receives data information in communication between terminals, such as sidelinks with other vehicle terminals and pedestrian mobile terminals.

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a "Beyond 4G Network" or a "Post LTE System". The 5G communication system defined by 3GPP is called a "New Radio (NR) system".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed in 5G communication systems and applied to the NR system.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "detection technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In line with development of communication systems, vehicle-to-everything (V2X) systems have been variously developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wireless communication system and, more particularly, to a method and an apparatus for selecting a transmission resource in a process in which a vehicle terminal supporting vehicle-to-everything (V2X) exchanges information with another vehicle terminal and a pedestrian mobile terminal by using a sidelink. Specifically, the disclosure relates to a reference for selecting resources in connection with a case in which a terminal directly assigns a sidelink transmission resource through detection, and operations of a base station and a terminal regarding the same. In addition, the disclosure provides a method and an apparatus for transmitting and receiving a physical sidelink shared channel demodulation reference signal (DMRS) for sidelink data transmission/reception.

Additional aspects will be set forth in part in the description which follows and, in part, will be apparent from the description, or may be learned by practice of the presented embodiments.

In accordance with an aspect of the disclosure a method by a first terminal for solving the above-mentioned problems is provided. The method by first terminal includes the steps of identifying the number of symbols for physical sidelink shared channel (PSSCH) transmission and the number of symbols for PSSCH DMRS, transmitting, to a second terminal, sidelink control information (SCI) for scheduling the PSSCH transmission, the SCI including DMRS pattern information identified based on the number of symbols for the PSSCH DMRS, and transmitting, to the second terminal, the PSSCH DMRS at a position identified based on the SCI. A symbol index of the position at which the PSSCH DMRS is transmitted is identified by one of a plurality of index groups included in a first index group for the number of symbols of the PSSCH DMRS being 2, a second index group for the number of symbols of the PSSCH DMRS being 3, and a third index group for the number of symbols of the PSSCH DMRS being 4. The first index group includes {1, 5}, {3, 8}, {3, 10}, {4, 8}, and {4, 10}, the second index group includes {1, 4, 7}, {1, 5, 9}, and {1, 6, 11}, and the third index group includes {1, 4, 7, 10}.

In accordance with another aspect of the disclosure a method by a second terminal for solving the above-mentioned problems is provided. The method by second terminal includes the steps of receiving, from a first terminal, SCI for scheduling PSSCH transmission, the SCI including DMRS pattern information identified based on the number of symbols for the PSSCH DMRS, identifying the number of symbols for the PSSCH transmission and the number of symbols for the PSSCH DMRS, based on the SCI, and receiving, from the first terminal, the PSSCH DMRS at a position identified based on the SCI. A symbol index of the position at which the PSSCH DMRS is received is identified by one of a plurality of index groups included in a first index group for the number of symbols of the PSSCH DMRS being 2, a second index group for the number of symbols of the PSSCH DMRS being 3, and a third index for when the number of symbols of the PSSCH DMRS being 4. The first index group includes {1, 5}, {3, 8}, {3, 10}, {4, 8}, and {4, 10}, the second index group includes {1, 4, 7}, {1, 5, 9}, and {1, 6, 11}, and the third index group includes {1, 4, 7, 10}.

In accordance with another aspect of the disclosure a first terminal for solving the above-mentioned problems is provided. The first terminal includes a transceiver configured to transmit and receive a signal, and at least one processor coupled to the transceiver. The at least one processor is configured to identify the number of symbols for PSSCH transmission and the number of symbols for PSSCH DMRS, transmit, to a second terminal, SCI for scheduling the PSSCH transmission, the SCI including DMRS pattern information identified based on the number of symbols for the PSSCH DMRS, and transmit, to the second terminal, the PSSCH DMRS at a position identified based on the SCI. A symbol index of the position at which the PSSCH DMRS is transmitted is identified by one of a plurality of index groups included in a first index group for the number of symbols of the PSSCH DMRS being 2, a second index group for the number of symbols of the PSSCH DMRS being 3, and a third index group for the number of symbols of the PSSCH DMRS being 4. The first index group includes {1, 5}, {3, 8}, {3, 10}, {4, 8}, and {4, 10}, the second index group includes {1, 4, 7}, {1, 5, 9}, and {1, 6, 11}, and the third index group includes {1, 4, 7, 10}.

In accordance with another aspect of the disclosure second terminal for solving the above-mentioned problems is provided. The second terminal includes a transceiver configured to transmit and receive a signal, and at least one processor coupled to the transceiver. The at least one processor is configured to receive, from a first terminal, SCI for scheduling PSSCH transmission, the SCI including DMRS pattern information identified based on the number of symbols for the PSSCH DMRS, identify the number of symbols for the PSSCH transmission and the number of symbols for the PSSCH DMRS, based on the SCI, and receive, from the first terminal, the PSSCH DMRS at a position identified based on the SCI. A symbol index of the position at which the PSSCH DMRS is received is identified by one of a plurality of index groups included in a first index group for the number of symbols of the PSSCH DMRS being 2, a second index group for the number of symbols of the PSSCH DMRS being 3, and a third index group for the number of symbols of the PSSCH DMRS being 4. The first index group includes {1, 5}, {3, 8}, {3, 10}, {4, 8}, and {4, 10}, the second index group includes {1, 4, 7}, {1, 5, 9}, and {1, 6, 11}, and the third index group includes {1, 4, 7, 10}.

The disclosure proposes a method for detection and resource allocation while minimizing power consumed by a terminal during sidelink communication, and the method may be effectively used to optimize power consumption by the terminal. In addition, according to an embodiment of the disclosure, it becomes possible to efficiently transmit/receive a DRMS for sidelink data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
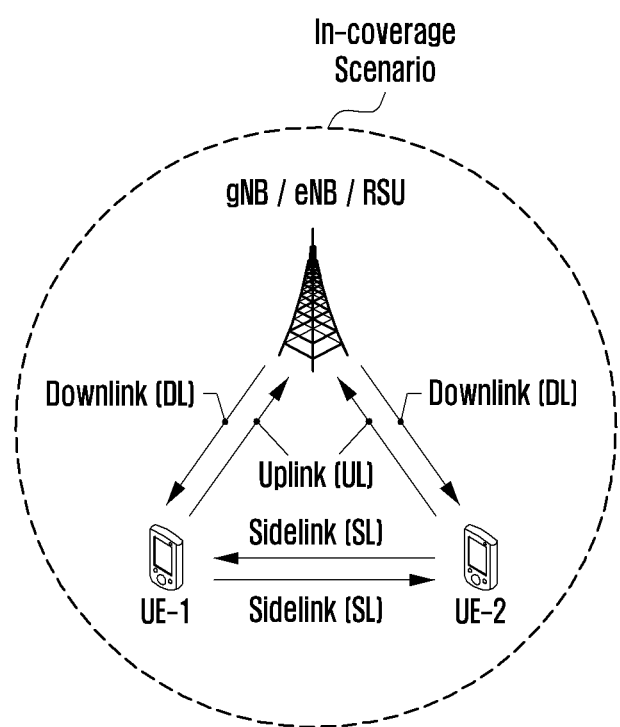
FIG. 1A is a view illustrating a system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

The following detailed description of embodiments of the disclosure is directed to New RAN (NR) as a radio access network and packet core as a core network (5th generation (5G) system, 5G Core Network, or new generation core (NG Core)) which are specified in the 5G mobile communication standards defined by the 3rd generation partnership project long term evolution (3GPP LTE) that is a mobile communication standardization group, but based on determinations by those skilled in the art, the main idea of the disclosure may be applied to other communication systems having similar backgrounds or channel types through some modifications without significantly departing from the scope of the disclosure.

In a 5G system, in order to support network automation, a network data collection and analysis function (NWDAF), which is a network function that provides a function of analyzing and providing data collected from a 5G network, may be defined. The NWDAF can collect/storage/analyze information from the 5G network to provide the result to an unspecified network function (NF), and the analysis result can be used independently in each NF.

In the following description, the disclosure will be described using terms and names defined in the 3GPP standards (5G, NR, LTE, or other similar system standards) for the convenience of description. However, the disclosure is not limited by these terms and names, and may be applied in the same way to systems that conform other standards.

Further, in the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

Unlike the LTE system, the 5G communication system resources various subcarrier spacings, such as 30 kHz, 60 kHz, and 120 kHz, including 15 kHz, the physical control channel uses polar coding, and the physical data channel uses low density parity check (LDPC). In addition, as a waveform for uplink transmission, not only DFT-S-OFDM but also CP-OFDM are used. In LTE, while hybrid ARQ (HARQ) retransmission in units of transport block (TB) is resourced, in 5G, it is possible to additionally resource HARQ retransmission based on a code block group (CBG) in which several code blocks (CBs) are grouped.

As described above, various services can be provided to users in the 5G communication system, and in order to provide such various services to users, a method and an apparatus using the same are required to provide each service according to characteristics within the same time period. Various services provided in 5G communication systems are being studied, and one of them is a service that satisfies the requirements for low latency and high reliability.

In the case of vehicle communication, the NR vehicle-to-everything (V2X) system supports unicast communication, groupcast (or multicast) communication, and broadcast communication between terminals. In addition, unlike LTE V2X system, which aims to transmit and receive basic safety information necessary for vehicle driving on the road, the NR V2X system aims to provide more advanced services, such as group driving (platooning), advanced driving, extended sensor, and remote driving. In addition, the NR V2X system supports a method in which the terminal directly detects and allocates sidelink transmission resources based on both periodic and aperiodic traffic. However, especially in the case of a pedestrian mobile terminal, a method and procedure for selecting a transmission resource by minimizing power consumption of the terminal may be required. Therefore, the operations of a terminal and a base station for solving this problem should be defined. However, there is no discussion about this. Accordingly, the disclosure proposes a sensing and resource assignment method that optimizes power consumption of a terminal in a sidelink. In addition, the disclosure also proposes a DMRS transmission/reception method for such sidelink data.

Embodiments have been proposed to support the above-described scenario, and in particular, a purpose of the disclosure is to provide a method and an apparatus for minimizing power consumption of a terminal during sensing and resource selection processes by a terminal in a sidelink.

Figure 1B:
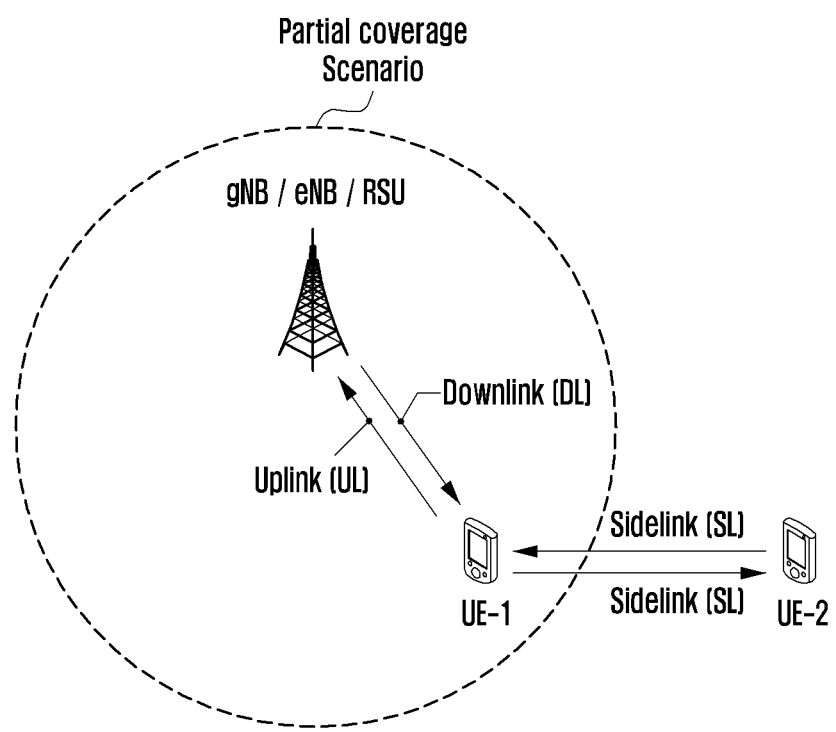
FIG. 1B is a view illustrating a system according to an embodiment of the disclosure.
Figure 1C:
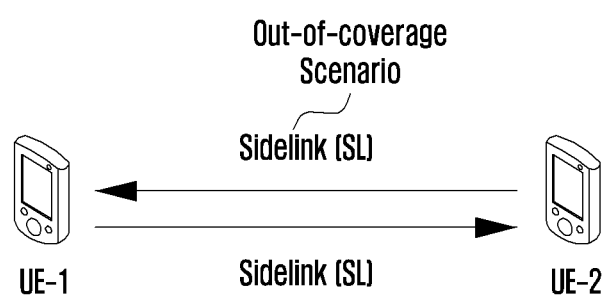
FIG. 1C is a view illustrating a system according to an embodiment of the disclosure.
Figure 1D:
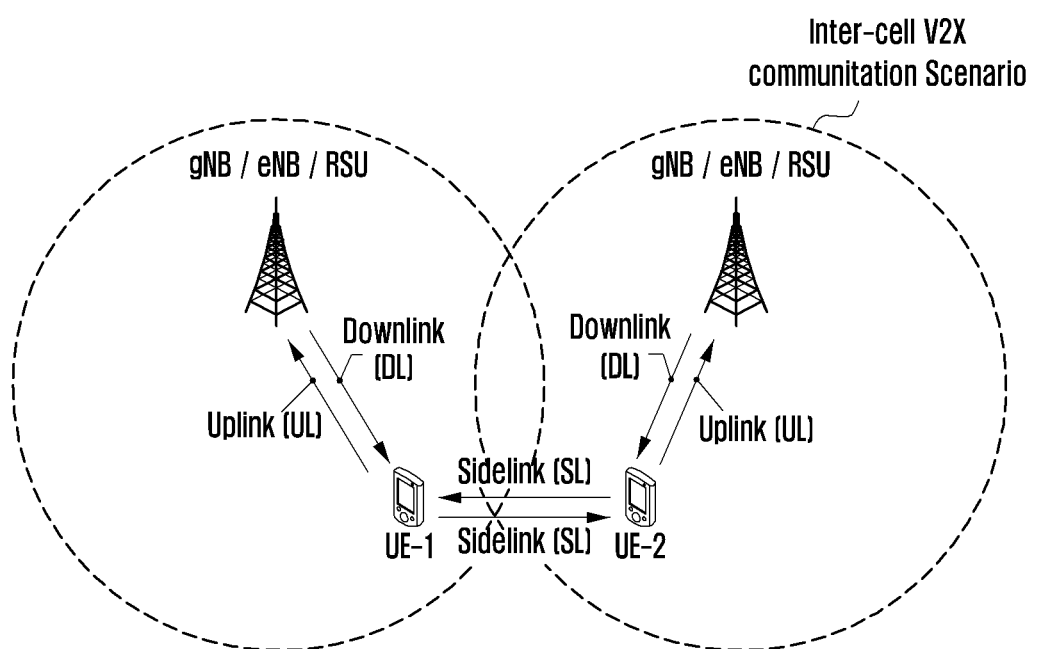
FIG. 1D is a view illustrating a system according to an embodiment of the disclosure.

FIG. 1A is a view illustrating a system according to an embodiment of the disclosure, FIG. 1B is a view illustrating a system according to an embodiment of the disclosure, FIG. 1C is a view illustrating a system according to an embodiment of the disclosure, and FIG. 1D is a view illustrating a system according to an embodiment of the disclosure.

Referring to FIGS. 1A to 1D, FIG. 1A illustrates a case (in-coverage (IC)) in which all V2X terminals UE1 and UE2 are located within the coverage area of a base station. All V2X terminals may receive data and control information from the base station through a downlink (DL) or transmit data and control information to the base station through an uplink (UL). In this case, the data and control information may be data and control information for V2X communication. The data and control information may be data and control information for general cellular communication. In addition, the V2X terminals may transmit/receive data and control information for V2X communication through a sidelink (SL).

Referring to FIGS. 1A to 1D, FIG. 1B illustrates a case in which UE-1 is located within the coverage area of a base station and UE-2 is located outside the coverage area of the base station among the V2X terminals. For example, FIG. 1B illustrates partial coverage (PC) in which some V2X terminals (UE-2) are located outside the coverage area of the base station. The V2X terminal UE-1 located within the coverage area of the base station may receive data and control information from the base station through downlink or transmit data and control information to the base station through uplink. The V2X terminal UE-2 located outside the coverage area of the base station cannot receive data and control information from the base station through downlink, and cannot transmit data and control information to the base station through uplink. Accordingly, the V2X terminal UE-2 can transmit/receive data and control information for V2X communication through the sidelink with the V2X terminal UE-1.

Referring to FIGS. 1A to 1D, FIG. 1C illustrates a case in which all V2X terminals are located out of coverage area (OOC) of a base station. Therefore, the V2X terminals UE-1 and UE-2 cannot receive data and control information from the base station through downlink, and cannot transmit data and control information to the base station through uplink. V2X terminals UE-1 and UE-2 can transmit/receive data and control information for V2X communication through the sidelink.

Referring to FIGS. 1A to 1D, FIG. 1D illustrates a scenario for performing V2X communication between V2X terminals UE-1 and UE-2 located in different cells. Specifically, FIG. 1D illustrates a case in which the V2X terminals UE-1 and UE-2 are connected to different base stations (RRC connection state) or camping (RRC connection release state, that is, RRC idle state). In this case, the V2X terminal UE-1 may be a V2X transmitting terminal and the V2X terminal UE-2 may be a V2X receiving terminal. Alternatively, the V2X terminal UE-1 may be a V2X receiving terminal, and the V2X terminal UE-2 may be a V2X transmitting terminal. The V2X terminal UE-1 may receive a system information block (SIB) from the base station to which it has accessed (or on which it is camping), and the V2X terminal UE-2 may receive an SIB from another base station to which it is connected (or on which it is camping). In this case, as the SIB, an existing SIB may be used, or a separately defined SIB for V2X may be used. In addition, information of the SIB received by the V2X terminal UE-1 and information of the SIB received by the V2X terminal UE-2 may be different from each other. Therefore, in order to perform V2X communication between terminals UE-1 and UE-2 located in different cells, a method of interpreting SIB information transmitted from different cells may be additionally required by unifying the information or by signaling the information.

In FIGS. 1A to 1D, for convenience of description, a V2X system consisting of V2X terminals UE-1 and UE-2 is illustrated, but the disclosure is not limited thereto, and communication between more V2X terminals may be achieved. In addition, the interface (uplink and downlink) between the base station and the V2X terminals may be referred to as Uu interfaces, and the sidelink between the V2X terminals may be referred to as the PC5 interface. Therefore, in the disclosure, the terms can be mixed and used. Meanwhile, in the disclosure, the terminal may include a vehicle that supports vehicle-to-vehicular communication (vehicular-to-vehicular (V2V)), a vehicle that supports vehicle-to-pedestrian communication (vehicular-to-pedestrian (V2P)) or a pedestrian's handset (e.g., a smartphone), a vehicle that supports communication between networks (vehicular-to-network, V2N), or a vehicle that supports communication between a vehicle and a transportation infrastructure (vehicular-to-infrastructure (V2I)). In addition, in the disclosure, the terminal may include a road side unit (RSU) equipped with a terminal function, an RSU equipped with a base station function, or an RSU equipped with a part of the base station function and a part of the terminal function.

Further, according to an embodiment of the disclosure, the base station may be a base station supporting both V2X communication and general cellular communication, or may be a base station supporting only V2X communication. In this case, the base station may be a 5G base station (gNB), a 4G base station (eNB), or an RSU. Therefore, in this disclosure, the base station may be referred to as an RSU.

Figure 2A:
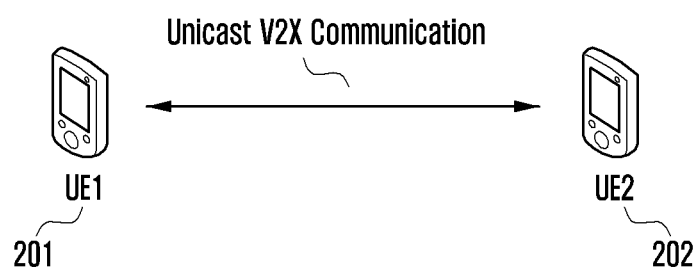
FIG. 2A is a diagram illustrating a vehicle-to-everything (V2X) communication method performed through a sidelink according to an embodiment of the disclosure.
Figure 2B:
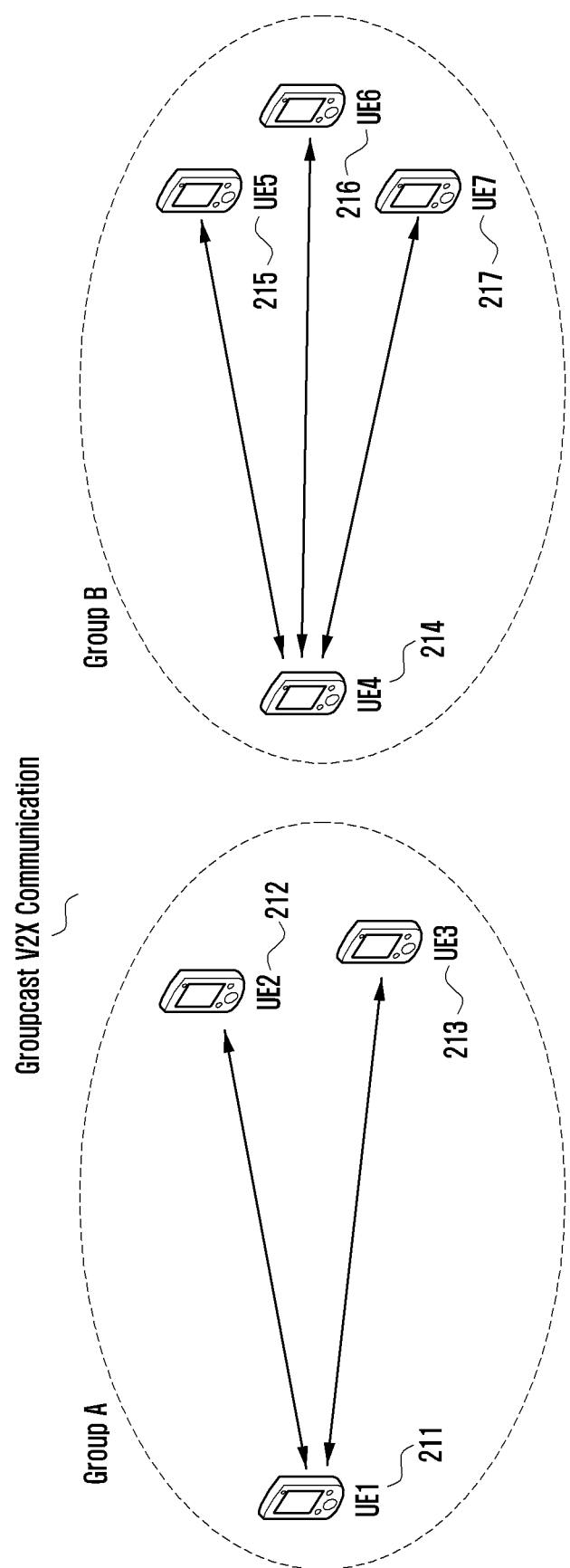
FIG. 2B is a diagram illustrating a V2X communication method performed through a sidelink according to an embodiment of the disclosure.

FIG. 2A is a diagram illustrating a V2X communication method performed through a sidelink according to an embodiment of the disclosure, and FIG. 2B is a diagram illustrating a V2X communication method performed through a sidelink according to an embodiment of the disclosure.

Referring to FIG. 2A, UE-1 201 (e.g., TX terminal) and UE-2 202 (e.g., RX terminal) can perform one-to-one communication, and it can be called unicast communication.

Referring to FIG. 2B, the TX terminal and the RX terminal may perform one-to-many communication, which may be referred to as groupcast or multicast. In FIG. 2B, UE-1 211, UE-2 212, and UE-3 213 may form a group (Group A) to perform groupcast communication, and, UE-4 214, UE-5 215, UE-6 216, and UE-7 217 may form another group (Group B) to perform groupcast communication. Each terminal performs groupcast communication only within a group to which it belongs, and communication between different groups may be performed through unicast, groupcast, or broadcast communication. FIG. 2B illustrates that two groups (Group A and Group B) are formed, but are not limited thereto.

Meanwhile, although not illustrated in FIGS. 2A and 2B, the V2X terminals may perform broadcast communication. Broadcast communication refers to a case where all V2X terminals receive data and control information transmitted by a V2X transmitting terminal through a sidelink. As an example, if it is assumed that UE-1 211 is a transmitting terminal for broadcast in FIG. 2B, all terminals UE-2 212, UE-3 213, UE-4 214, UE-5 215, UE-6 216, and UE-7 217 may receive data and control information transmitted by UE-1 211.

In NR V2X, unlike in LTE V2X, support in a form in which a vehicle terminal transmits data to only one specific node through unicast and a form in which data is transmitted to a plurality of specific nodes through groupcast may be considered. For example, in a service scenario, such as Platooning, which is a technology that connects two or more vehicles through a single network and moves in a cluster form, such unicast and group cast technologies may be usefully used. Specifically, unicast communication may be required for the purpose of a group leader node connected by platooning to control one specific node, and group cast communication may be required for the purpose of simultaneously controlling a group consisting of a specific number of nodes.

Figure 3:
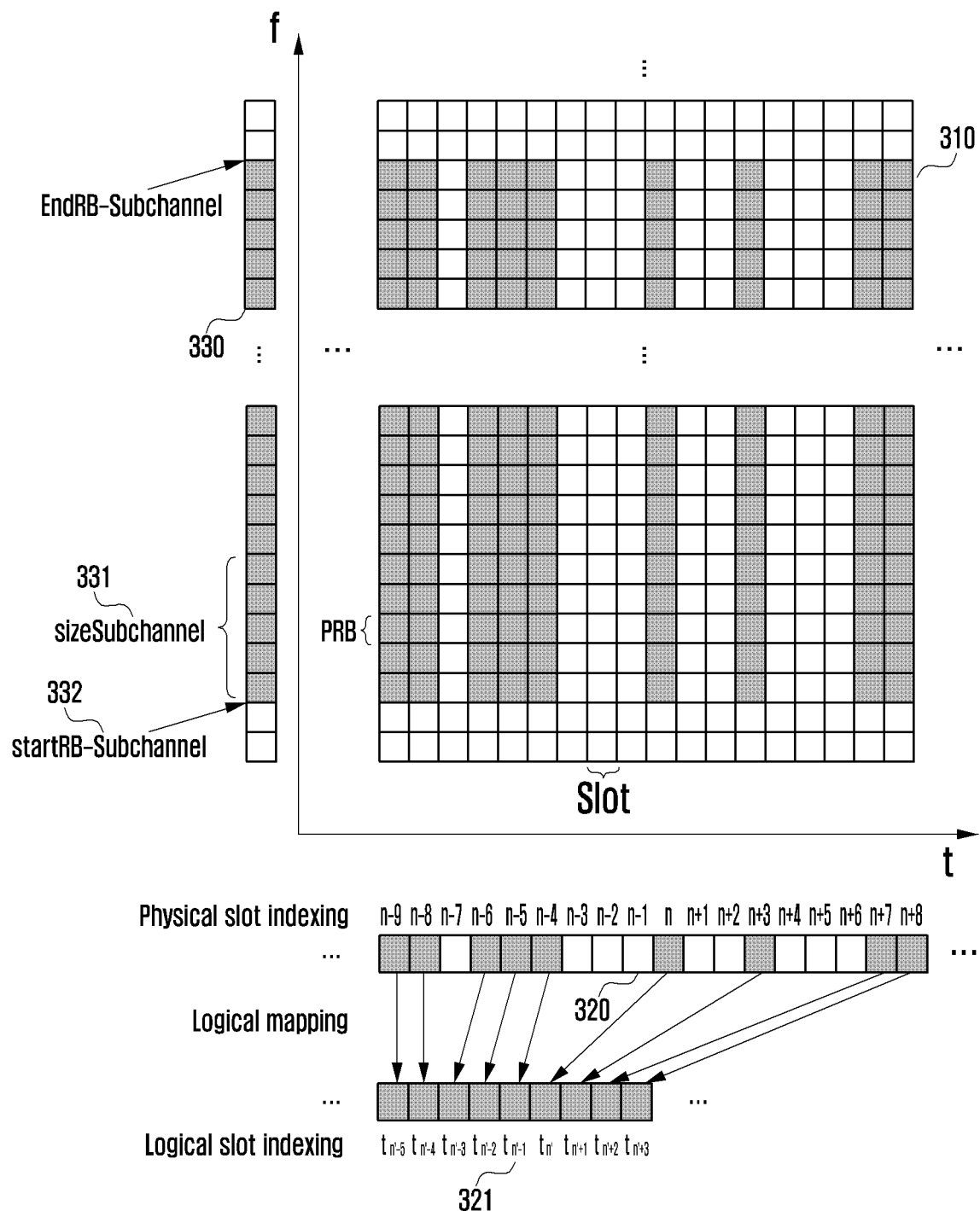
FIG. 3 is a diagram illustrating a resource pool defined as a set of resources on a time and frequency used for transmission and reception of a sidelink according to an embodiment of the disclosure.

FIG. 3 is a diagram illustrating a resource pool defined as a set of resources on a time and frequency used for transmission and reception of a sidelink according to an embodiment of the disclosure.

In the resource pool, the resource granularity of the time axis may be a slot. In addition, the resource assignment unit on the frequency axis may be a sub-channel including one or more physical resource blocks (PRBs).

When the resource pool is assigned on time and frequency (310), a colored area indicates a region set as a resource pool on time and frequency. In the disclosure, an example of a case in which the resource pool is non-contiguously assigned over time is described, but the resource pool may be continuously assigned over time. In addition, although the disclosure describes an example in which a resource pool is continuously assigned on a frequency, a method in which the resource pool is non-contiguously assigned on a frequency is not excluded.

Referring to FIG. 3, a case 320 in which a resource pool is assigned non-contiguously over time is illustrated. Referring to FIG. 3, a case in which a granularity of resource assignment over time is made of a slot is illustrated. Specifically, one slot including a plurality of OFDM symbols may be a basic unit of resource assignment on the time axis.

In this case, all OFDM symbols constituting the slot may be used for sidelink transmission, or some of the OFDM symbols constituting the slot may be used for sidelink transmission. For example, some of the slots may be used as downlink/uplink used as a Uu interface between base station terminals. Referring to FIG. 3, a colored slot represents a slot included in a resource pool in time, and a slot assigned to the resource pool may be (pre-)configured with resource pool information in time. For example, resource pool information in time may be indicated as a bitmap through the SIB.

Referring to FIG. 3, a physical slot 320 belonging to a non-contiguous resource pool in time may be mapped to a logical slot 321. In general, a set of slots belonging to a physical sidelink shared channel (PSSCH) resource pool may be represented by (t0, t1, . . . , ti, . . . , tTmax).

Referring to FIG. 3, a case 330 in which a resource pool is continuously assigned on a frequency is illustrated.

Resource assignment in the frequency axis may be performed in units of sub-channels 331. The subchannel 331 may be defined as a resource assignment unit on a frequency including one or more RBs. For example, the subchannel 331 may be defined as an integer multiple of RB. Referring to FIG. 3, a subchannel 3-31 may be including five consecutive PRBs, and a size of a subchannel (sizeSubchannel) may be a size of five consecutive PRBs. However, the contents illustrated in the drawings are only an example of the disclosure, and the size of the subchannel may be configured differently, and one subchannel is generally configured as a continuous PRB, but it is not necessarily configured as a continuous PRB. The subchannel 331 may be a basic unit of resource assignment for PSSCH.

The startRB-Subchannel 332 may indicate the start position of the subchannel 331 on a frequency in the resource pool. When resource assignment is performed in units of subchannels 331 on the frequency axis, resources on a frequency may be assigned through configuration information about the RB index (startRB-Subchannel, 332) at which the subchannel 331 starts, information on how many RBs the subchannel 331 consists of (sizeSubchannel), the total number of subchannels 331 (numSubchannel), or the like. In this case, information about the startRB-Subchannel, sizeSubchannel, and numSubchannel may be (pre-)configured as resource pool information on frequency. For example, the frequency resource pool information may be configured and indicated through the SIB.

Figure 4:
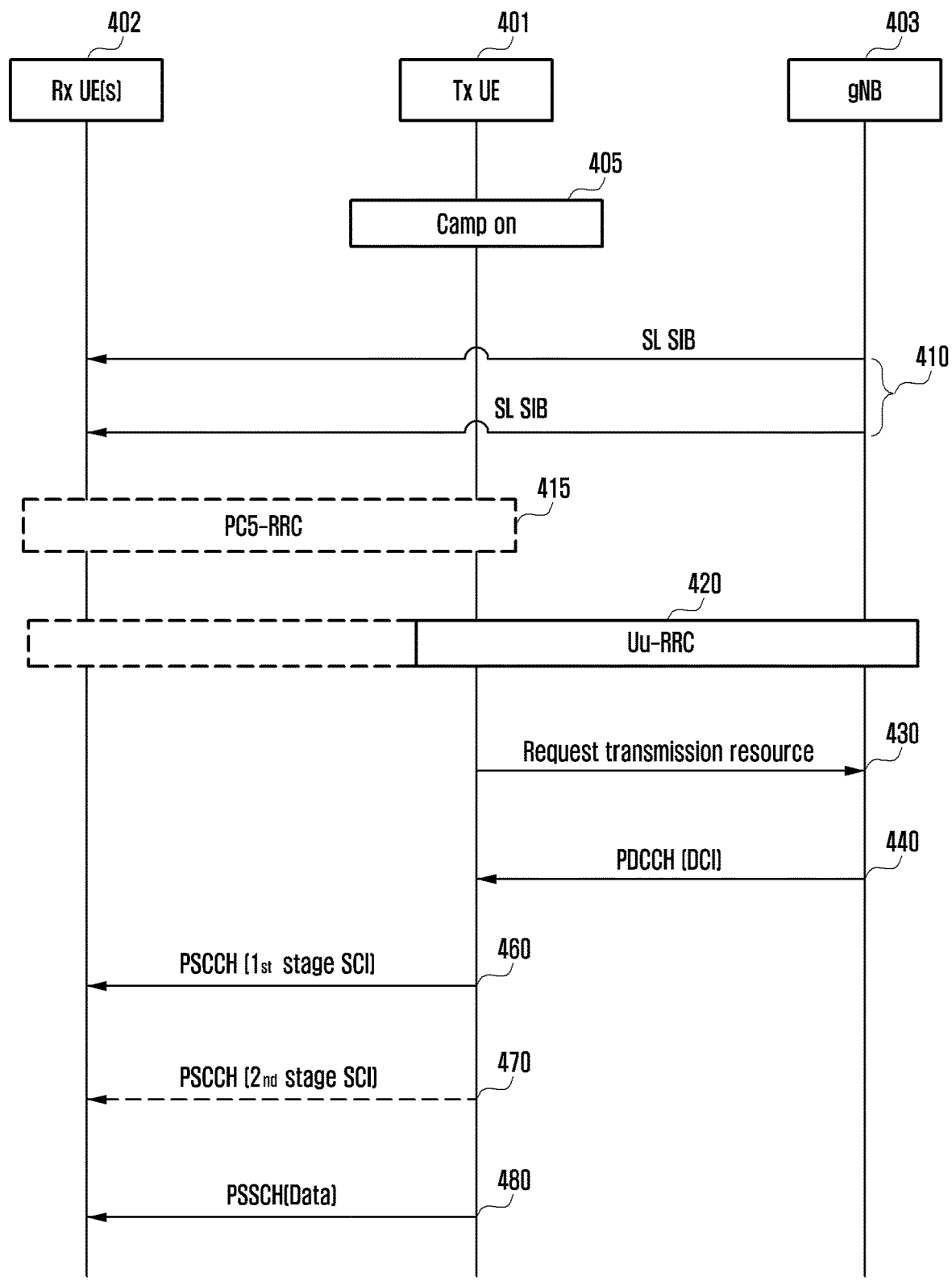
FIG. 4 is a diagram illustrating a method for a base station to assign transmission resources in a sidelink according to an embodiment of the disclosure.

FIG. 4 is a diagram illustrating a method for a base station to assign transmission resources in a sidelink according to an embodiment of the disclosure.

A method for the base station to assign transmission resources in the sidelink will be referred to as Mode 1 below. Mode 1 may be a scheduled resource assignment. Mode 1 may represent a method in which the base station allocates resources used for sidelink transmission to RRC-connected terminals in a dedicated scheduling scheme. The mode 1 method may be effective for interference management and resource pool management because the base station can manage the resources of the sidelink.

Referring to FIG. 4, a transmitting terminal 401 and a receiving terminal 402 camping on (405) may receive a sidelink system information block (SL-SIB) from the base station 403 (410). Here, the receiving terminal 402 represents a terminal that receives data transmitted by the transmitting terminal 401. The SL-SIB information may include sidelink resource pool information for sidelink transmission/reception, parameter setting information for sensing operation, information for setting sidelink synchronization, or carrier information for sidelink transmission/reception operating at different frequencies.

When data traffic for V2X is generated in the transmitting terminal 401, the transmitting terminal 401 may be RRC connected to the base station 403 (420). Here, the RRC connection between the terminal and the base station may be referred to as Uu-RRC. The Uu-RRC connection process 420 may be performed before the transmission terminal 401 generates data traffic. In addition, in Mode 1, while the Uu-RRC connection process 420 between the base station 403 and the receiving terminal 402 is performed, the transmitting terminal may perform transmission to the receiving terminal through a sidelink. In contrast, in Mode 1, the transmitting terminal may perform transmission to the receiving terminal through the sidelink even when the Uu-RRC connection process 420 between the base station 403 and the receiving terminal 402 is not performed.

The transmitting terminal 401 may request a transmission resource capable of V2X communication with the receiving terminal 402 from the base station (430). In this case, the transmitting terminal 401 may request a sidelink transmission resource from the base station 403 using an uplink physical uplink control channel (PUCCH), an RRC message, or a MAC CE. Meanwhile, the MAC CE may be a buffer status report (BSR) MAC CE of a new format (including at least an indicator indicating that the buffer status report for V2X communication and information on the size of data buffered for D2D communication). In addition, the transmitting terminal 401 may request a sidelink resource through a scheduling request (SR) bit transmitted through an uplink physical control channel.

Thereafter, the base station 403 may assign a V2X transmission resource to the transmission terminal 401. In this case, the base station may assign transmission resources in a dynamic grant scheme or a configured grant scheme.

First, in the case of the dynamic grant scheme, the base station may assign resources for TB transmission through downlink control information (DCI). The sidelink scheduling information included in the DCI may include parameters related to the initial transmission and retransmission transmission time and frequency assignment location information fields. The DCI for the dynamic grant method may be cyclic redundancy check (CRC) scrambled with SL-V-radio network temporary identifier (RNTI) to indicate that it is a dynamic grant scheme.

Thereafter, in the case of the configured grant scheme, the base station may periodically assign resources for TB transmission by configuring a semi-persistent scheduling (SPS) interval through Uu-RRC. In this case, the base station may assign resources for one TB through DCI. Sidelink scheduling information for one TB included in the DCI may include parameters related to initial transmission and retransmission resource transmission times and frequency assignment location information. When resources are assigned in the configured grant scheme, the transmission time (occasion) and frequency assignment position of the initial transmission and retransmission for one TB may be determined by the DCI, and the resource for the next TB may be repeated at SPS interval intervals. DCI for the configured grant scheme may be CRC scrambled with SL-SPS-V-RNTI to indicate that the configured grant scheme. In addition, the configured grant (CG) scheme can be divided into type 1 CG and type 2 CG. In the case of Type 2 CG, it is possible to activate/deactivation resources set as configured grant through DCI.

Therefore, in the case of Mode1, the base station 403 may instruct the transmitting terminal 401 to schedule for sidelink communication with the receiving terminal 402 through DCI transmission through the PDCCH (440).

In the case of broadcast transmission, the transmitting terminal 401 may broadcast the SCI (1st stage) to the receiving terminal 402 through the PSCCH by broadcast without the RRC configuration 415 for the sidelink (460). In addition, the transmitting terminal 401 may broadcast data to the receiving terminal 402 through the PSSCH (480). In the case of broadcast transmission, SCI transmission (2nd stage SCI 470) through PSSCH might not be performed.

In contrast, in the case of unicast or groupcast transmission, the transmitting terminal 401 may perform a one-to-one RRC connection with another terminal. Here, the RRC connection between terminals may be referred to as PC5-RRC 415, distinguishing it from Uu-RRC. Even in the case of groupcast, the PC5-RRC 415 may be individually connected between the terminal and the terminal in the group. Referring to FIG. 4, although the connection of the PC5-RRC 415 is shown as an operation after transmission 410 of SL-SIB, it may be performed at any time before transmission 410 of SL-SIB or transmission of SCI. If the RRC connection between the terminals is required, the PC5-RRC connection of the sidelink may be performed, and the transmitting terminal 401 may transmit the SCI (1st stage) to the receiving terminal 402 through the PSCCH in unicast or groupcast (460). In this case, the groupcast transmission of SCI may be interpreted as a group SCI. In addition, the transmitting terminal 401 may transmit the SCI (2nd stage) to the receiving terminal 402 through the PSSCH in unicast or groupcast (470). In this case, information related to resource assignment may be included in the 1st stage SCI, and control information other than that may be included in the 2nd stage SCI. In addition, the transmitting terminal 401 may transmit data to the receiving terminal 402 through the PSSCH in unicast or groupcast (480).

Figure 5:
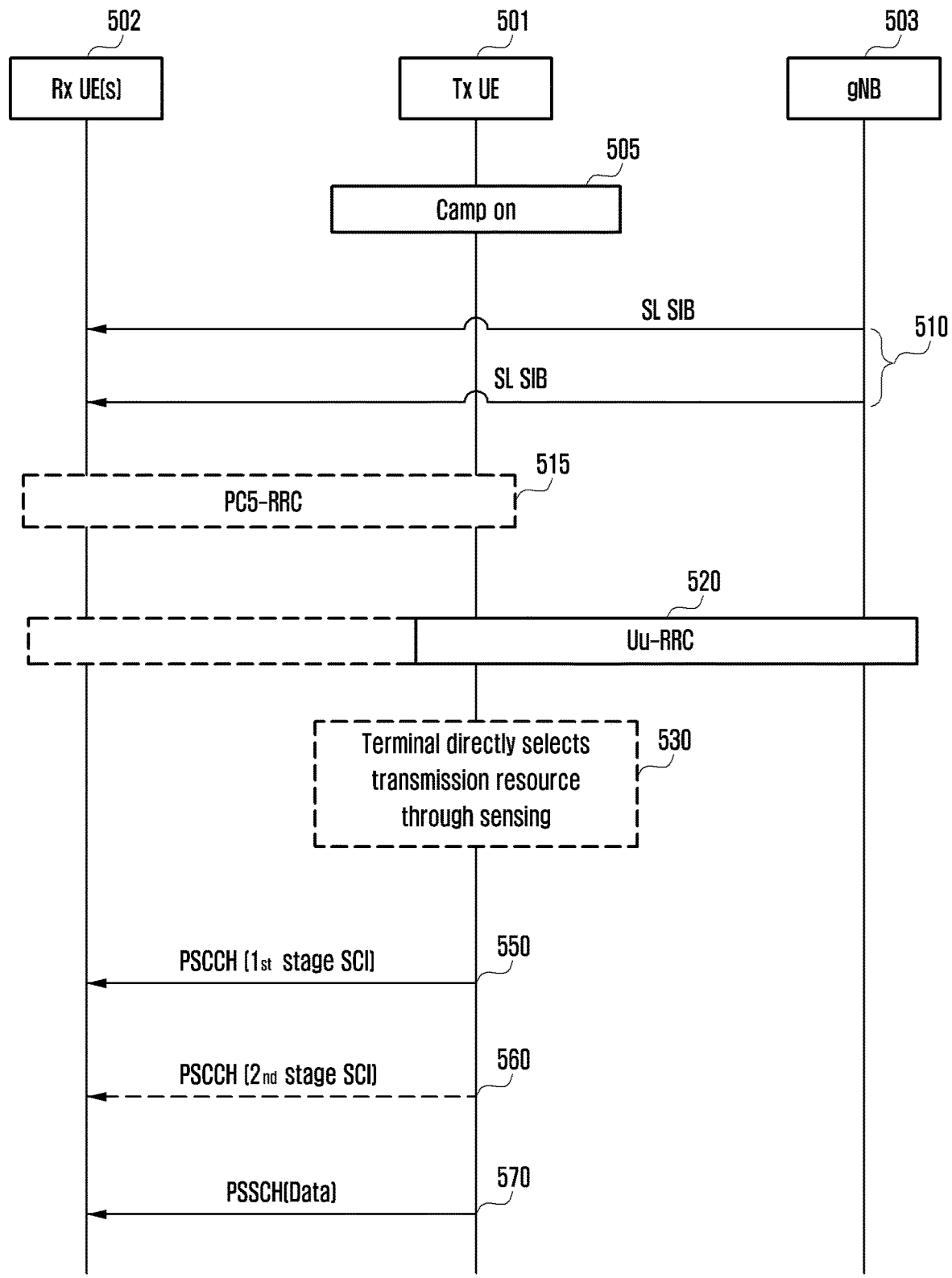
FIG. 5 is a diagram illustrating a method of directly assigning a transmission resource of a sidelink through sensing by a terminal in a sidelink according to an embodiment of the disclosure.

FIG. 5 is a diagram illustrating a method of directly assigning a transmission resource of a sidelink through sensing by a terminal in a sidelink according to an embodiment of the disclosure. Hereinafter, a method in which the UE directly allocates sidelink transmission resources through sensing in the sidelink is referred to as Mode 2. In the case of Mode 2, it may also be referred to as UE autonomous resource selection.

Referring to FIG. 5, in Mode 2, a base station 503 may provide a pool of sidelink transmission/reception resources for V2X as system information, and a transmission terminal 501 may select a transmission resource according to a predetermined rule. Unlike Mode 1, in which the base station is directly involved in resource assignment, in FIG. 5, there is a difference in that the transmitting terminal 501 autonomously selects a resource and transmits data, based on a resource pool previously received through system information.

Referring to FIG. 5, the transmitting terminal 501 and a receiving terminal 502 camping on (505) may receive SL-SIBs from the base station 503 (510). Here, a receiving terminal 502 represents a terminal that receives data transmitted by the transmitting terminal 501. The SL-SIB information may include sidelink resource pool information for sidelink transmission/reception, parameter configuration information for sensing operation, information for configuring sidelink synchronization, or carrier information for sidelink transmission/reception operating at different frequencies.

The difference between FIG. 4 and FIG. 5 is that, in the case of FIG. 4, the base station 503 and the terminal 501 operate in an RRC connected state, while in FIG. 5, the terminal can operate in an idle mode 520 (a state in which RRC is not connected). In addition, even in the RRC connection state 520, the base station 503 does not directly participate in resource assignment and allows the transmitting terminal 501 to autonomously select a transmission resource. Here, the RRC connection between the terminal 501 and the base station 503 may be referred to as a Uu-RRC (520). When data traffic for V2X is generated in the transmitting terminal 501, the transmitting terminal 501 may be configured with a resource pool through system information received from the base station 503, and the transmitting terminal 501 may directly select a resource in the time/frequency domain through sensing within the configured resource pool (530).

In the case of broadcast transmission, the transmitting terminal 501 may broadcast the SCI (1st stage) to the receiving terminal 502 through the PSCCH by broadcast without the RRC configuring (520) for the sidelink (550). In addition, the transmitting terminal 501 may broadcast data to the receiving terminal 502 through the PSSCH (570). In the case of broadcast transmission, SCI transmission (2nd stage SCI 560) through PSSCH might not be performed.

In contrast, in the case of unicast and groupcast transmission, the transmitting terminal 501 may perform a one-to-one RRC connection with other terminals. Here, separate from Uu-RRC, the RRC connection between terminals may be PC5-RRC. Even in the case of groupcast, PC5-RRC may be individually connected between terminals in the group. In FIG. 5, the connection of the PC5-RRC 515 is illustrated as an operation after transmission 510 of SL-SIB, but may be performed at any time before transmission 510 of SL-SIB or transmission 550 of SCI. If the RRC connection between the terminals is required, the sidelink PC5-RRC connection may be performed (515), and the transmitting terminal 501 may transmit the SCI (1st stage) to the receiving terminal 502 through the PSCCH in unicast or groupcast (550). In this case, the groupcast transmission of SCI may be interpreted as a group SCI. In addition, the transmitting terminal 501 may transmit the SCI (2nd stage) to the receiving terminal 502 through the PSSCH in unicast or groupcast (560). In this case, information related to resource assignment may be included in the 1st stage SCI, and control information other than that may be included in the 2nd stage SCI. In addition, the transmitting terminal 501 may transmit data to the receiving terminal 502 through the PSSCH in unicast or groupcast (570).

Figure 6:
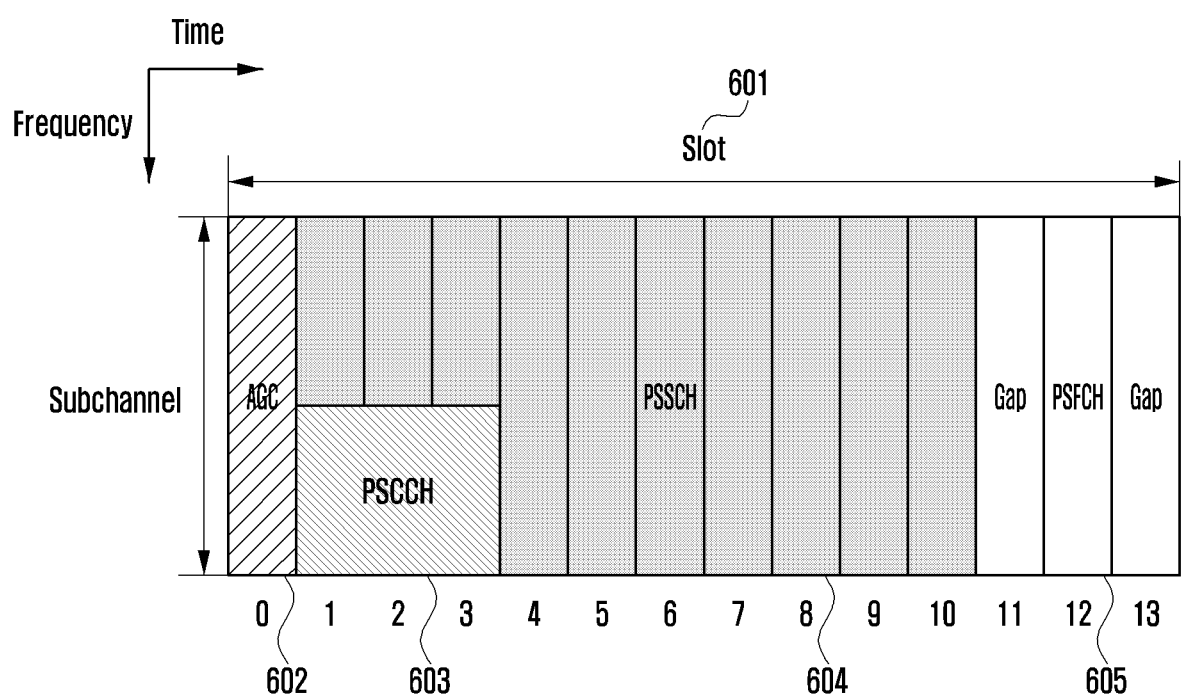
FIG. 6 is a diagram illustrating a mapping structure of physical channels mapped to one slot in a sidelink according to an embodiment of the disclosure.

FIG. 6 is a diagram illustrating a mapping structure of physical channels mapped to one slot in a sidelink according to an embodiment of the disclosure.

Referring to FIG. 6, illustrates mapping for PSCCH/PSSCH/PSFCH physical channels. PSCCH/PSSCH/PSFCH may be assigned to one or more subchannels on a frequency domain. For details on subchannel assignment, the description of FIG. 3 will be referred. Thereafter, referring to FIG. 6 to describe the temporal mapping of PSCCH/PSSCH/PSFCH, one or more symbols before the transmitting terminal transmits the PSCCH/PSSCH/PSFCH in the corresponding slot 601 may be used as the region 602 for the AGC. When the corresponding symbol(s) is used for AGC, a method of repetition and transmission of signals of other channels in the corresponding symbol region 602 may be considered. In this case, a part of a PSCCH symbol or a PSSCH symbol may be considered for the repeated signal of another channel. Alternatively, a preamble may be transmitted to the AGC region 602. When a preamble signal is transmitted, there is an advantage in that the AGC execution time can be shorter than a method of repeatedly transmitting signals of other channels. When a preamble signal is transmitted for AGC, a specific sequence may be used as the preamble signal 602, and in this case, a sequence, such as PSSCH DMRS, PSCCH DMRS, and CSI-RS may be used as the preamble. The sequence used as a preamble in the disclosure is not limited to the above-described example.

Additionally, according to FIG. 6, a PSCCH 603 including control information may be transmitted in initial symbols of a slot, and data scheduled by the control information of the PSCCH 603 may be transmitted to the PSSCH 604. A part (1st stage SCI) of sidelink control information (SCI), which is control information, may be mapped to the PSCCH 603 and transmitted. In the PSSCH 604, not only data information, but also another part (2nd stage SCI) of SCI, which is control information, may be mapped and transmitted. In addition, FIG. 6 illustrates that a physical sidelink feedback channel (PSFCH 605), which is a physical channel for transmitting feedback information, is located at the end of a slot. A predetermined vacant time (Gap) may be secured between the PSSCH 604 and the PSFCH 605 so that the UEs that have transmitted/received the PSSCH 604 can prepare to transmit or receive the PSFCH 605. In addition, after transmission and reception of the PSFCH 605, an empty section (Gap) can be secured for a predetermined time.

Figure 7:
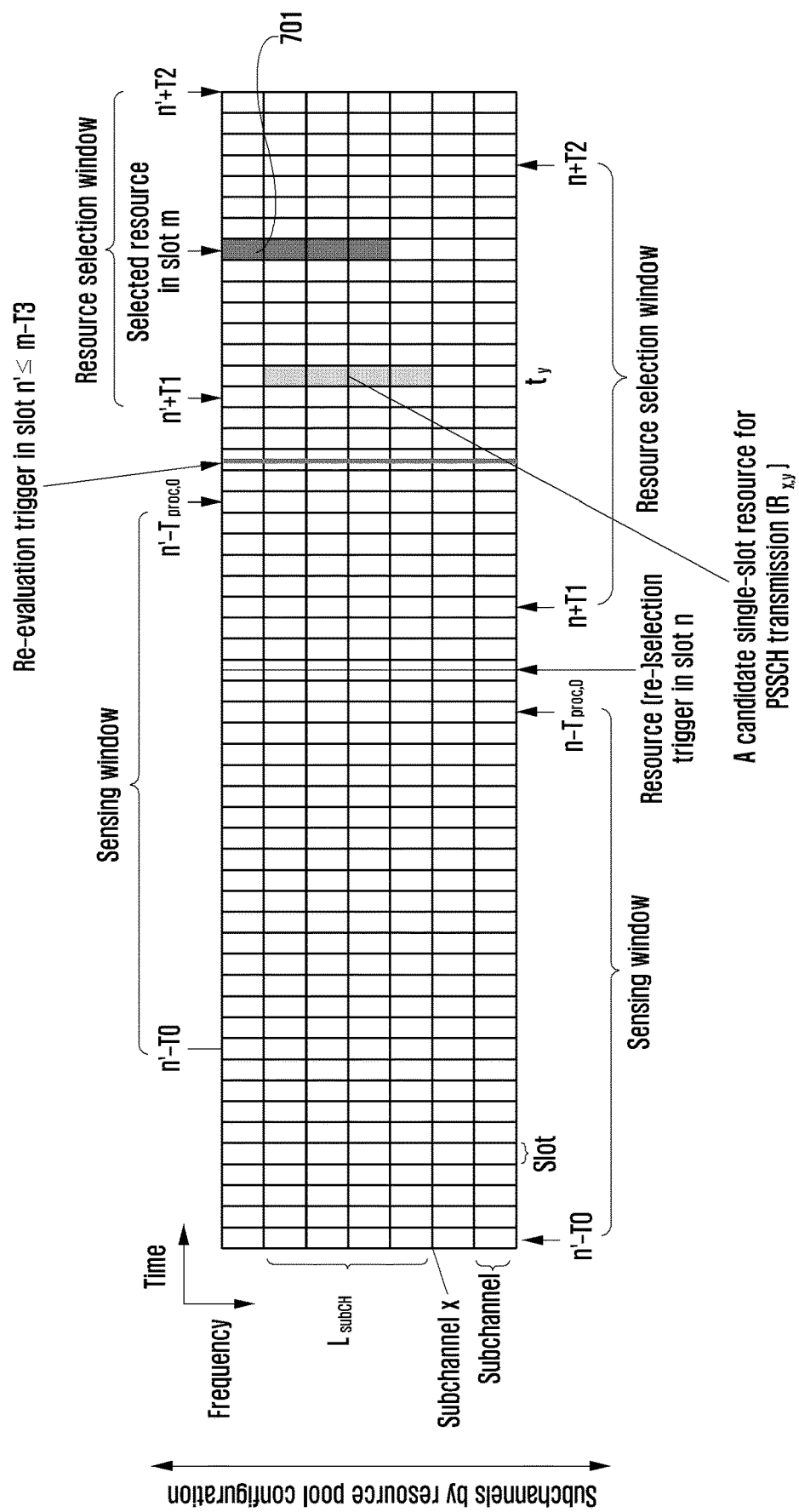
FIG. 7 is a diagram illustrating a method of selecting a resource and reselecting a resource by a terminal in Mode 2 according to an embodiment of the disclosure.

FIG. 7 is a diagram illustrating a method of selecting a resource and reselecting a resource by a terminal in Mode 2 according to an embodiment of the disclosure.

Referring to FIG. 7, it illustrates a case in which triggering for resource selection is performed at time n, and triggering for re-evaluation is performed at n' (n'>n) by continuously sensing even after triggering time n. Referring to FIG. 7, when triggering for resource selection is performed at time n, the sensing window may be defined as [n−T0, n−Tproc,0). Here, T0 is the starting point of the sensing window and may be (pre-)configured as resource pool information. In addition, Tproc,0 may be defined as a time required to process the sensing result, and the required Tproc,0 may vary according to the configured T0 value. Specifically, when a long T0 value is configured, a long Tproc,0 may be required. Conversely, when a short T0 value is configured, a short Tproc,0 may be required. Accordingly, the Tproc,0 value may be fixed to one value, but another value adjusted by the configured T0 value may be (pre-) configured as resource pool information. Thereafter, when triggering for resource selection is performed at time n, the resource selection window may be determined as [n+T1, n+T2]. Here, T1 may be selected as a terminal implementation for T1≤Tproc,1. Tproc,1 is the maximum reference value in which the processing time required to select a resource is considered, and since this processing time may vary according to the terminal implementation, T1 may be selected as a value less than Tproc,1 by the terminal implementation. In addition, assuming that T2 is configured to select Nmax resources for one TB, the resources of Nmax may include initial transmission and retransmission resources. In this case, the UE selects T2 within a range that satisfies the T2≤Packet delay budget (PDP). Thereafter, when triggering for re-evaluation occurs at n' (n'>n) by continuously performing sensing even after triggering, referring to FIG. 7, this means that when at least an already selected resource is in slot m (701), triggering for reselection should be performed before m−T3. Here, T3 may be a processing time required for re-selection. As a first method, a method of using the resource selection processing time T1 already selected according to the UE implementation as T3 as it is can be considered (T3=T1). However, in the re-evaluation process, additional processing time for resource selection may be required. Specifically, time required for dropping the previously selected resource may be required, as well as the time required to process it in a case where the previous resource and the new resource overlap. Therefore, a method of configuring T3=Tproc,1 can be considered. This is because Tproc,1 is the maximum reference value in which the processing time required to select a resource is considered, so if triggering for reselection is performed before the corresponding value, it may be possible to change the selected resource to another resource. As illustrated in FIG. 7, when triggering for re-evaluation occurs at n' (n'>n), the sensing window for this may be [n'−T0, n'−Tproc,0], and the resource selection window for this may be determined as [n'+T1, n'+T2]. In this case, the value of T0 and Tproc,0 may be the same values as the values used when triggering for resource selection is performed at time n. However, for T1 and T2, depending on the implementation, the terminal may select the same value as at point n when triggering for resource selection is performed, but other values may be selected.

Figure 8:
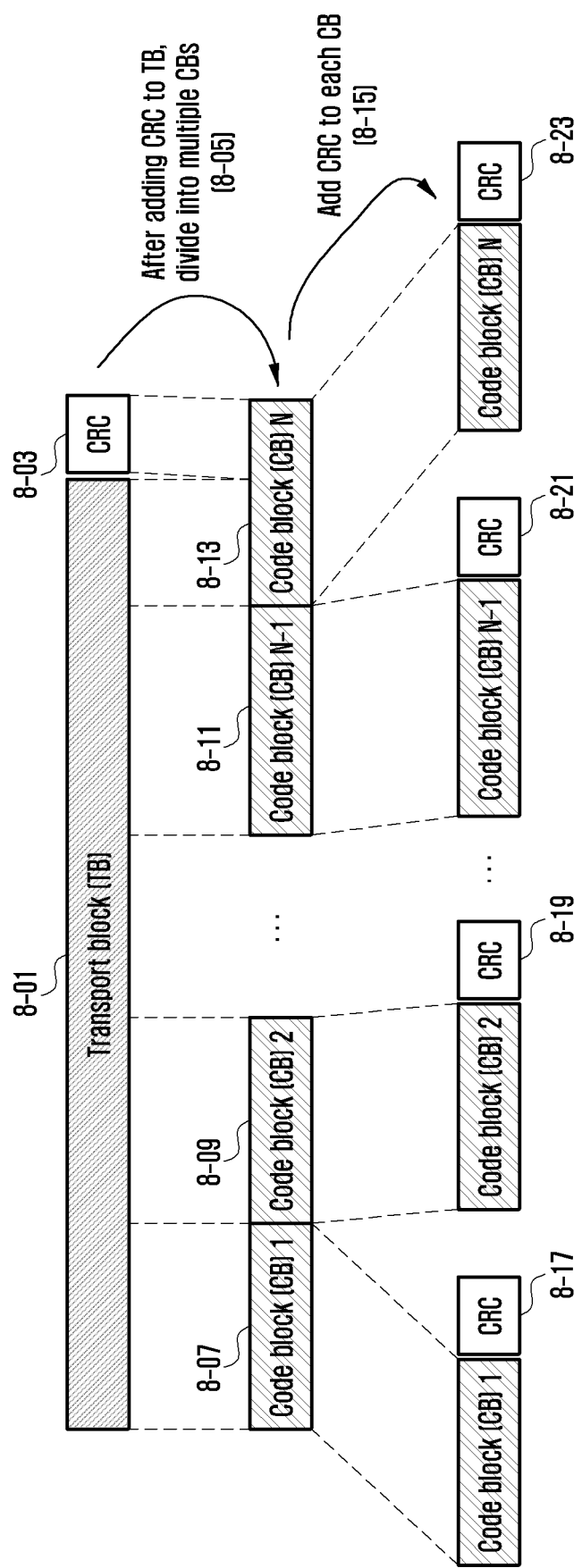
FIG. 8 is a diagram illustrating a process in which one transport block is divided into several code blocks and a cyclic redundancy check (CRC) is added according to an embodiment of the disclosure.

FIG. 8 is a diagram illustrating a process in which one transport block is divided into several code blocks and a CRC is added according to an embodiment of the disclosure.

Referring to FIG. 8, a CRC 8-03 may be added to the last or first part of one transport block 8-01 to be transmitted in uplink or downlink. The CRC may have 16 bits or 24 bits, a predetermined number of bits, or a variable number of bits according to a channel condition, and may be used to determine whether channel coding is successful. The blocks 8-01 and 8-03 to which the CRC is added to the TB can be divided into several code blocks (CBs), 8-07, 8-09, 8-11, and 8-13) (8-05). The maximum size of the code blocks may be predetermined and thus can be divided. In this case, the last code block 8-13 may be smaller in size than other code blocks, or may be adjusted to have the same length as other code blocks by inserting 0, a random value, or 1. CRCs 8-17, 8-19, 8-21, and 8-23 may be added to the divided code blocks (8-15). The CRC may have 16 bits, 24 bits, or a predetermined number of bits, and may be used to determine whether channel coding is successful.

To generate the CRC 8-03, the TB 8-01 and a cyclic generator polynomial may be used, and the cyclic generation polynomial may be defined in various ways. For example, assuming a cyclic generation polynomial $g_{CRC24A}(D)=[D^{24}+D^{23}+D^{18}+D^{17}+D^{14}+D^{11}+D^{10}+D^7+D^6+D^5+D^4+D^3+D+1]$ for 24-bit CRC, and assuming L=24, for TB data $a_0, a_1, a_2, a_3, \ldots, a_{A-1}$, CRC $p_0, p_1, p_2, p_3, \ldots, p_{L-1}$ divides $a_0 D^{A+23}+a_1 D^{A+22}+ \ldots +a_{A-1}D^{24}+p_0D^{23}+p_1D^{22}+\ldots+p_{22}D^1+p_{23}$ by $g_{CRC24A}(D)$ to determine $p_0, p_1, p_2, p_3, \ldots, p_{L-1}$ as a value whose remainder becomes 0. An example in which the CRC length L is 24 has been described above, but the length may be determined in various lengths, such as 12, 16, 24, 32, 40, 48, 64, or the like.

After adding the CRC to the TB through the above process, the transmitter divides it into N CBs 8-07, 8-09, 8-11, 8-13 (8-05). CRCs 8-17, 8-19, 8-21, 8-23 are added to each of the divided CBs 8-07, 8-09, 8-11, and 8-13 (8-15). As for the CRC added to the CB, a CRC of a length different from when generating the CRC added to the TB or a different cyclic generation polynomial may be used. However, the CRC 803 added to the TB and the CRCs 8-17, 8-19, 8-21, and 8-23 added to the code block may be omitted depending on the type of channel code to be applied to the code block. For example, when a low-density parity-check (LDPC) code rather than a turbo code is applied to a code block, the CRCs 8-17, 8-19, 8-21, and 8-23 to be inserted for each code block may be omitted. However, even when LDPC is applied, the CRCs 8-17, 8-19, 8-21, and 8-23 may be added to the code block as it is. In addition, even when a polar code is used, a CRC may be added or omitted.

As described above in FIG. 8, as for the TB to be transmitted, the maximum length of one code block may be determined according to the type of channel coding applied, and the TB and the CRC added to the TB may be divided into code blocks depending on the maximum length of the code block.

In the LTE system of the related art, a CRC for CB is added to the divided CB, the data bits and CRC of the CB are encoded with a channel code, coded bits are determined, and the number of rate-matched bits may be determined for each of the coded bits as promised in advance.

The following embodiment is to propose a method for minimizing power consumption of the terminal in the process (Mode 2) of the terminal performing sensing and resource selection in the above-described sidelink. The embodiment relates to the operation of the terminal and the base station according to the proposed method.

First Embodiment

The first embodiment provides a method and an apparatus for assigning a frequency-time resource to a receiving terminal in a process in which a terminal performs sensing and resource selection and transmits data in a sidelink.

The information for assigning up to Nmax frequency-time resources may be transmitted by the transmitting terminal to the receiving terminal in sidelink control information. The Nmax may be a configured value, and for example, may be set to 2 or 3. For example, when Nmax is configured as 3, up to 3 pieces of resource assignment information may be delivered in SCI. Of course, when Nmax is configured as 3, only one piece of resource assignment information may be delivered, or only two pieces of resource assignment information may be delivered, or three pieces of resource assignment information may be delivered. The range of frequency-time resources that can be assigned in the above may be given by W. For example, the time range of the assigned resources that can be indicated by the SCI may be W. The W may be given as the number of slots. For example, W may be given as 32, which is capable of delivering Nmax resource assignment information within 32 slots in SCI.

Figure 9A:
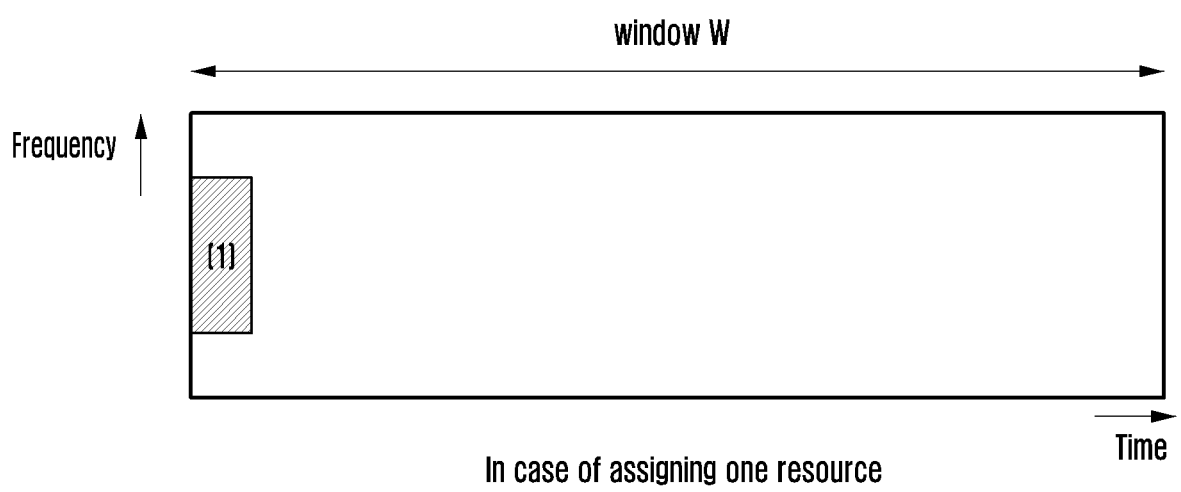
FIGS. 9A, 9B and 9C are diagrams illustrating one, two, or three frequency-time resources are assigned and indicated according to an embodiment of the disclosure.
Figure 9B:
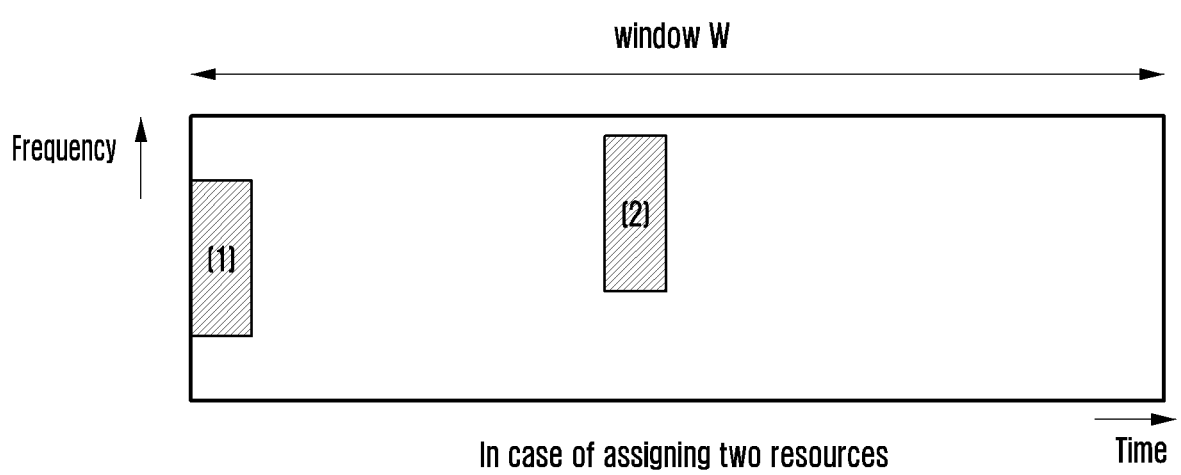
Figure 9C:
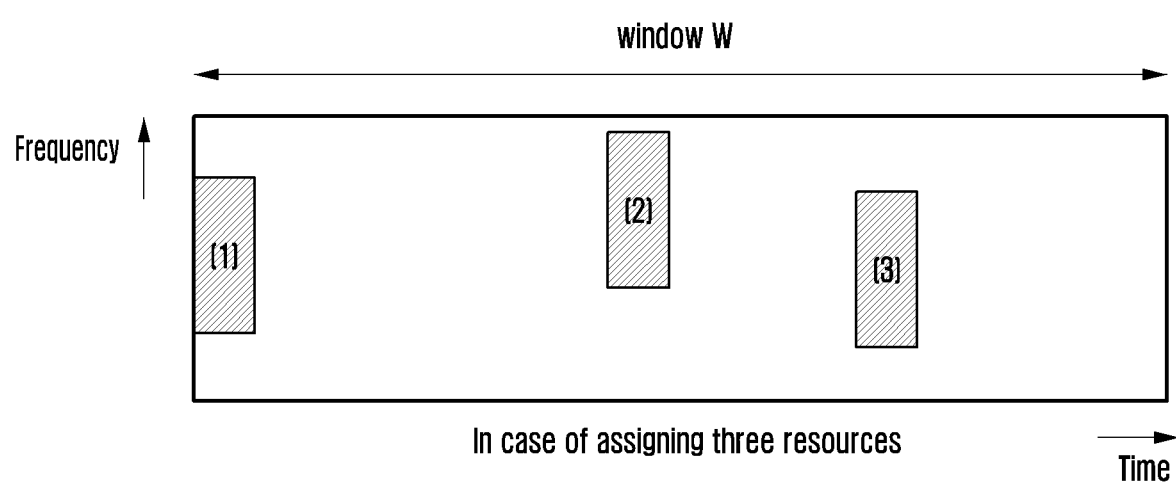

FIGS. 9A, 9B and 9C are diagrams illustrating one, two, or three frequency-time resources are assigned and indicated according to an embodiment of the disclosure. Assigning a frequency-time resource may be applied by combining one or more of the following methods. In the following, it may be a method of separately indicating frequency resources and time resources. In the following, it is described as an example of a case where W=32, that is, a time resource selection range of 32 slots, and when W is changed and applied, the size of the resource assignment bitfield required in SCI may be changed and applied.

Time resource assignment method 1: This method provides an example when Nmax=2 is configured. A 5-bit bitfield is used for time resource assignment, and when the value indicated by the 5-bit is T, the first resource is a resource assigned in the slot (e.g., slot n) in which SCI is transmitted, and the second resource is a resource assigned in n+T. In this method, T may be a value obtained by converting the 5-bit indication value into a decimal number. If the value indicated by the 5 bits is 0, that is, T=0, the second resource may be regarded as not allocated. If T=0, the second frequency resource information indicated in the same SCI may be ignored. Alternatively, if T=0, the second frequency resource information indicated in the same SCI may be a value used for another purpose.

Time resource assignment method 2: This method provides an example when Nmax=3 is configured. Two 5-bit bitfields are used for time resource assignment, and when the values indicated by each of the five bits of each bitfield are T1 and T2, the first resource is assigned in the slot (slot n) in which SCI is transmitted. The second resource is a resource assigned from n+T1, and the third resource is a resource assigned from n+T2. In the above, the order of the second and third resources may be changed according to the values of T1 and T2. In this method, T1 and T2 may be values obtained by converting values indicated in the 5-bit bitfields into decimal numbers. If a value indicated by 5 bits among the above bitfields is 0, that is, T1=0 or T2=0, the second resource or the third resource may be regarded as not allocated. In addition, if T1=0 and T2=0, the second resource and the third resource may be regarded as unallocated, and in this case, the TB may be transmitted only in a slot in which SCI is transmitted. If T1=0 or T2=0, second or third frequency resource information indicated in the same SCI may be ignored. In this method, if only two resources are to be allocated, forcing T2=0 and T1 to indicate the second resource can be applied. In this case, the time position of the first resource will be T0=0. On the contrary, in this method, if only two resources are to be allocated, forcing T1=0 and T2 to indicate the second resource may be applied. In this case, the time position of the first resource will be T0=0.

Time resource assignment method 3: This method provides an example when Nmax=3 is configured. One bitfield is used for time resource assignment, and T1 and T2 can be interpreted by the bitfield value. When the bitfield value is r, r may be determined by Equation 1 below.

$$r = \sum_{i=0}^{N-2} \binom{W-1}{i} + \sum_{i=0}^{N-2} \binom{W-1-T_{i+1}}{N-1-i}$$ Equation 1

In the above equation, N is the number of resources assigned by SCI, and may be N=0 or N=1 or N=2. In the above, W is a time range in which a resource can be selected as described above. In the above equation, Ti refers to a time slot of the i-th resource, and in the disclosure, T0 refers to T0=0 as the first resource, and T1 and T2 indicate time slot information of the second and third resources, respectively, and may be a slot offset from the first resource.

In the Equation, $$\binom{x}{y}$$

is an extended binomial operation defined by $$\begin{Bmatrix} x \\ y \end{Bmatrix} = \begin{cases} \begin{pmatrix} x \\ y \end{pmatrix} & x \geq y \\ 0 & x < y \end{cases}, \text{ and } \begin{pmatrix} x \\ y \end{pmatrix}$$

may represent the number of cases in which y is subtracted from x, and may be a binary coefficient. According to Equation 1, the value of r is determined within the range of Equation 2 below.

$$\left\{ 0, 1, \ldots, \sum_{i=0}^{N_{max}-1} \binom{W-1}{i} - 1 \right\} \quad \text{Equation 2}$$

Accordingly, compared to the time resource assignment method 2, the number of bits for indicating T1 and T2 can be saved, and the size of a bitfield applied in this method may be determined as $\lceil \log_2(\Sigma_{i=0}^{N_{max}-1}\binom{W}{i}) \rceil$ bits. In the above, $\lceil x \rceil$ may be a value rounded up from x, or may indicate a minimum integer greater than or equal to x.

Referring to FIG. 9A, as an example, consider the case where W=32 and Nmax=3. In this case, $\lceil \log_2(\Sigma_{i=0}^{2}\binom{31}{i}) \rceil$ bits are needed to apply this method. When only one frequency-time resource is allocated, that is, when N=1, Equation 1 may be applied to the following Equation 3.

$$r = 0 \quad \text{Equation 3}$$

For example, T0=0, and T1 and T2 are not set to be negligible.

Referring to FIG. 9B, when only two frequency-time resources are allocated, that is, when N=2, Equation 3 can be applied to the following Equation 4.

$$r = 1 + \binom{31 - T_1}{1} \quad \text{Equation 4}$$

That is, assuming T0=0, r is determined as shown in Table 1 below according to the value of T1, and the value of T2 is not determined so as to be negligible.

TABLE 1

| T1 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| r | 31 | 30 | 29 | 28 | 27 | 26 | 25 | 24 | 23 | 22 | 21 | 20 | 19 | 18 | 17 | 16 |
| T1 | 17 | 18 | 19 | 20 | 21 | 22 | 23 | 24 | 25 | 26 | 27 | 28 | 29 | 30 | 31 | |
| r | 15 | 14 | 13 | 12 | 11 | 10 | 9 | 8 | 7 | 6 | 5 | 4 | 3 | 2 | 1 | |

Referring to FIG. 9C, when three frequency-time resources are allocated, that is, when N=3, Equation 1 can be applied to the following Equation 5.

$$r = \sum_{i=0}^{1} \binom{31}{i} + \sum_{i=0}^{1} \binom{31 - T_{i+1}}{2 - i} = 32 + \binom{31 - T_1}{2} + \binom{31 - T_2}{1} \quad \text{Equation 5}$$

That is, assuming T0=0, r is determined as shown in Table 2 below according to the values of T1 and T2.

TABLE 2

| | | T1 | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| T2 | 2 | 496 | X | X | X | X | X | X | X | X | X | X | X | X | X | X | X |
| | 3 | 495 | 466 | X | X | X | X | X | X | X | X | X | X | X | X | X | X |
| | 4 | 494 | 465 | 437 | X | X | X | X | X | X | X | X | X | X | X | X | X |
| | 5 | 493 | 464 | 436 | 409 | X | X | X | X | X | X | X | X | X | X | X | X |
| | 6 | 492 | 463 | 435 | 408 | 382 | X | X | X | X | X | X | X | X | X | X | X |
| | 7 | 491 | 462 | 434 | 407 | 381 | 356 | X | X | X | X | X | X | X | X | X | X |
| | 8 | 490 | 461 | 433 | 406 | 380 | 355 | 331 | X | X | X | X | X | X | X | X | X |
| | 9 | 489 | 460 | 432 | 405 | 379 | 354 | 330 | 307 | X | X | X | X | X | X | X | X |
| | 10 | 488 | 459 | 431 | 404 | 378 | 353 | 329 | 306 | 284 | X | X | X | X | X | X | X |
| | 11 | 487 | 458 | 430 | 403 | 377 | 352 | 328 | 305 | 283 | 262 | X | X | X | X | X | X |
| | 12 | 486 | 457 | 429 | 402 | 376 | 351 | 327 | 304 | 282 | 261 | 241 | X | X | X | X | X |
| | 13 | 485 | 456 | 428 | 401 | 375 | 350 | 326 | 303 | 281 | 260 | 240 | 221 | X | X | X | X |
| | 14 | 484 | 455 | 427 | 400 | 374 | 349 | 325 | 302 | 280 | 259 | 239 | 220 | 202 | X | X | X |
| | 15 | 483 | 454 | 426 | 399 | 373 | 348 | 324 | 301 | 279 | 258 | 238 | 219 | 201 | 184 | X | X |
| | 16 | 482 | 453 | 425 | 398 | 372 | 347 | 323 | 300 | 278 | 257 | 237 | 218 | 200 | 183 | 167 | X |
| | 17 | 481 | 452 | 424 | 397 | 371 | 346 | 322 | 299 | 277 | 256 | 236 | 217 | 199 | 182 | 166 | 151 |
| | 18 | 480 | 451 | 423 | 396 | 370 | 345 | 321 | 298 | 276 | 255 | 235 | 216 | 198 | 181 | 165 | 150 |
| | 19 | 479 | 450 | 422 | 395 | 369 | 344 | 320 | 297 | 275 | 254 | 234 | 215 | 197 | 180 | 164 | 149 |

TABLE 2-continued

| | | | | | | | | | | | | | | | | |
|---|---|---|---|---|---|---|---|---|---|---|---|---|---|---|---|---|
| 20 | 478 | 449 | 421 | 394 | 368 | 343 | 319 | 296 | 274 | 253 | 233 | 214 | 196 | 179 | 163 | 148 |
| 21 | 477 | 448 | 420 | 393 | 367 | 342 | 318 | 295 | 273 | 252 | 232 | 213 | 195 | 178 | 162 | 147 |
| 22 | 476 | 447 | 419 | 392 | 366 | 341 | 317 | 294 | 272 | 251 | 231 | 212 | 194 | 177 | 161 | 146 |
| 23 | 475 | 446 | 418 | 391 | 365 | 340 | 316 | 293 | 271 | 250 | 230 | 211 | 193 | 176 | 160 | 145 |
| 24 | 474 | 445 | 417 | 390 | 364 | 339 | 315 | 292 | 270 | 249 | 229 | 210 | 192 | 175 | 159 | 144 |
| 25 | 473 | 444 | 416 | 389 | 363 | 338 | 314 | 291 | 269 | 248 | 228 | 209 | 191 | 174 | 158 | 143 |
| 26 | 472 | 443 | 415 | 388 | 362 | 337 | 313 | 290 | 268 | 247 | 227 | 208 | 190 | 173 | 157 | 142 |
| 27 | 471 | 442 | 414 | 387 | 361 | 336 | 312 | 289 | 267 | 246 | 226 | 207 | 189 | 172 | 156 | 141 |
| 28 | 470 | 441 | 413 | 386 | 360 | 335 | 311 | 288 | 266 | 245 | 225 | 206 | 188 | 171 | 155 | 140 |
| 29 | 469 | 440 | 412 | 385 | 359 | 334 | 310 | 287 | 265 | 244 | 224 | 205 | 187 | 170 | 154 | 139 |
| 30 | 468 | 439 | 411 | 384 | 358 | 333 | 309 | 286 | 264 | 243 | 223 | 204 | 186 | 169 | 153 | 138 |
| 31 | 467 | 438 | 410 | 383 | 357 | 332 | 308 | 285 | 263 | 242 | 222 | 203 | 185 | 168 | 152 | 137 |

| | | T1 | | | | | | | | | | | | | | |
|---|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 | 31 |
| T2 | 2 | X | X | X | X | X | X | X | X | X | X | X | X | X | X | X |
| | 3 | X | X | X | X | X | X | X | X | X | X | X | X | X | X | X |
| | 4 | X | X | X | X | X | X | X | X | X | X | X | X | X | X | X |
| | 5 | X | X | X | X | X | X | X | X | X | X | X | X | X | X | X |
| | 6 | X | X | X | X | X | X | X | X | X | X | X | X | X | X | X |
| | 7 | X | X | X | X | X | X | X | X | X | X | X | X | X | X | X |
| | 8 | X | X | X | X | X | X | X | X | X | X | X | X | X | X | X |
| | 9 | X | X | X | X | X | X | X | X | X | X | X | X | X | X | X |
| | 10 | X | X | X | X | X | X | X | X | X | X | X | X | X | X | X |
| | 11 | X | X | X | X | X | X | X | X | X | X | X | X | X | X | X |
| | 12 | X | X | X | X | X | X | X | X | X | X | X | X | X | X | X |
| | 13 | X | X | X | X | X | X | X | X | X | X | X | X | X | X | X |
| | 14 | X | X | X | X | X | X | X | X | X | X | X | X | X | X | X |
| | 15 | X | X | X | X | X | X | X | X | X | X | X | X | X | X | X |
| | 16 | X | X | X | X | X | X | X | X | X | X | X | X | X | X | X |
| | 17 | X | X | X | X | X | X | X | X | X | X | X | X | X | X | X |
| | 18 | 136 | X | X | X | X | X | X | X | X | X | X | X | X | X | X |
| | 19 | 135 | 122 | X | X | X | X | X | X | X | X | X | X | X | X | X |
| | 20 | 134 | 121 | 109 | X | X | X | X | X | X | X | X | X | X | X | X |
| | 21 | 133 | 120 | 108 | 97 | X | X | X | X | X | X | X | X | X | X | X |
| | 22 | 132 | 119 | 107 | 96 | 86 | X | X | X | X | X | X | X | X | X | X |
| | 23 | 131 | 118 | 106 | 95 | 85 | 76 | X | X | X | X | X | X | X | X | X |
| | 24 | 130 | 117 | 105 | 94 | 84 | 75 | 67 | X | X | X | X | X | X | X | X |
| | 25 | 129 | 116 | 104 | 93 | 83 | 74 | 66 | 59 | X | X | X | X | X | X | X |
| | 26 | 128 | 115 | 103 | 92 | 82 | 73 | 55 | 58 | 52 | X | X | X | X | X | X |
| | 27 | 127 | 114 | 102 | 91 | 81 | 72 | 54 | 57 | 51 | 46 | X | X | X | X | X |
| | 28 | 126 | 113 | 101 | 90 | 80 | 71 | 53 | 56 | 50 | 45 | 41 | X | X | X | X |
| | 29 | 125 | 112 | 100 | 89 | 79 | 70 | 52 | 55 | 49 | 44 | 40 | 37 | X | X | X |
| | 30 | 124 | 111 | 99 | 88 | 78 | 59 | 51 | 54 | 48 | 43 | 39 | 36 | 34 | X | X |
| | 31 | 123 | 110 | 98 | 87 | 77 | 58 | 50 | 53 | 47 | 42 | 38 | 35 | 33 | 32 | X |

That is, given r, information on T1 and T2 can be found.

Time resource assignment method 4: This method provides an example when Nmax=3 is configured. One bitfield is used for time resource assignment, and T1 and T2 may be interpreted by the bitfield value. When the bitfield value is r, r may be determined by the following method. In this case, N may be one of values 1 to 3, and when N is 1, r may have a specific value. As an example, r may be determined to be 0. In this case, the time resource assignment may indicate that only the first resource indicating T0=0 is allocated. As another embodiment of the disclosure, when N is 1, only the first resource is allocated, and both T1 and T2 may have a value of 0. In this case, even when N is 1, the following equation may be used.

When N is greater than 1, r may be determined by Equation 6 below.

if $T_2 \leq \lfloor W/2 \rfloor$ then $r = W \times T_2 + T_1$ else $r = W(W-T_2) + (W-T_1) + 1$   Equation 6

In the above equation, N is the number of resources assigned by the SCI, and may be N=2 or N=3. In the above, W may be a value related to a time range in which a resource may be selected as described above. For example, W may be the number of a time range in which a resource can be selected, a value less than by 1, or a value greater than by 1. $\lfloor x \rfloor$ may be a value that is rounded down from x, or may indicate a maximum integer less than or equal to x. In the above, T1 and T2 indicate time slot information of the second and third resources, respectively, and may be slot offsets from the first resource or the second resource. For example, T1 is a time offset from the first resource, and T2 is a time offset from the second resource. In this case, T0 may mean T0=0 as the first resource. T1 may have a value greater than or equal to 1, and T2 may have a value greater than or equal to 0. When T2 is 0, it may indicate that the third resource is not allocated. In other words, when N=2, T2 may have a value of 0, and when N=3, both T1 and T2 may be integers greater than 0. In other words, when N=3, both T1 and T2 may be integers greater than or equal to 1. The size of the bitfield applied in this method may be determined by $\lceil \log_2(\Sigma_{i=0}^{N_{max}-1} \binom{W}{i}) \rceil$ bits. In the above, $\lceil x \rceil$ may be a value rounded up from x, or may indicate a minimum integer greater than or equal to x. In order to assign resources, the transmitter may transmit the r value after assigning the resource according to the method, and the receiver may check the assigned resource after receiving r by the method.

Time resource assignment method 5: In this method, another example is provided when Nmax=3 is configured. One bitfield is used for time resource assignment, and T1 and T2 may be interpreted by the bitfield value. When the bitfield value is r, r may be determined as T1 and T2 as shown in Table 3 below.

TABLE 3

| | | T1 | | | | | | | | | | | | | | | | |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 |
| T2 | 0 | X | X | X | X | X | X | X | X | X | X | X | X | X | X | X | X | X |
| | 1 | 496 | X | X | X | X | X | X | X | X | X | X | X | X | X | X | X | X |
| | 2 | 495 | 495 | X | X | X | X | X | X | X | X | X | X | X | X | X | X | X |
| | 3 | 494 | 494 | 494 | X | X | X | X | X | X | X | X | X | X | X | X | X | X |
| | 4 | 493 | 493 | 493 | 493 | X | X | X | X | X | X | X | X | X | X | X | X | X |
| | 5 | 492 | 492 | 492 | 492 | 492 | X | X | X | X | X | X | X | X | X | X | X | X |
| | 6 | 491 | 491 | 491 | 491 | 491 | 491 | X | X | X | X | X | X | X | X | X | X | X |
| | 7 | 490 | 490 | 490 | 490 | 490 | 490 | 490 | X | X | X | X | X | X | X | X | X | X |
| | 8 | 489 | 489 | 489 | 489 | 489 | 489 | 489 | 489 | X | X | X | X | X | X | X | X | X |
| | 9 | 488 | 488 | 488 | 488 | 488 | 488 | 488 | 488 | 488 | X | X | X | X | X | X | X | X |
| | 10 | 487 | 487 | 487 | 487 | 487 | 487 | 487 | 487 | 487 | 487 | X | X | X | X | X | X | X |
| | 11 | 486 | 486 | 486 | 486 | 486 | 486 | 486 | 486 | 486 | 486 | 486 | X | X | X | X | X | X |
| | 12 | 485 | 485 | 485 | 485 | 485 | 485 | 485 | 485 | 485 | 485 | 485 | 485 | X | X | X | X | X |
| | 13 | 484 | 484 | 484 | 484 | 484 | 484 | 484 | 484 | 484 | 484 | 484 | 484 | 484 | X | X | X | X |
| | 14 | 483 | 483 | 483 | 483 | 483 | 483 | 483 | 483 | 483 | 483 | 483 | 483 | 483 | 483 | X | X | X |
| | 15 | 482 | 482 | 482 | 482 | 482 | 482 | 482 | 482 | 482 | 482 | 482 | 482 | 482 | 482 | 482 | X | X |
| | 16 | 481 | 481 | 481 | 481 | 481 | 481 | 481 | 481 | 481 | 481 | 481 | 481 | 481 | 481 | 481 | 481 | X |
| | 17 | 480 | 480 | 480 | 480 | 480 | 480 | 480 | 480 | 480 | 480 | 480 | 480 | 480 | 480 | 480 | 480 | 480 |
| | 18 | 479 | 479 | 479 | 479 | 479 | 479 | 479 | 479 | 479 | 479 | 479 | 479 | 479 | 479 | 479 | 479 | 479 |
| | 19 | 478 | 478 | 478 | 478 | 478 | 478 | 478 | 478 | 478 | 478 | 478 | 478 | 478 | 478 | 478 | 478 | 478 |
| | 20 | 477 | 477 | 477 | 477 | 477 | 477 | 477 | 477 | 477 | 477 | 477 | 477 | 477 | 477 | 477 | 477 | 477 |
| | 21 | 476 | 476 | 476 | 476 | 476 | 476 | 476 | 476 | 476 | 476 | 476 | 476 | 476 | 476 | 476 | 476 | 476 |
| | 22 | 475 | 475 | 475 | 475 | 475 | 475 | 475 | 475 | 475 | 475 | 475 | 475 | 475 | 475 | 475 | 475 | 475 |
| | 23 | 474 | 474 | 474 | 474 | 474 | 474 | 474 | 474 | 474 | 474 | 474 | 474 | 474 | 474 | 474 | 474 | 474 |
| | 24 | 473 | 473 | 473 | 473 | 473 | 473 | 473 | 473 | 473 | 473 | 473 | 473 | 473 | 473 | 473 | 473 | 473 |
| | 25 | 472 | 472 | 472 | 472 | 472 | 472 | 472 | 472 | 472 | 472 | 472 | 472 | 472 | 472 | 472 | 472 | 472 |
| | 26 | 471 | 471 | 471 | 471 | 471 | 471 | 471 | 471 | 471 | 471 | 471 | 471 | 471 | 471 | 471 | 471 | 471 |
| | 27 | 470 | 470 | 470 | 470 | 470 | 470 | 470 | 470 | 470 | 470 | 470 | 470 | 470 | 470 | 470 | 470 | 470 |
| | 28 | 469 | 469 | 469 | 469 | 469 | 469 | 469 | 469 | 469 | 469 | 469 | 469 | 469 | 469 | 469 | 469 | 469 |
| | 29 | 468 | 468 | 468 | 468 | 468 | 468 | 468 | 468 | 468 | 468 | 468 | 468 | 468 | 468 | 468 | 468 | 468 |
| | 30 | 467 | 467 | 467 | 467 | 467 | 467 | 467 | 467 | 467 | 467 | 467 | 467 | 467 | 467 | 467 | 467 | 467 |
| | 31 | 466 | 466 | 466 | 466 | 466 | 466 | 466 | 466 | 466 | 466 | 466 | 466 | 466 | 466 | 466 | 466 | 466 |

| | | T1 | | | | | | | | | | | | | | |
|---|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 | 31 |
| T2 | 0 | X | X | X | X | X | X | X | X | X | X | X | X | X | X | X |
| | 1 | X | X | X | X | X | X | X | X | X | X | X | X | X | X | X |
| | 2 | X | X | X | X | X | X | X | X | X | X | X | X | X | X | X |
| | 3 | X | X | X | X | X | X | X | X | X | X | X | X | X | X | X |
| | 4 | X | X | X | X | X | X | X | X | X | X | X | X | X | X | X |
| | 5 | X | X | X | X | X | X | X | X | X | X | X | X | X | X | X |
| | 6 | X | X | X | X | X | X | X | X | X | X | X | X | X | X | X |
| | 7 | X | X | X | X | X | X | X | X | X | X | X | X | X | X | X |
| | 8 | X | X | X | X | X | X | X | X | X | X | X | X | X | X | X |
| | 9 | X | X | X | X | X | X | X | X | X | X | X | X | X | X | X |
| | 10 | X | X | X | X | X | X | X | X | X | X | X | X | X | X | X |
| | 11 | X | X | X | X | X | X | X | X | X | X | X | X | X | X | X |
| | 12 | X | X | X | X | X | X | X | X | X | X | X | X | X | X | X |
| | 13 | X | X | X | X | X | X | X | X | X | X | X | X | X | X | X |
| | 14 | X | X | X | X | X | X | X | X | X | X | X | X | X | X | X |
| | 15 | X | X | X | X | X | X | X | X | X | X | X | X | X | X | X |
| | 16 | X | X | X | X | X | X | X | X | X | X | X | X | X | X | X |
| | 17 | X | X | X | X | X | X | X | X | X | X | X | X | X | X | X |
| | 18 | 479 | X | X | X | X | X | X | X | X | X | X | X | X | X | X |
| | 19 | 478 | 478 | X | X | X | X | X | X | X | X | X | X | X | X | X |
| | 20 | 477 | 477 | 477 | X | X | X | X | X | X | X | X | X | X | X | X |
| | 21 | 476 | 476 | 476 | 476 | X | X | X | X | X | X | X | X | X | X | X |
| | 22 | 475 | 475 | 475 | 475 | 475 | X | X | X | X | X | X | X | X | X | X |
| | 23 | 474 | 474 | 474 | 474 | 474 | 474 | X | X | X | X | X | X | X | X | X |
| | 24 | 473 | 473 | 473 | 473 | 473 | 473 | 473 | X | X | X | X | X | X | X | X |
| | 25 | 472 | 472 | 472 | 472 | 472 | 472 | 472 | 472 | X | X | X | X | X | X | X |
| | 26 | 471 | 471 | 471 | 471 | 471 | 471 | 471 | 471 | 471 | X | X | X | X | X | X |
| | 27 | 470 | 470 | 470 | 470 | 470 | 470 | 470 | 470 | 470 | 470 | X | X | X | X | X |
| | 28 | 469 | 469 | 469 | 469 | 469 | 469 | 469 | 469 | 469 | 469 | 469 | X | X | X | X |
| | 29 | 468 | 468 | 468 | 468 | 468 | 468 | 468 | 468 | 468 | 468 | 468 | 468 | X | X | X |
| | 30 | 467 | 467 | 467 | 467 | 467 | 467 | 467 | 467 | 467 | 467 | 467 | 467 | 467 | X | X |
| | 31 | 466 | 466 | 466 | 466 | 466 | 466 | 466 | 466 | 466 | 466 | 466 | 466 | 466 | 1 | X |

In the above Table 3, T1 refers to the time slot of the i-th resource, and in the disclosure, T0 refers to T0=0 as the first resource, when T1>0, T1 and T2 refer to the time slot information of the second and third resource, respectively, and when T1=0, T2 refers to the time slot information of the second resource, and is a slot offset from the first resource.

As an example, consider the case where W=32 and Nmax=3. In this case, $\lceil \log_2(\Sigma_{i=0}^{2} \binom{31}{i})\rceil = 9$ bits are needed to apply this method.

Second Embodiment

The second embodiment provides a method and an apparatus for applying a location at which a demodulation reference signal (DMRS) for data transmission, that is, PSSCH transmission, is transmitted/received in sidelink communication.

In a wireless communication system, it may be necessary to amplify the strength of signals while the terminal receives the signal. To this end, signal processing is performed after the received signal is passed through an amplifier to amplify the intensity of the signal, and an amplifier capable of varying the degree of amplification of the signal may be used. Each amplifier may have a range of inputs or outputs having linearity between the inputs and outputs. If the amplification is performed by increasing the amplification degree too high, the output may be determined in a range outside the linearity, and thus the received signal may be deformed, and this deformation may deteriorate the reception performance. Therefore, in order to guarantee the performance, the degree of amplification should be operated in a period having linearity between the input and output of the amplifier. In addition, if the degree of amplification is set too low, the reception performance might not be secured because the amplification of the received signal is not sufficiently amplified. Therefore, the degree of amplification can be continuously adjusted automatically so as to amplify as much as possible in a section with linearity between the input and output of the amplifier, this is called automatic gain control (AGC). The terminal can perform AGC to find an appropriate degree of amplification, and it takes some time to find the appropriate degree of amplification, and this required time is referred to as AGC training time. The signal received during the AGC training time may not be used for actual control and data signal reception, and the AGC training time may be determined according to an initial value configuring of an amplification degree for performing AGC. In sidelink communication in which a terminal to which a signal is transmitted may change continuously, the receiving terminal should continuously perform the AGC, and thus an AGC training time may be required for each signal reception. As described above, as the AGC training time required for the receiving terminal is reduced, the interval of the received signal that the terminal can use for signal processing increases, so that reception performance can be improved.

The transmitting terminal may transmit the preamble signal in one or more symbols before transmitting the sidelink control channel and data. The preamble signal may be used to enable the receiving terminal to correctly perform automatic gain control (AGC) for adjusting the intensity of amplification when amplifying the power of the received signal. A PSCCH including control information is transmitted in initial symbols of a slot, and a PSSCH scheduled by the control information of the PSCCH may be transmitted. A part of SCI, which is control information, may be mapped to the PSSCH and transmitted. A preamble signal for performing AGC may be separately transmitted in the physical channel structure in the sidelink slot, but the sidelink channel and signal to be transmitted in the second symbol may be copied and transmitted in the first symbol, and the receiving terminal may perform AGC using this.

Figure 10A:
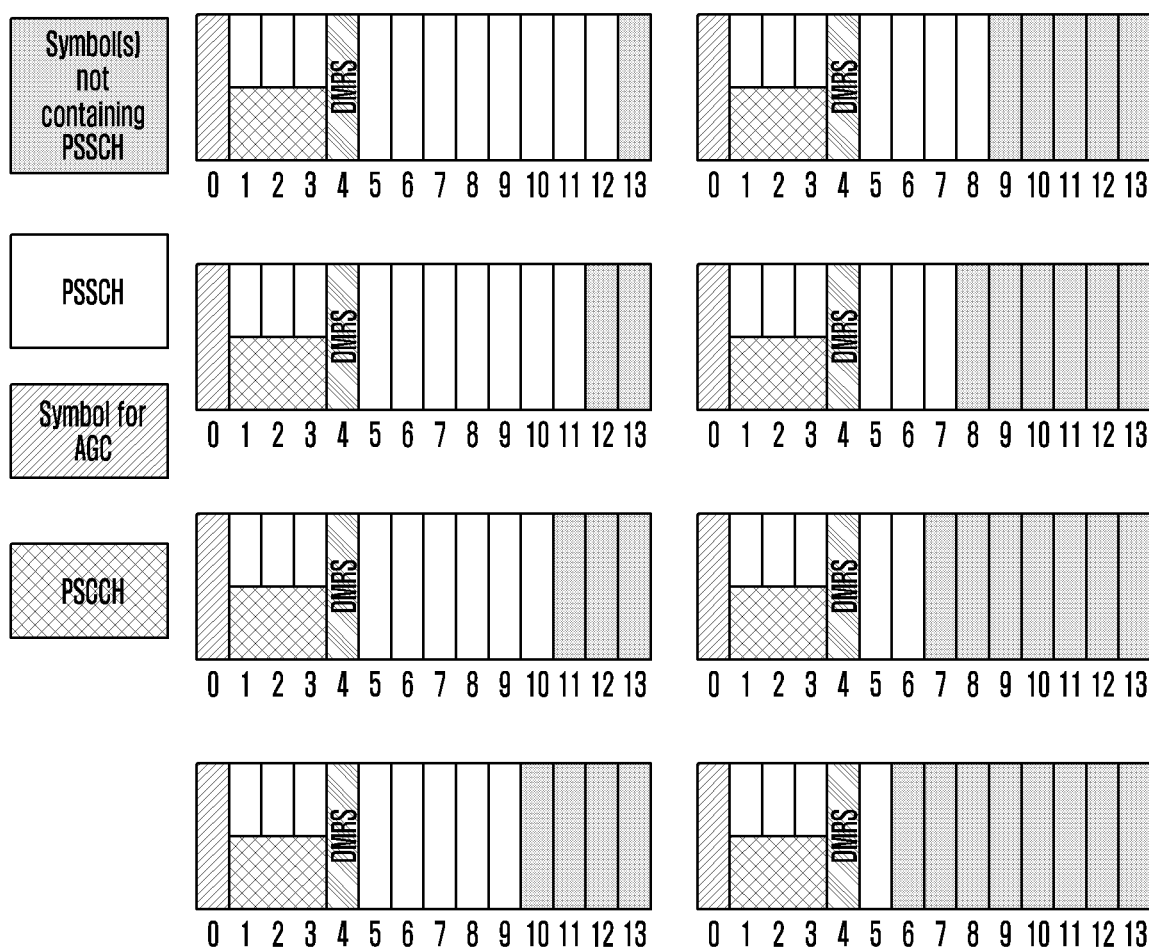
FIGS. 10A, 10B, 10C, and 10D are diagrams illustrating a method of determining demodulation reference signal (DMRS) time resources according to various embodiments of the disclosure.
Figure 10B:
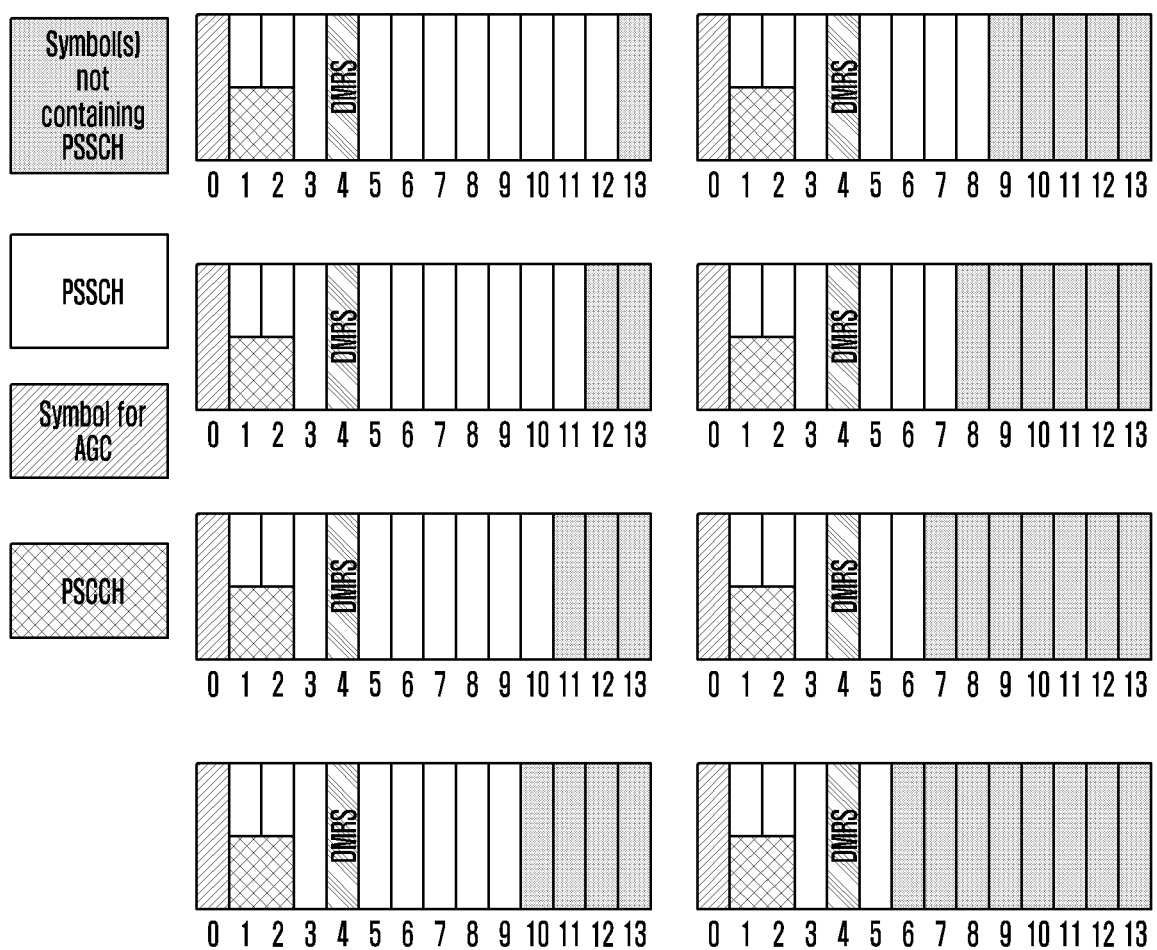

FIGS. 10A, 10B, 10C, and 10D are diagrams illustrating a method of determining DMRS time resources according to various embodiments of the disclosure. FIGS. 10A and 10B are diagrams illustrating positions of symbols including DMRSs when one symbol is used for DMRS transmitted in one slot in sidelink transmission/reception. Referring to FIG. 10A, it illustrates an example when a control channel (PSCCH) is transmitted in three symbols, and FIG. Referring to 10B, it illustrates an example when a PSCCH is transmitted in two symbols. According to the embodiment of FIGS. 10A and 10B, the DMRS symbol position is determined irrespective of the number of symbols in which the PSCCH is transmitted, and thus can have an advantage of being easy for terminal implementation. A symbol for performing AGC required for sidelink reception may be transmitted in the first symbol, and transmission in this symbol may be irrelevant to the DMRS. For example, it is not necessary to decode the signal transmitted in the first symbol using DMRS. Therefore, DMRS may be modified or delayed compared to the NR system of the related art. In addition, the DMRS symbol is not located in the first symbol, because if AGC is performed in the first symbol, it might not be well utilized for channel estimation for demodulation and decoding.

Figure 10C:
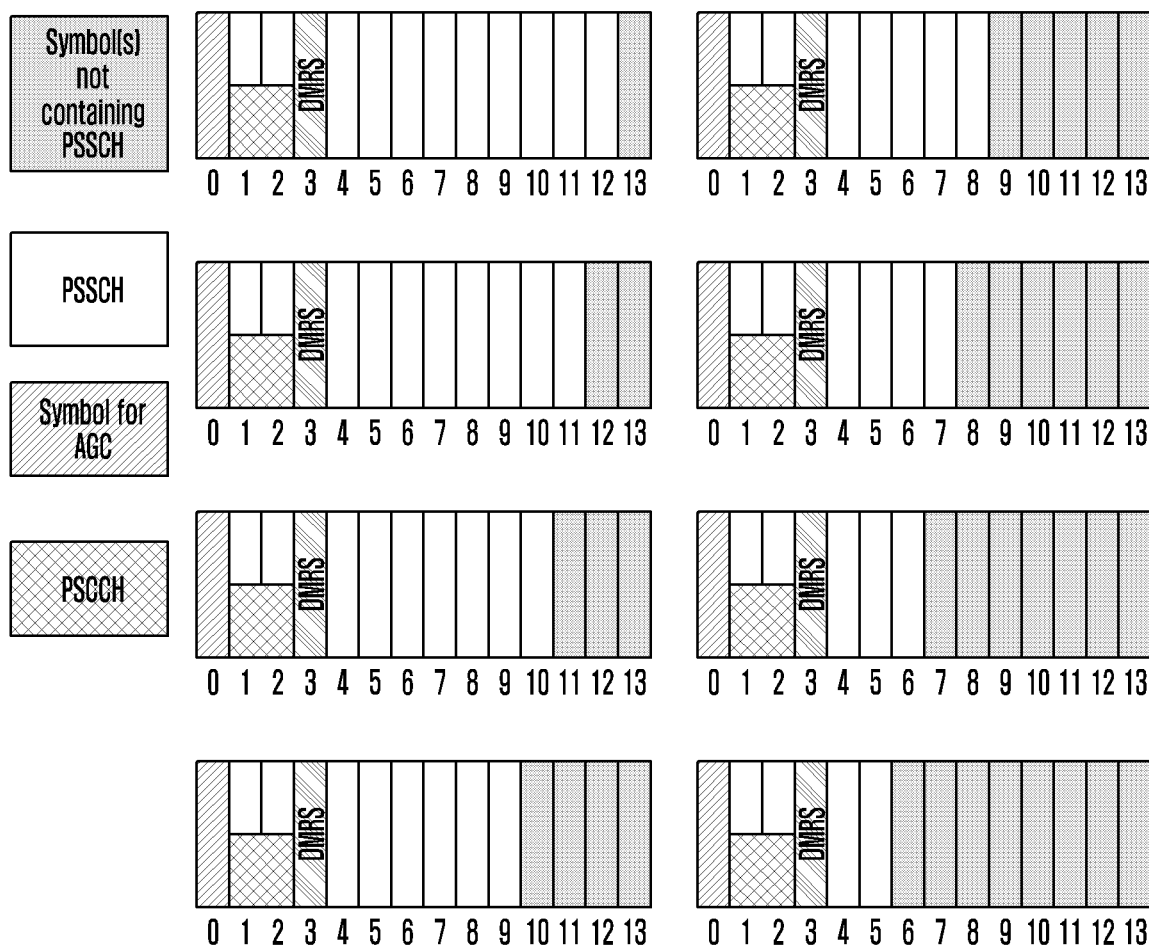

FIG. 10C is a diagram illustrating a case where a PSCCH is transmitted in two symbols. Referring to FIG. 10C, the DMRS has a structure in which the DMRS can be transmitted immediately after the PSSCH, and this may be to enable channel estimation to be performed as quickly as possible.

In sidelink transmission/reception, it may be applied to transmission/reception between terminals including at least one of the DMRS symbol positions illustrated in FIGS. 10A, 10B, and 10C.

In sidelink transmission/reception, a part of the pattern provided in FIG. 10A, a part of the pattern provided in FIG. 10B, or a part of the pattern provided in FIG. 10C may be applied or combined to be applied to transmission/reception between terminals according to configuration. In the above, the pattern may refer to the position of the DMRS in the slot.

The positions of the symbols in which the DMRS is transmitted described in this embodiment may be changed and applied to other possible positions according to the subcarrier spacing of the resource on which sidelink transmission is performed.

In addition, the positions of the symbols in which the DMRS is transmitted described in this embodiment may be applied by combining patterns of different positions according to the assigned length of the PSSCH. In the above, the assigned length of the PSSCH may be the number of symbols used for PSSCH transmission including DMRS excluding AGC symbols.

In addition, in the method provided in this embodiment of the disclosure, a PSSCH may be mapped to a DMRS symbol according to availability of the resources.

In addition, in the method provided in this embodiment of the disclosure, a part of control information may be mapped to a DMRS symbol according to the availability of the resources or resources of the PSSCH.

Figure 10D:
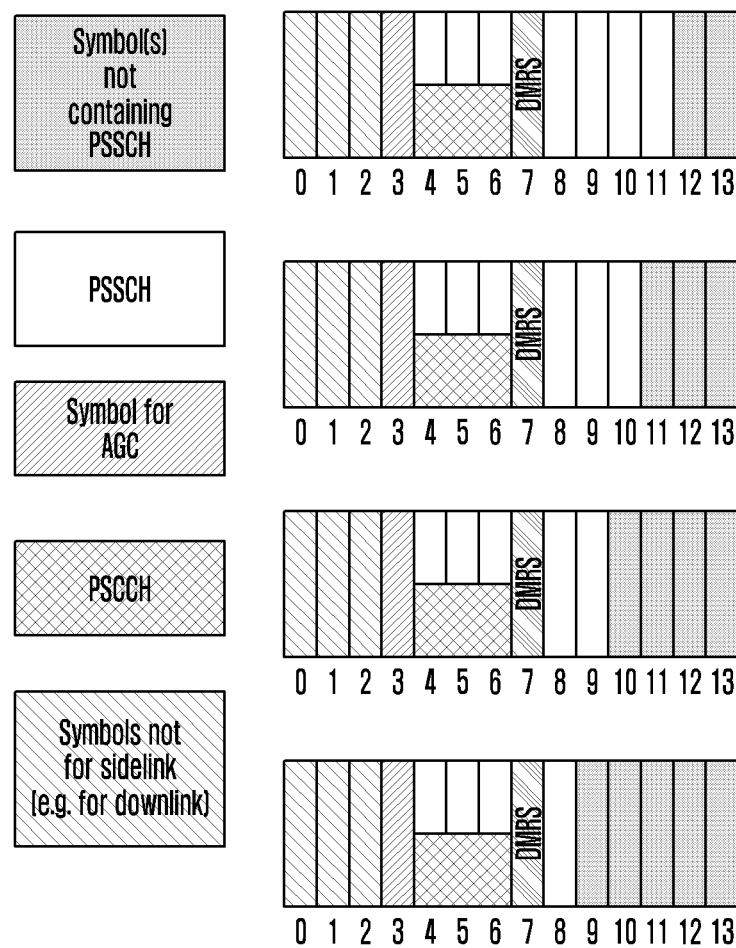
Figure 11A:
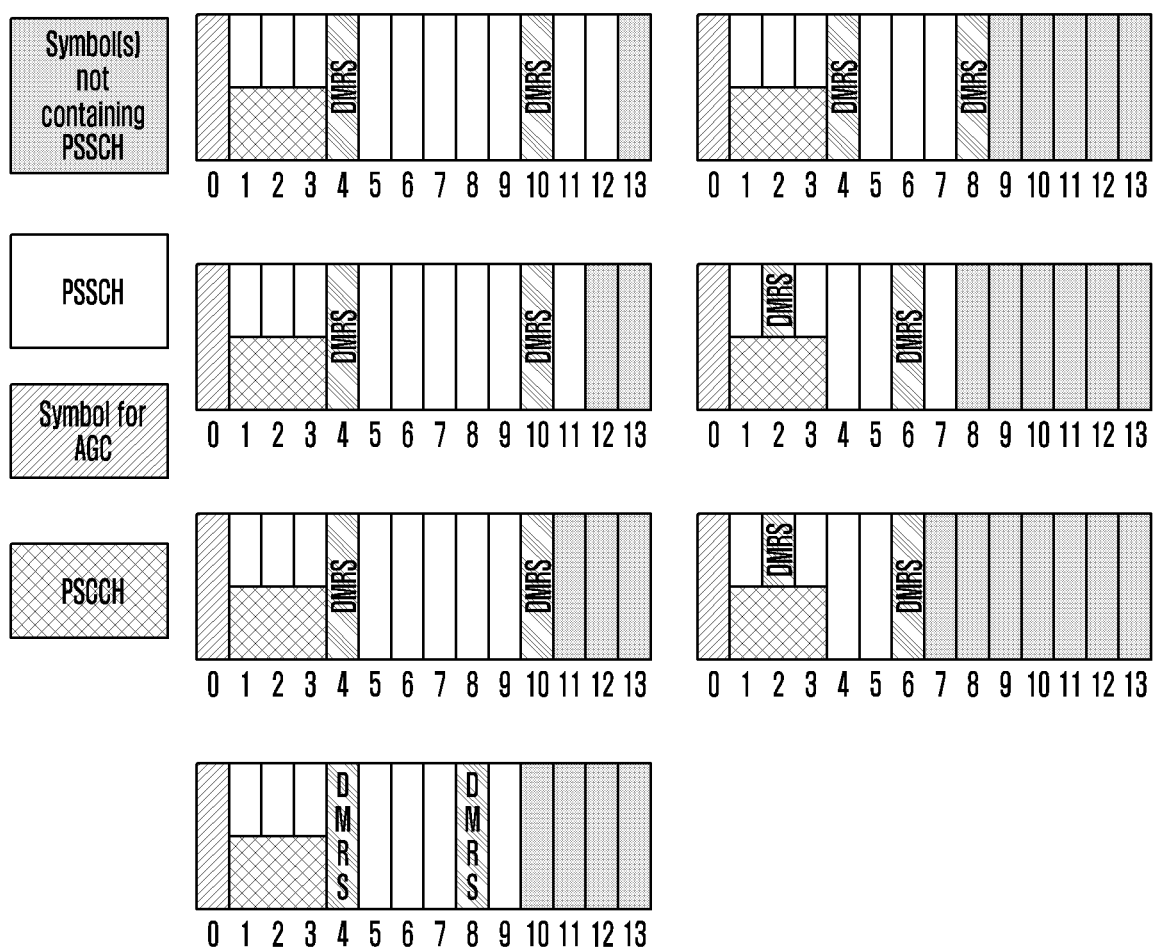
FIGS. 11A, 11B, and 11C are diagrams illustrating a method of determining DMRS time resources according to various embodiments of the disclosure.
Figure 11B:
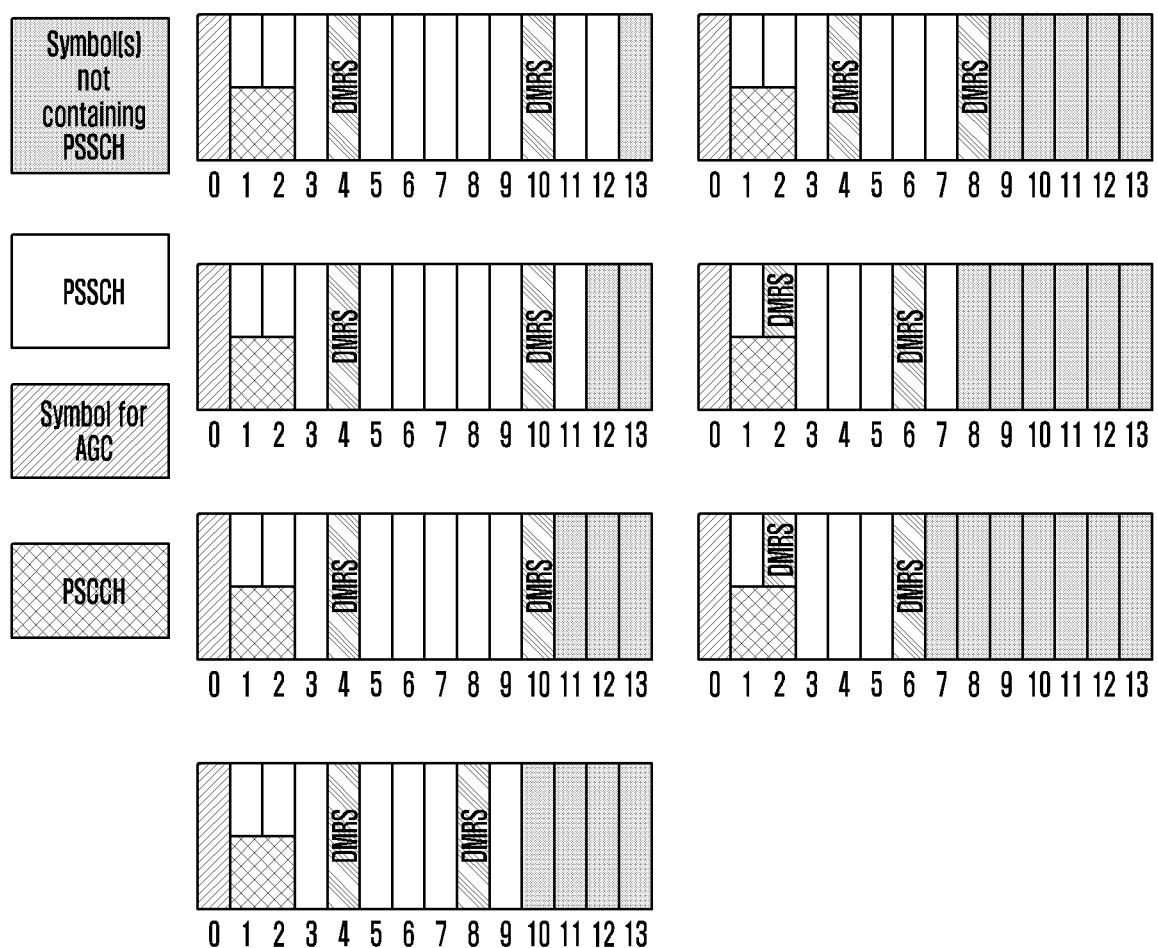
Figure 11C:
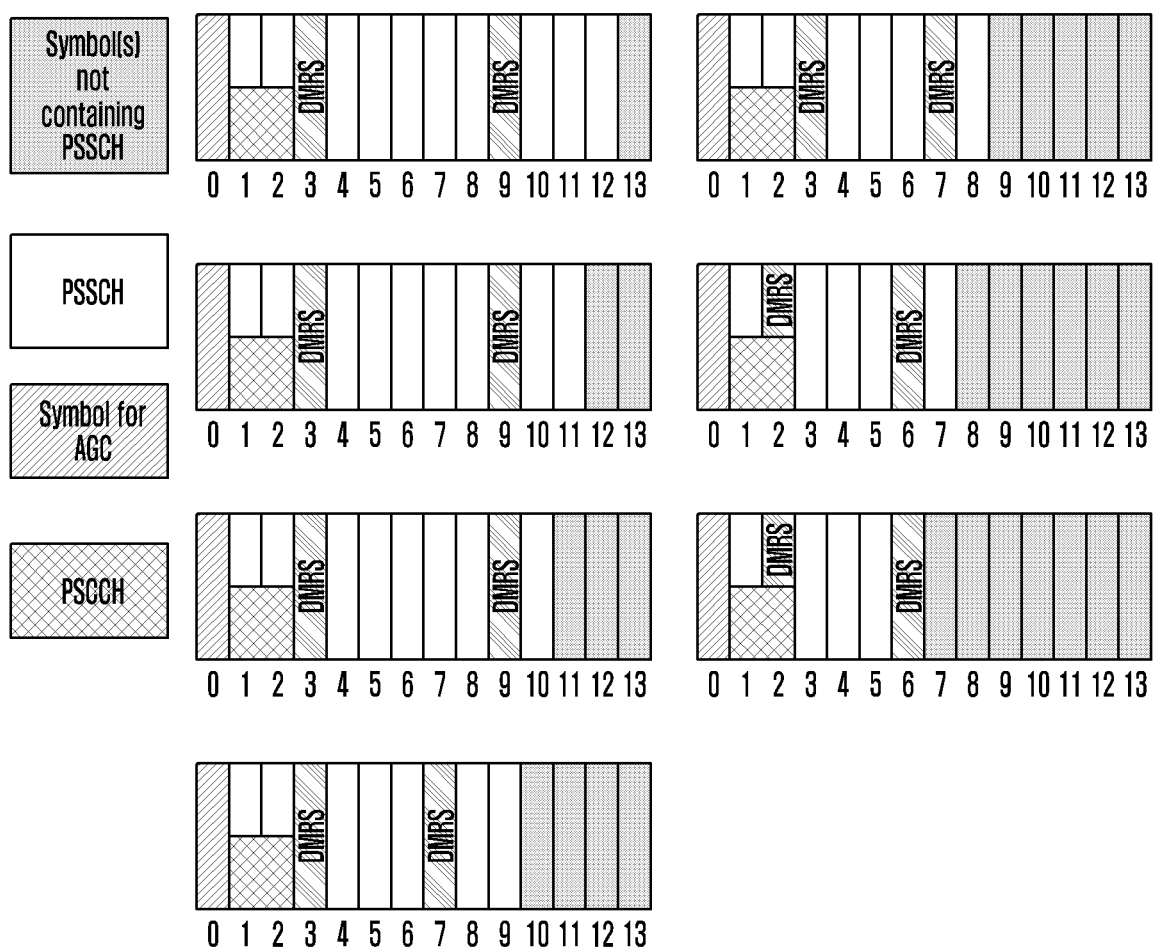

The DMRS pattern provided in this embodiment may be a physically absolute symbol position within a slot, but may be a relative symbol position according to an applied example. For example, the position of the DMRS symbol may be changed according to the positions of symbols used for the sidelink within the slot. For example, when p is the index of the first symbol of the PSCCH, the position of the DMRS symbol provided in the embodiment may be given as a relative offset value from p. Referring to FIG. 10D, it illustrates an embodiment in which a part of FIG. 10A is applied when the first three symbols in a slot are used for downlink. FIGS. 11A, 11B, and 11C are diagrams illustrating a method of determining a DMRS time resource according to various embodiments of the disclosure.

FIGS. 11A and 11B are diagrams illustrating positions of symbols including DMRSs when DMRSs transmitted in one slot are transmitted in two symbols in sidelink transmission/reception. Referring to FIG. 11A, it illustrates an example when a control channel (PSCCH) is transmitted in three symbols, and referring to FIG. 11B, it illustrates shows an example when a PSCCH is transmitted in two symbols. According to the embodiments of FIGS. 11A and 11B, the DMRS symbol position is determined irrespective of the number of symbols in which the PSCCH is transmitted, and thus can have an advantage of being easy for terminal implementation. A symbol for performing AGC required for sidelink reception may be transmitted in the first symbol, and transmission in this symbol may be irrelevant to the DMRS. For example, it is not necessary to decode the signal transmitted in the first symbol using DMRS. Therefore, DMRS may be modified or delayed compared to the NR system of the related art. In addition, the DMRS symbol is not located in the first symbol, because if AGC is performed in the first symbol, it might not be well utilized for channel estimation for demodulation and decoding.

Referring to FIG. 11C, it is a diagram illustrating a case where a PSCCH is transmitted in two symbols. In FIG. 11C, the DMRS has a structure in which the DMRS can be transmitted immediately after the PSSCH, and this may be to enable channel estimation to be performed as quickly as possible.

In sidelink transmission/reception, it may be applied to transmission/reception between terminals including at least one of the DMRS symbol positions shown in FIGS. 11A, 11B, and 11C.

In sidelink transmission/reception, a part of the pattern provided in FIG. 11A, a part of the pattern provided in FIG. 11B, or a part of the pattern provided in FIG. 11C may be applied or combined to be applied to transmission/reception between terminals according to a configuration. In the above, the pattern may refer to the position of the DMRS in the slot.

FIGS. 12A, 12B, 12C, and 12D are diagrams illustrating a method of determining DMRS time resources according to various embodiments of the disclosure.

Figure 12A:
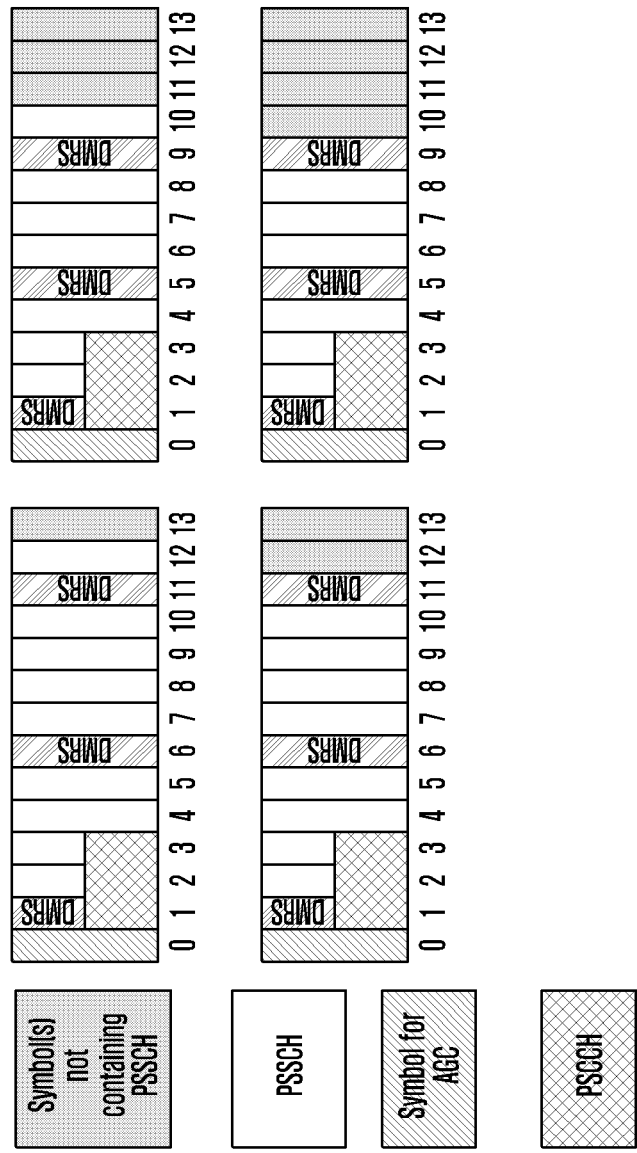
FIGS. 12A, 12B, 12C, and 12D are diagrams illustrating a method of determining DMRS time resources according to various embodiments of the disclosure.
Figure 12B:
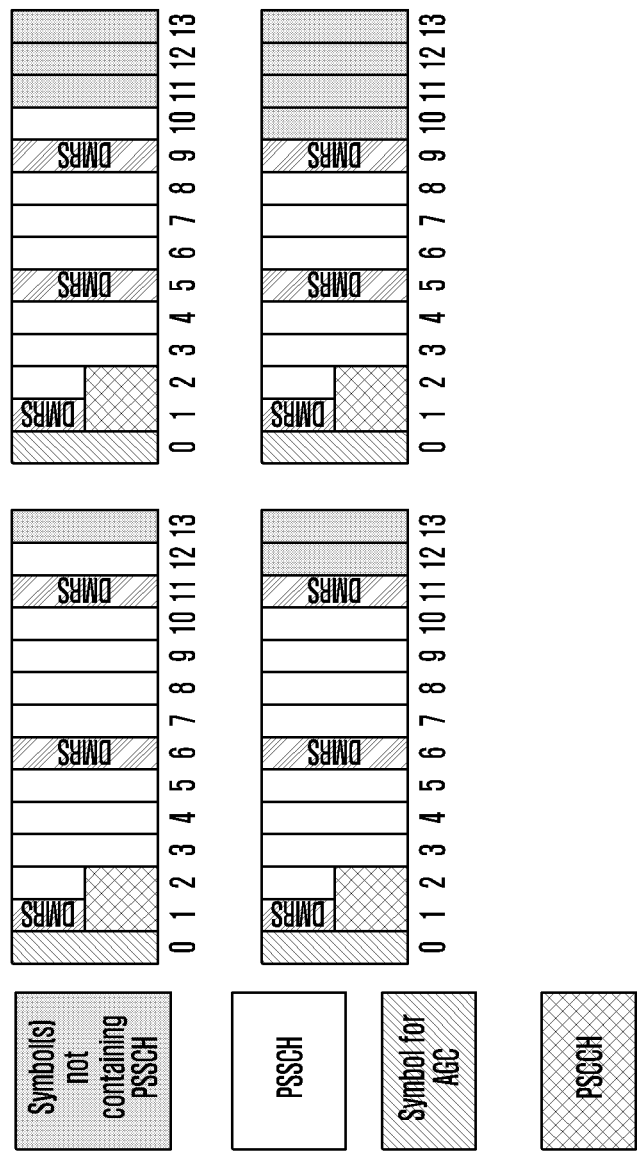
Figure 12C:
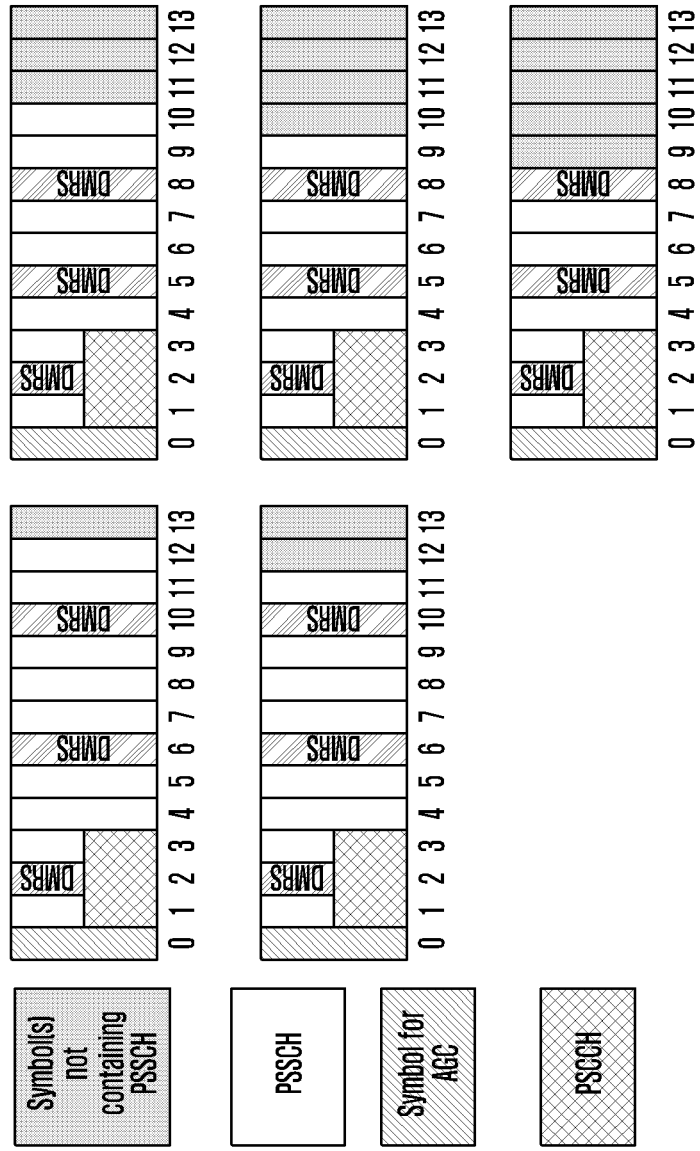
Figure 12D:
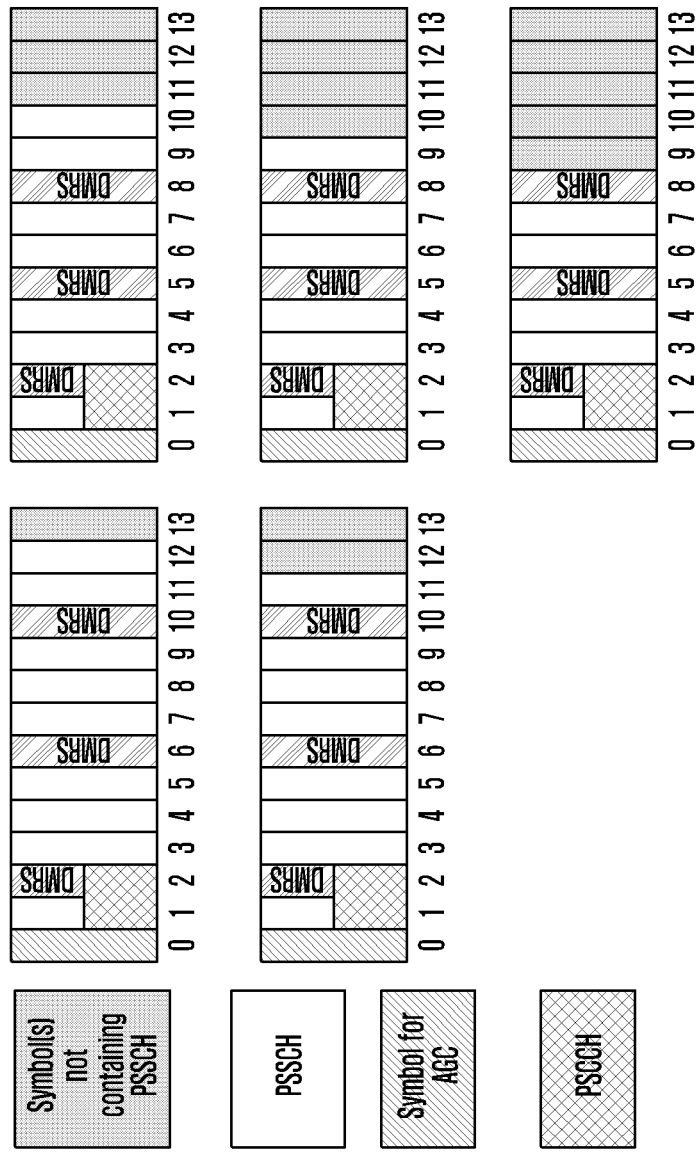

Referring to FIGS. 12A, 12B, 12C, and 12D, they are diagrams illustrating positions of symbols including DMRSs when DMRSs transmitted in one slot are transmitted in three symbols in sidelink transmission/reception. FIGS. 12A and 12C illustrate a control channel (PSCCH) being transmitted in three symbols, and FIGS. 12B and 12D illustrate when a PSCCH being transmitted in two symbols. When FIGS. 12A and 12B are used together, or when FIGS. 12C and 12D are used together, the position of the DMRS symbol is determined regardless of the number of symbols to which the PSCCH is transmitted, and thus, it may have an advantage of being easy for terminal implementation. A symbol for performing AGC required for sidelink reception may be transmitted in the first symbol, and transmission in this symbol may be irrelevant to the DMRS. For example, it is not necessary to decode the signal transmitted in the first symbol using DMRS. Therefore, DMRS can be modified or delayed compared to the NR system of the related art. In addition, the DMRS symbol is not located in the first symbol, because if AGC is performed in the first symbol, it might not be well utilized for channel estimation for demodulation and decoding.

In sidelink transmission/reception, it may be applied to transmission/reception between terminals including at least one of the DMRS symbol positions shown in FIGS. 12A, 12B, 12C, and 12D.

In sidelink transmission/reception, a part of the pattern provided in FIG. 12A, a part of the pattern provided in FIG. 12B, or a part of the pattern provided in FIG. 12C, or a part of the pattern provided in FIG. 12D may be applied or combined to be applied to transmission/reception between terminals according to configurations. In the above, the pattern may refer to the position of the DMRS in the slot.

FIGS. 13A, 13B, 13C, 13D, 13E, 13F, and 13G are diagrams illustrating a method of determining DMRS time resources according to various embodiments of the disclosure.

Figure 13A:
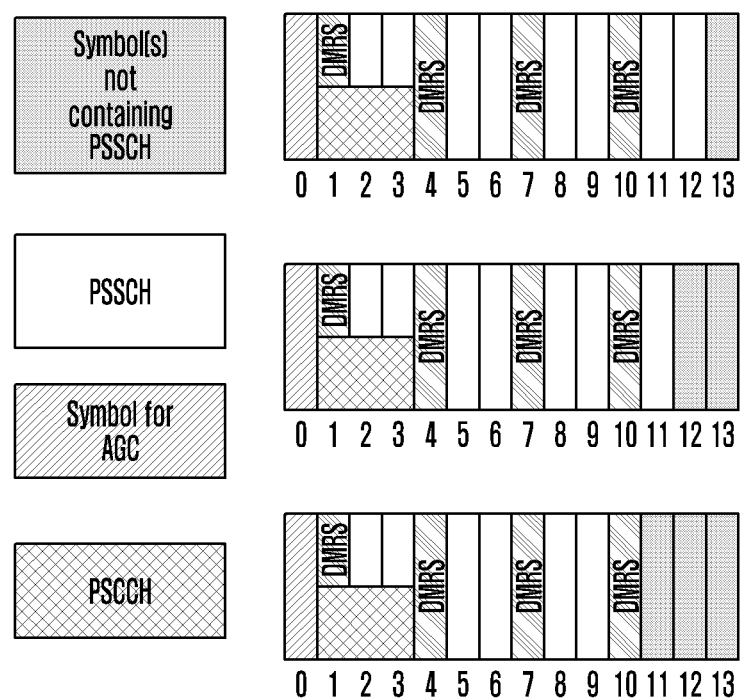
FIGS. 13A, 13B, 13C, 13D, 13E, 13F, and 13G are diagrams illustrating a method of determining DMRS time resources according to various embodiments of the disclosure.
Figure 13B:
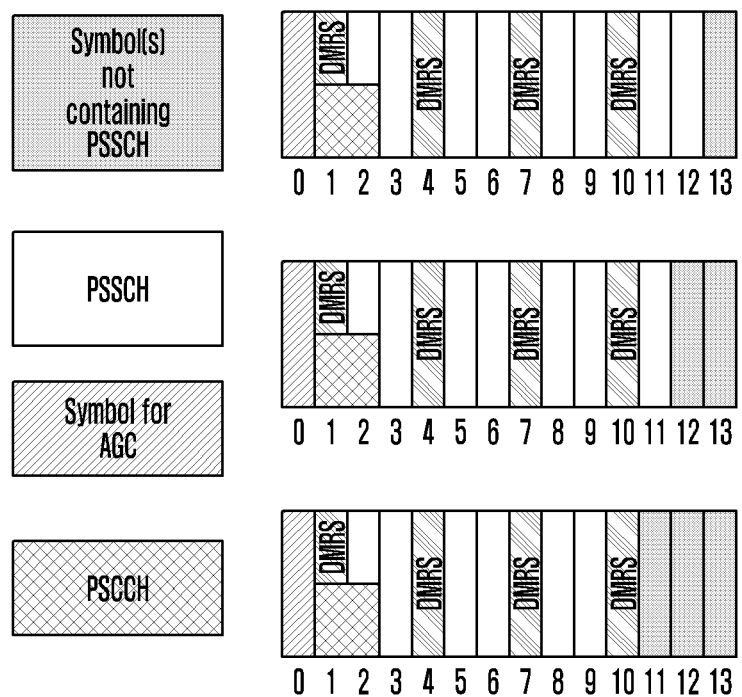
Figure 13C:
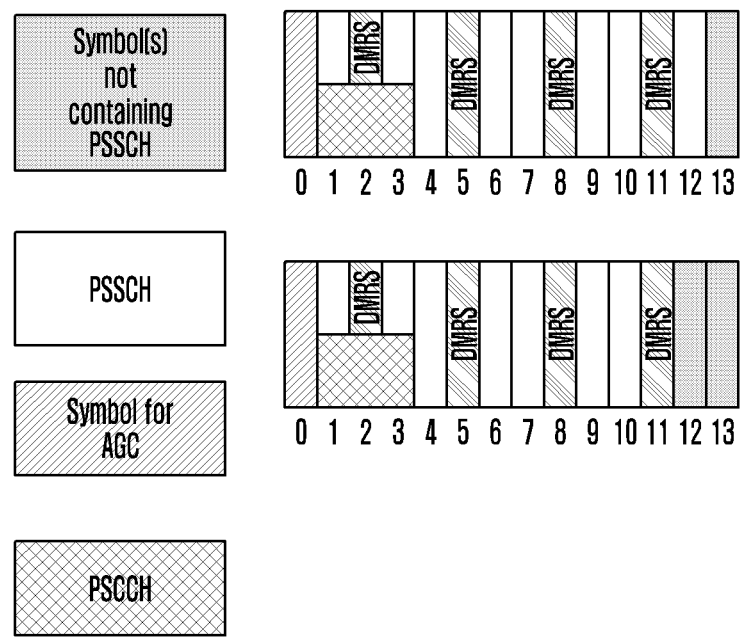
Figure 13D:
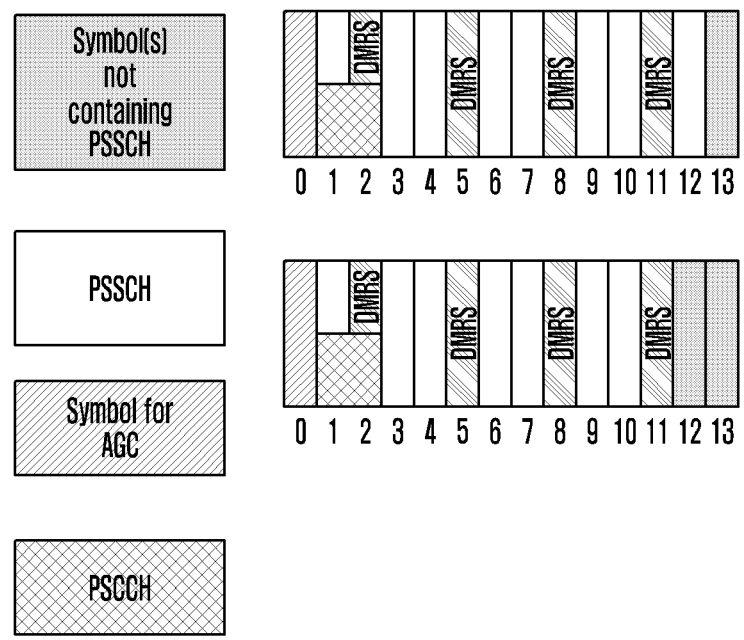

Referring to FIGS. 13A, 13B, 13C, and 13D, they are diagrams illustrating positions of symbols including DMRS when DMRS transmitted in one slot is transmitted in four symbols in sidelink transmission/reception. FIGS. 13A and 13C illustrate a control channel (PSCCH) being transmitted in three symbols, and FIGS. 13B and 13D illustrate when a PSCCH being transmitted in two symbols. When FIG. 13A and FIG. 13B are used together, or when FIG. 13C and FIG. 13D are used together, the position of the DMRS symbol may be determined irrespective of the number of symbols to which the PSCCH is transmitted, and thus can have an advantage of being easy for terminal implementation. A symbol for performing AGC required for sidelink reception may be transmitted in the first symbol, and transmission in this symbol may be irrelevant to the DMRS. For example, it is not necessary to decode the signal transmitted in the first symbol using DMRS. Therefore, DMRS can be modified or delayed compared to the NR system of the related art. In addition, the DMRS symbol is not located in the first symbol, because if AGC is performed in the first symbol, it might not be well utilized for channel estimation for demodulation and decoding.

In sidelink transmission/reception, it may be applied to transmission/reception between terminals including at least one of the DMRS symbol positions shown in FIGS. 13A, 13B, 13C, and 13D.

In sidelink transmission and reception, a part of the pattern provided in FIG. 13A, a part of the pattern provided in FIG. 13B, a part of the pattern provided in FIG. 13C, or a part of the pattern provided in FIG. 13D may be applied or combined to be applied to transmission/reception between terminals according to configurations. In the above, the pattern may refer to the position of the DMRS in the slot.

Figure 13E:
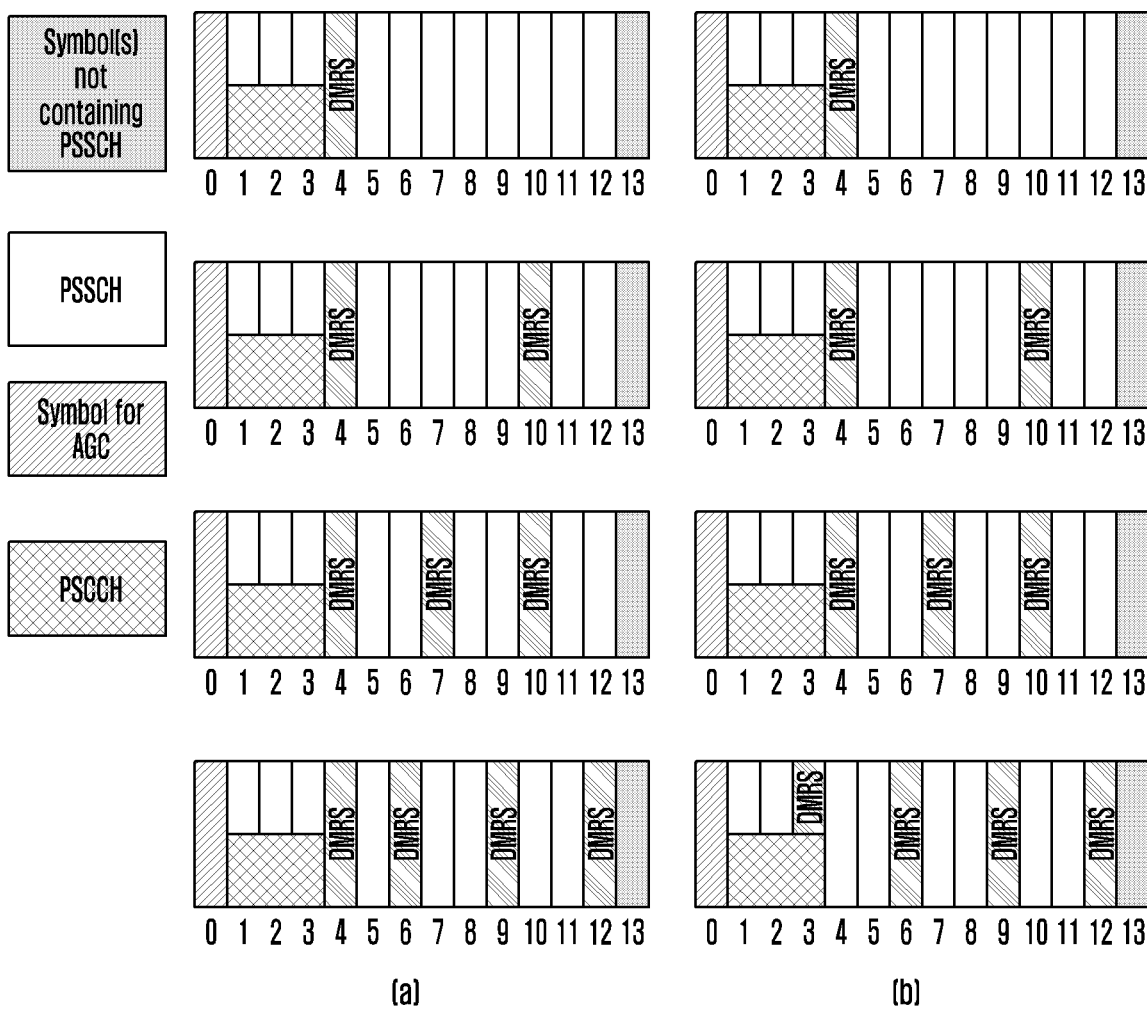

In the above, FIGS. 13C and 13D may illustrate a scheme in which the relative position of the downlink DMRS symbol is maximally reused in the NR system of the related art. Specifically, for example, part (a) of FIG. 13E illustrates DMRS being transmitted in 1, 2, 3, or 4 symbols, based on a method of reusing the relative position of a downlink DMRS symbol in an NR system. Part (b) of FIG. 13E illustrates DMRS being transmitted in 1, 2, 3, or 4 symbols, based on a method of reusing the relative position of the downlink DMRS symbol as much as possible in the NR system. Part (b) of FIG. 13E may illustrates a method of increasing the decoding performance of the PSSCH by increasing the position of the first DMRS symbol by one compared to part (a) of FIG. 13E. Of course, the DMRS location provided in parts (a) or (b) of FIG. 13E may be applied in combination with the DMRS location provided above.

Figure 13F:
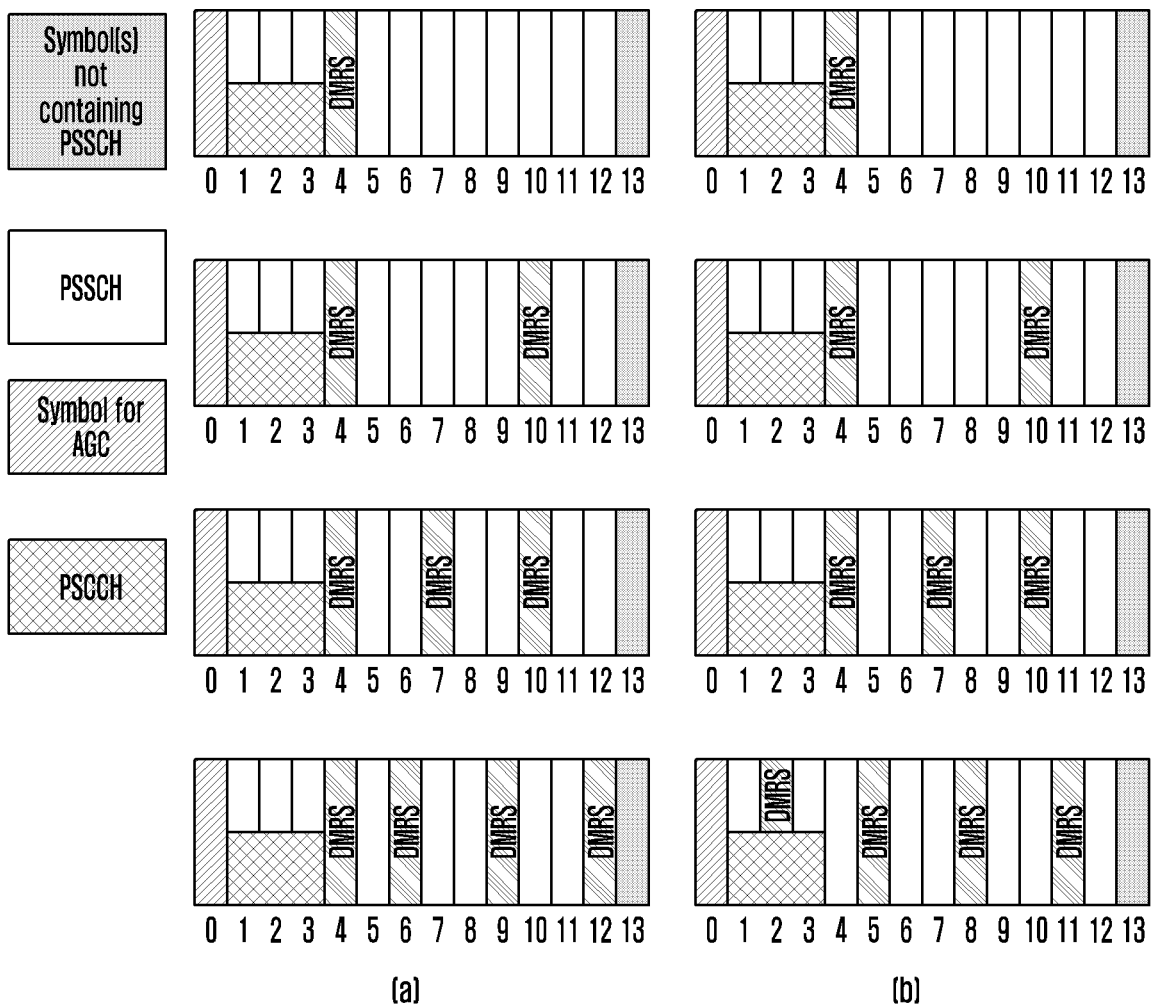
Figure 13G:
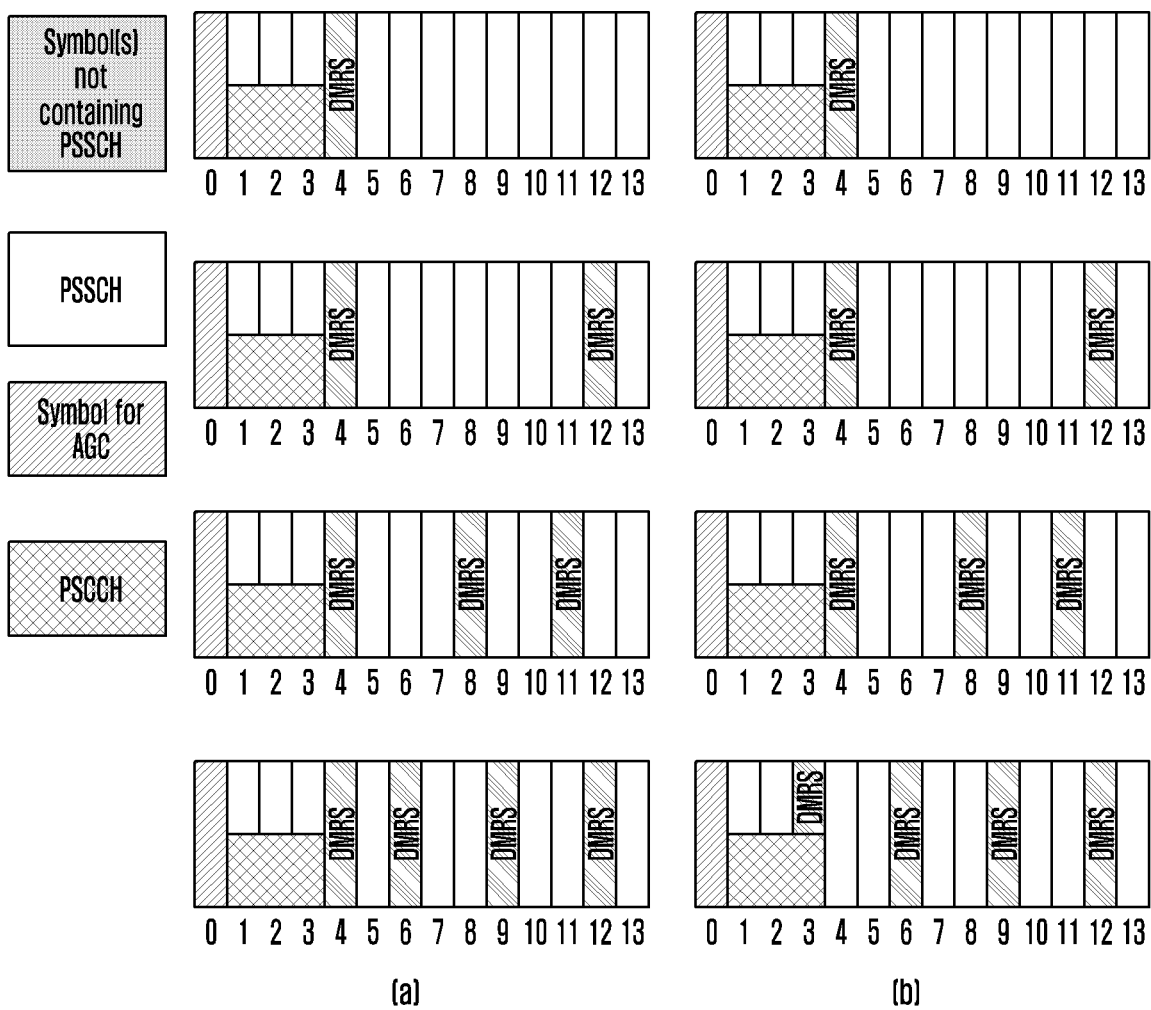

Referring to FIG. 13E, it may be modified and applied as shown in FIG. 13F or 13G.

Third Embodiment

The third embodiment provides another example of a method and an apparatus for transmitting a DMRS in sidelink data transmission including communication between terminals.

FIGS. 14A, 14B, 14C, 14D, and 14E are diagrams illustrating a method of determining DMRS time resources according to various embodiments of the disclosure.

In this embodiment of the disclosure, another example in which the relative position of a downlink DMRS symbol, that is, a DMRS symbol of a PDSCH, is reused as much as possible in an NR system of the related art is provided. In addition, the embodiment provides another example in which the relative position of an uplink DMRS symbol, that is, a DMRS symbol of a PUSCH, is maximally reused in an NR system of the related art. The DMRS symbol of the PUSCH mentioned above may vary according to the PUSCH type of the NR system. In the case of PUSCH type A, the position of the DMRS symbol is the same as the position of the DMRS symbol of the PDSCH, which is a downlink, and in the case of PUSCH type B, the position of the DMRS symbol is different from the position of the DMRS symbol of the PDSCH, which is a downlink.

If the positions in the slots of the DMRS of the PDSCH and the DMRS of the PUSCH type A defined in the NR system of the related art are regarded as relative positions from the first symbol of the PSCCH, which is a control channel transmitted in the slot of the sidelink, the positions may be applied as in FIGS. 14B, 14C, 14D, and 14E.

Referring to FIGS. 14B, 14C, 14D, and 14E, they are diagrams illustrating patterns including 1, 2, 3, and 4 DMRS symbols, respectively, and each may be patterns used according to parameter values, such as dmrs_number or dmrs-AdditionalPosition, the number of symbols used for PSSCH mapping, and the number of symbols used for PSCCH. For example, when dmrs-AdditionalPosition=pos2 (here, in dmrs-AdditionalPosition, it may refer to the number of additional symbols other than 1, and for example, pos2 may refer to a total of 3 DMRS symbols, that is, posX may be a parameter value that refers to a total of X+1 symbols), one of the illustrated DMRS patterns may be selected and used according to the number of PSSCH symbols and the number of PSCCH symbols among the DMRS patterns illustrated in FIG. 14D.

FIGS. 14B, 14C, 14D, and 14E illustrate patterns in which the location of the first DMRS that appears can be changed according to the number of PSCCH symbols, and the number of PSCCH symbols may be configured in a resource pool or may be determined by a preset value.

Figure 14A:
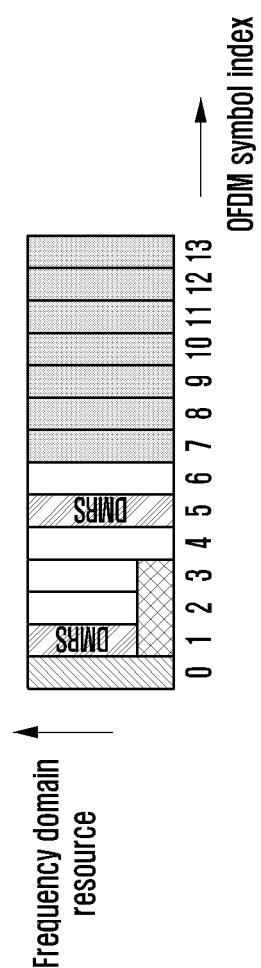
FIGS. 14A, 14B, 14C, 14D, and 14E are diagrams illustrating a method of determining DMRS time resources according to various embodiments of the disclosure.
Figure 14B:
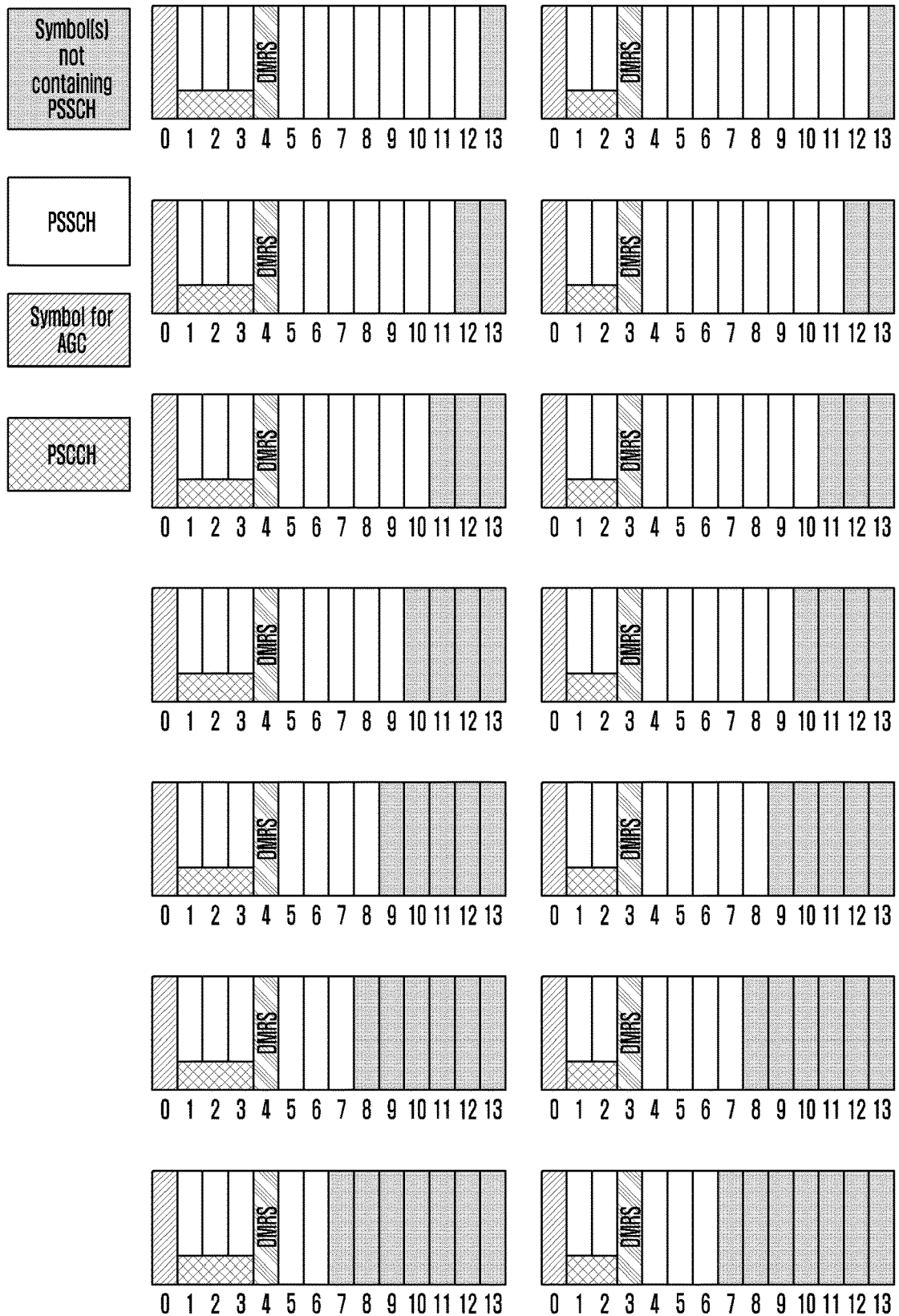
Figure 14C:
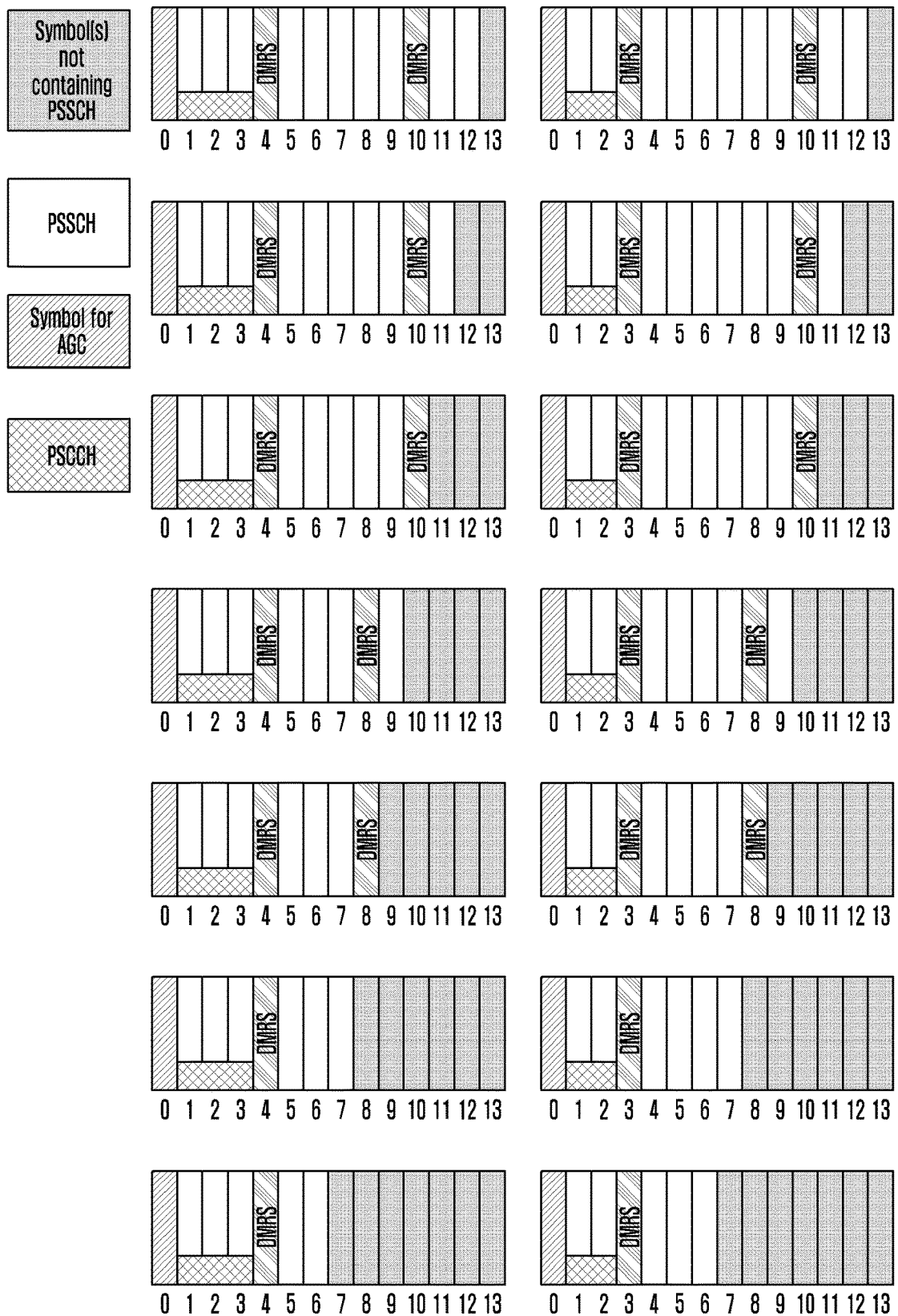
Figure 14D:
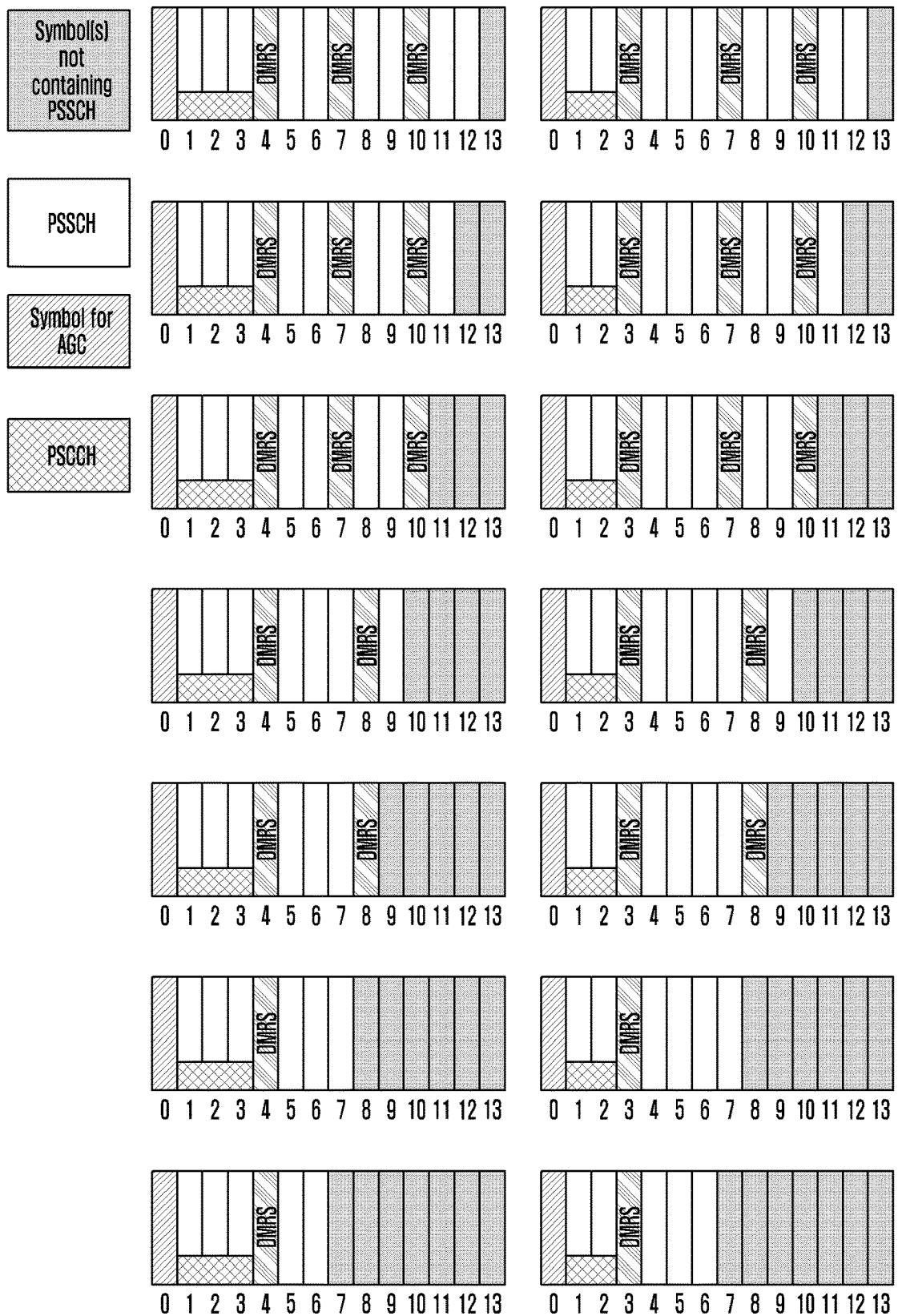
Figure 14E:
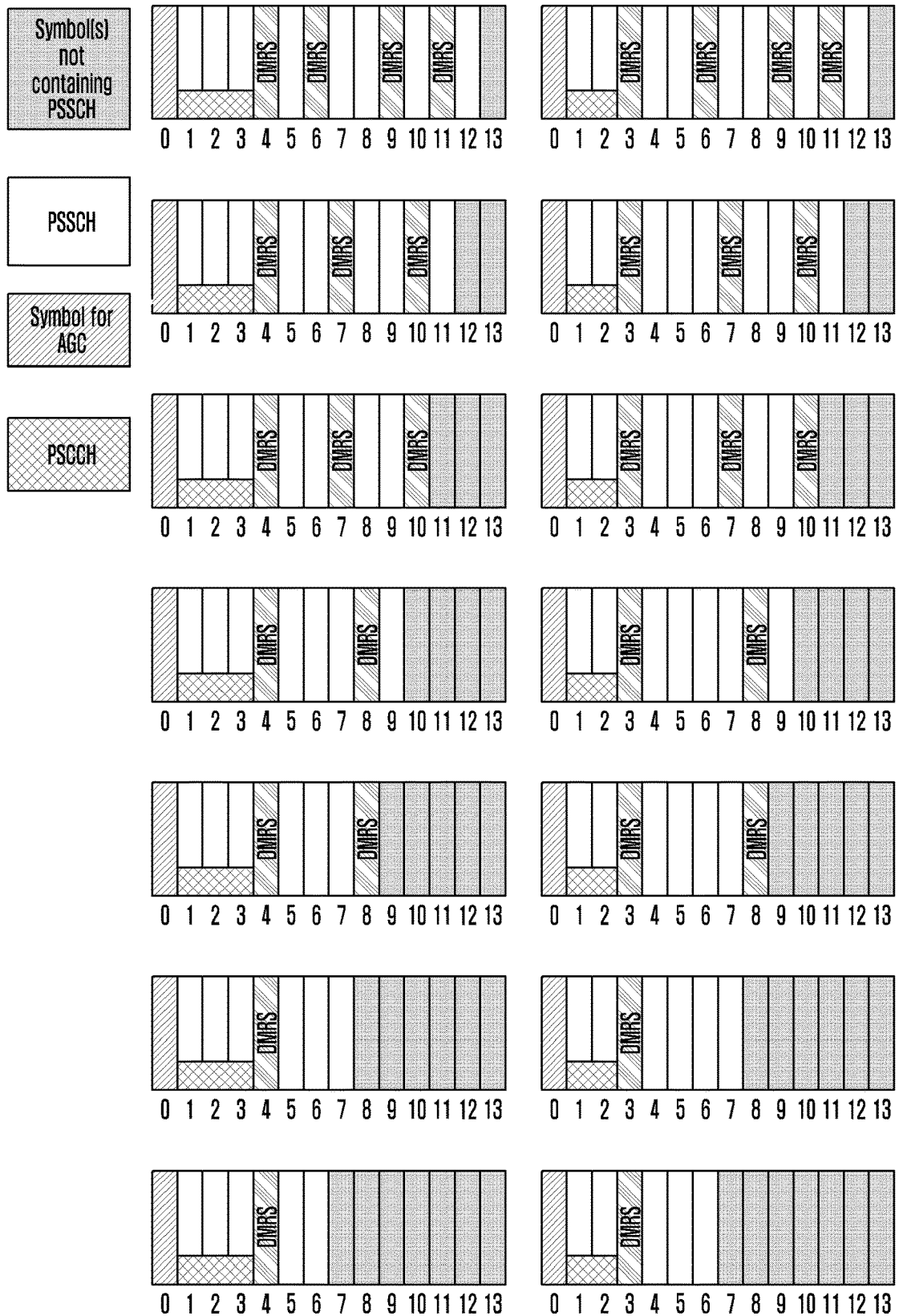
Figure 15A:
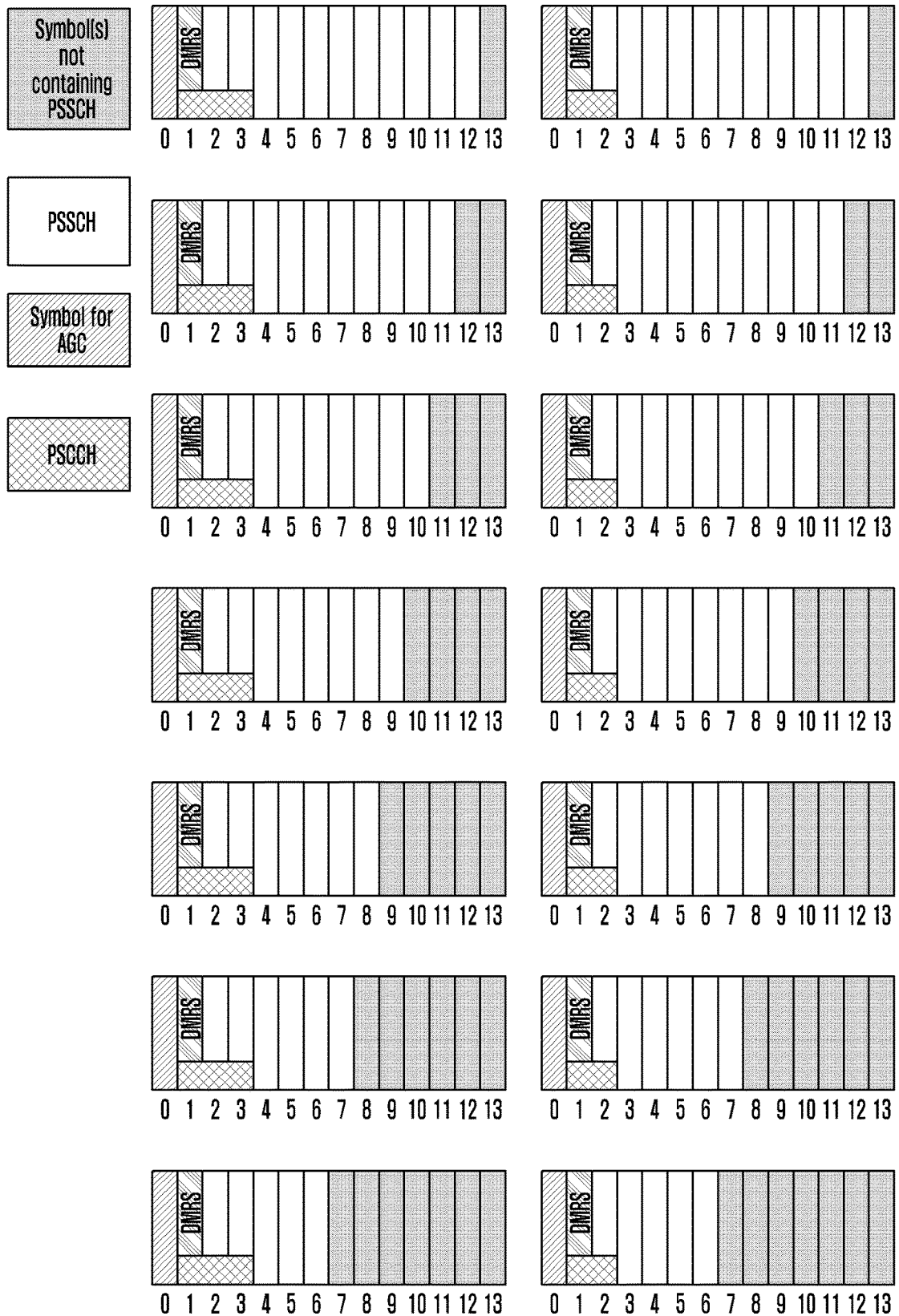
FIGS. 15A, 15B, 15C, and 15D are diagrams illustrating a method of determining DMRS time resources according to various embodiments of the disclosure.
Figure 15B:
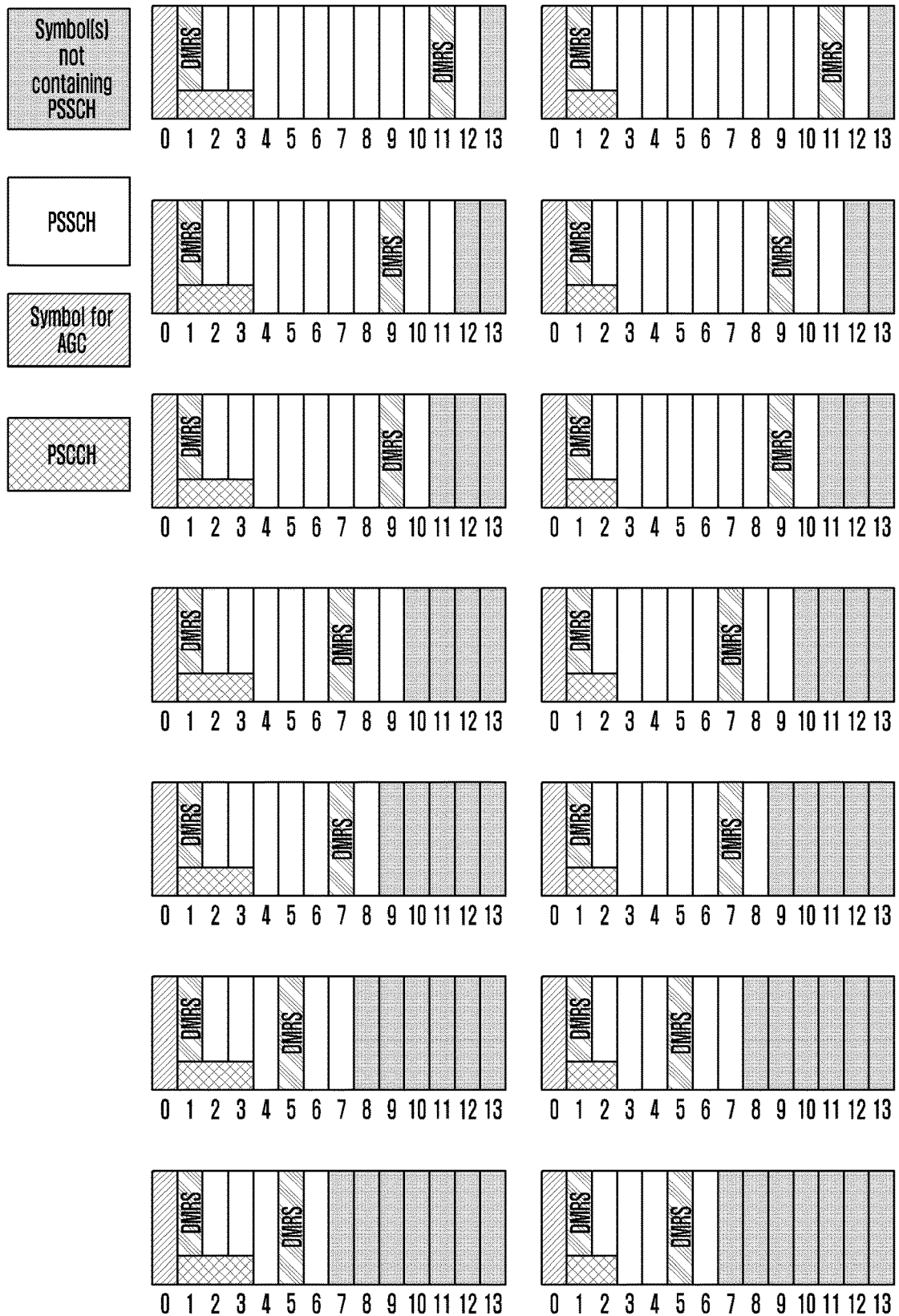
Figure 15C:
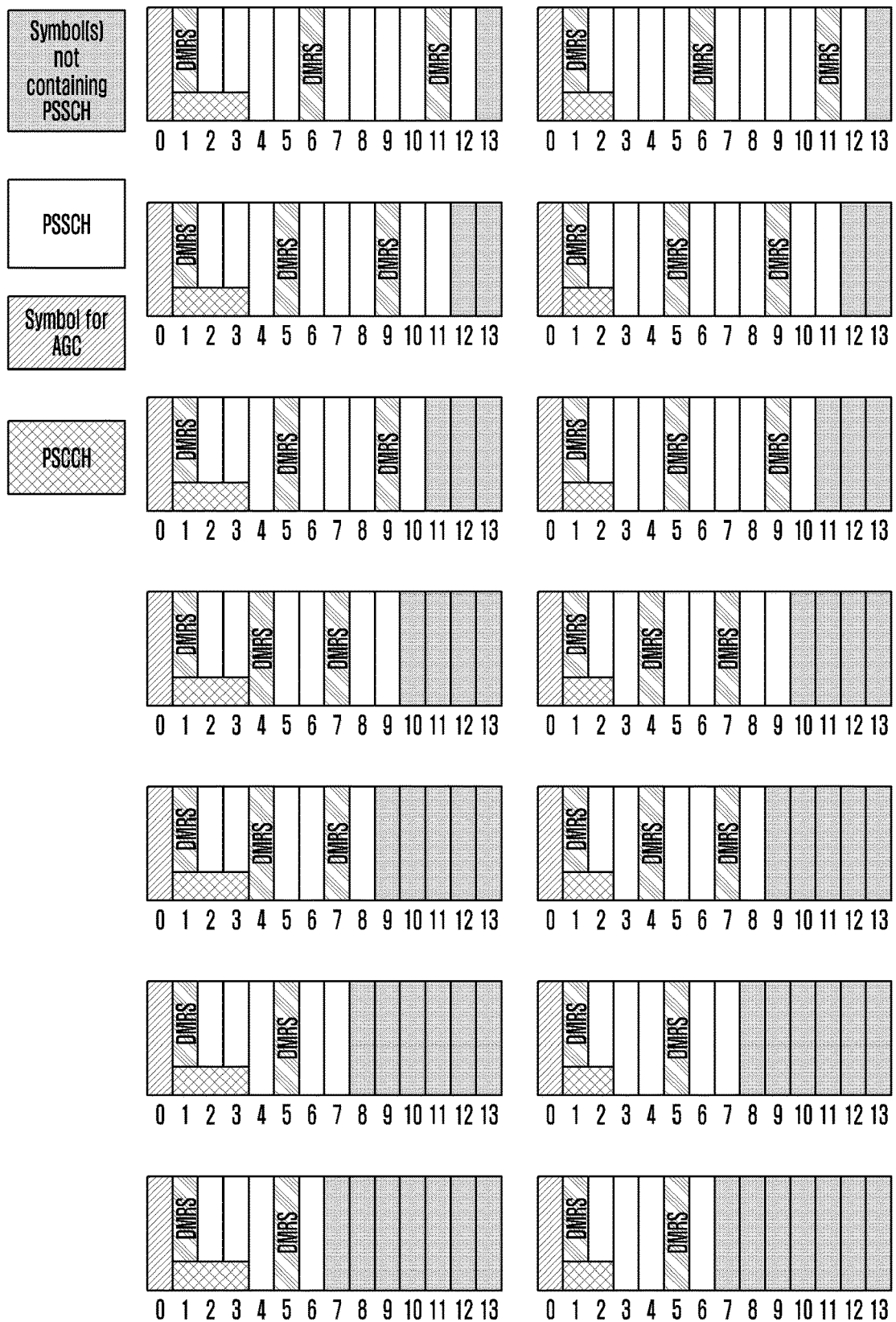
Figure 15D:
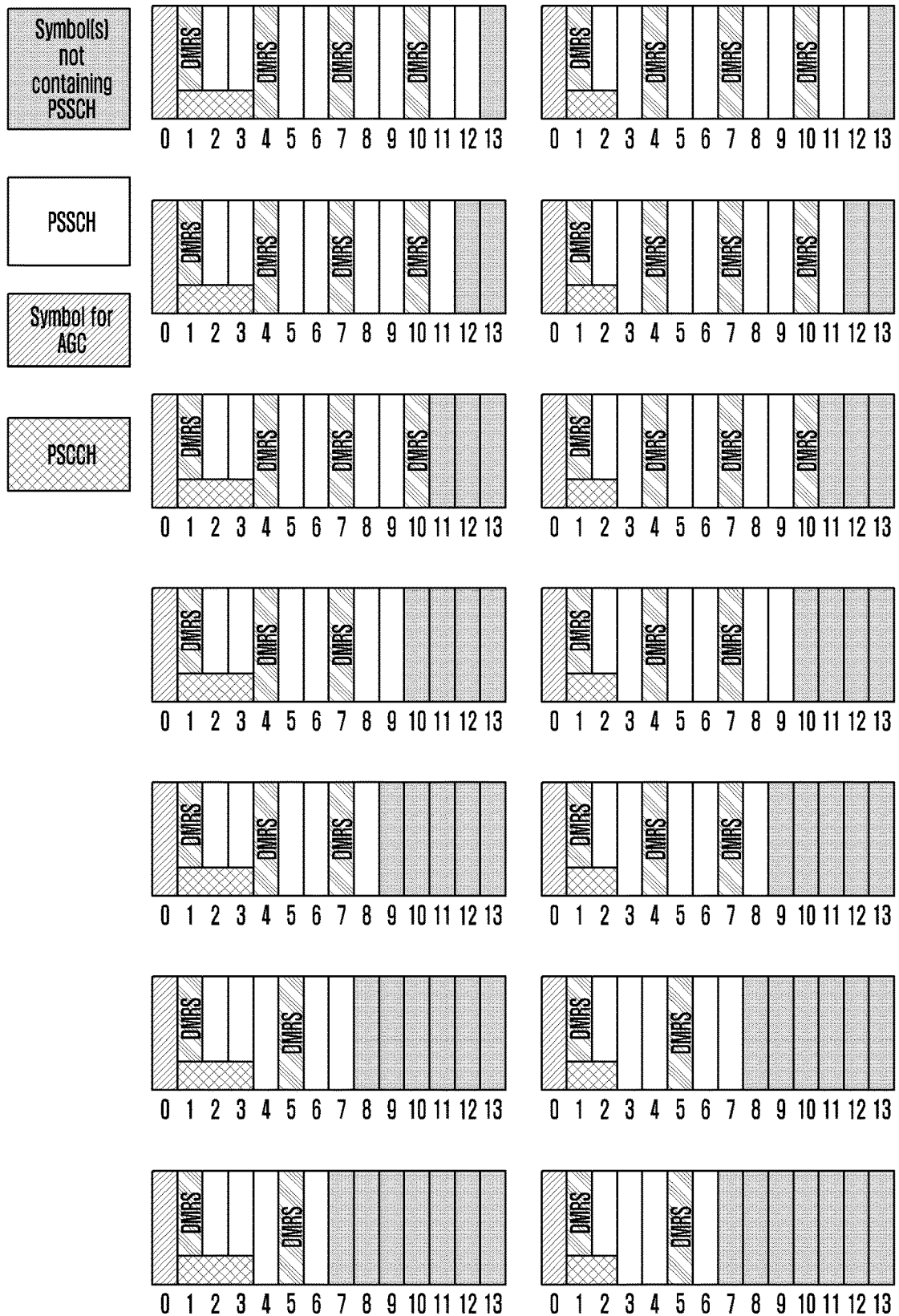

In the diagrams described in this embodiment of the disclosure, diagrams showing what purpose a total of 14 OFDM symbols are used, and as illustrated in FIG. 14A, an OFDM symbol index and a frequency resource are assumed.

FIGS. 15A, 15B, 15C, and 15D are diagrams illustrating a method of determining DMRS time resources according to various embodiments of the disclosure.

According to an embodiment of the disclosure, if the positions in the slot of the DMRS of PUSCH type B defined in an NR system are regarded as relative positions from the first symbol of the PSCCH, which is a control channel transmitted in the slot of the sidelink, the positions may be applied as in FIGS. 15A, 15B, 15C, and 15D.

Referring to FIGS. 15A, 15B, 15C, and 15D, they are diagrams illustrating patterns including 1, 2, 3, and 4 DMRS symbols, respectively, and each may be patterns used according to parameter values, such as dmrs_number or dmrs-AdditionalPosition and the number of symbols used for PSSCH mapping. For example, for example, when dmrs-AdditionalPosition=pos2 (here, dmrs-AdditionalPosition may refer to the number of additional symbols other than 1, and for example, pos2 may refer to a total of 3 DMRS symbols, that is, posX may be a parameter value that means a total of X+1 symbols), one of the illustrated DMRS patterns may be selected and used according to the number of PSSCH symbols among the DMRS patterns illustrated in FIG. 15D.

In the disclosure, the position of the first symbol of the PSCCH, which is the control channel transmitted in the slot of the sidelink, may refer to the second symbol used as the sidelink in the slot.

In the disclosure, the parameter value, such as dmrs_number or dmrs-AdditionalPosition may be a value transmitted from control information (SCI) or first control information (1st stage SCI). Alternatively, the parameter value, such as dmrs_number or dmrs-AdditionalPosition may be a value configured in the resource pool, or may be a value indicated by SCI among values configured in the resource pool. For example, a 2-bit indicator is transmitted in SCI, and the 2-bit indicator may indicate a value of dmrs-AdditionalPosition.

Figure 16:
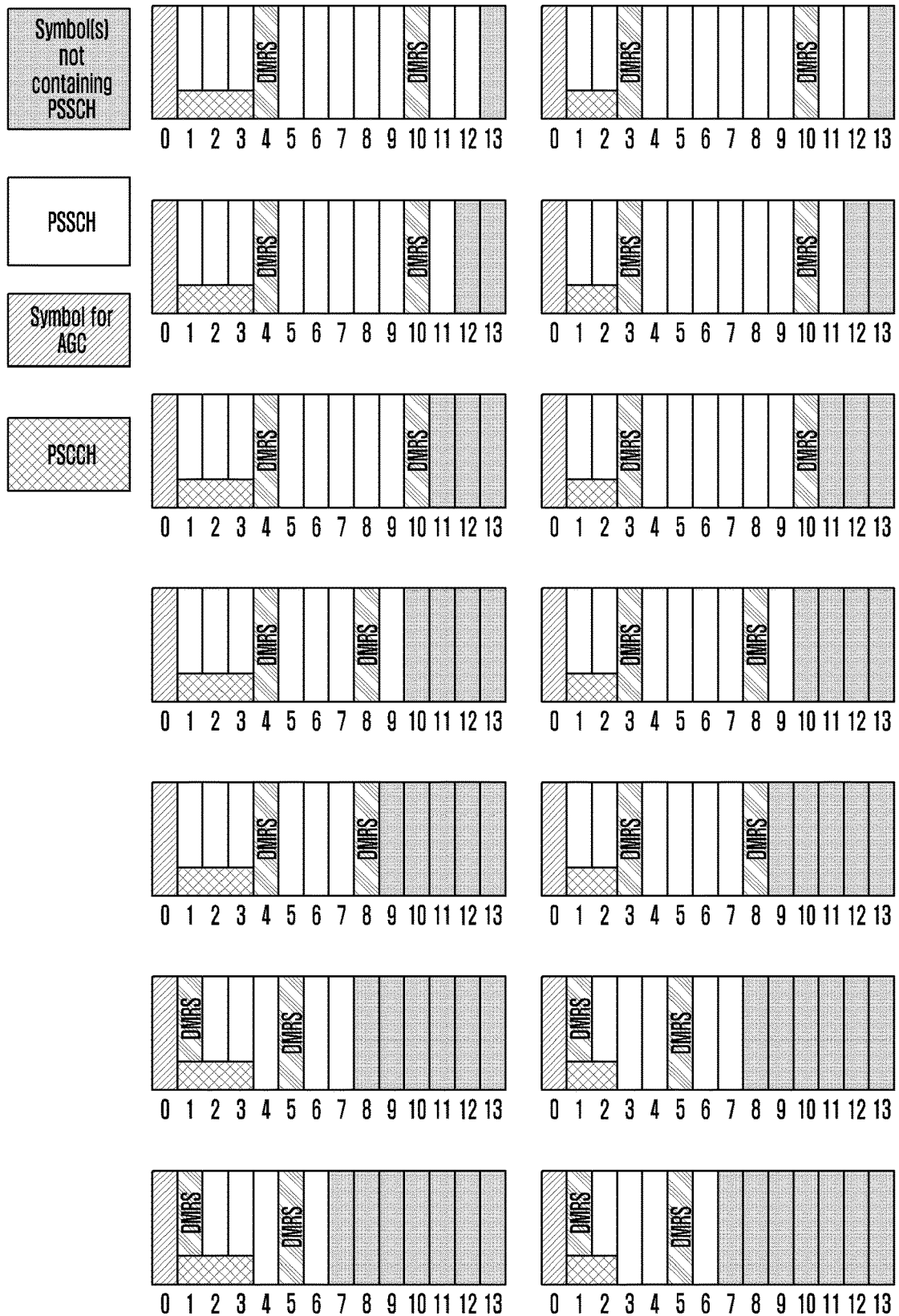
FIG. 16 is a diagram illustrating a method of determining DMRS time resources according to an embodiment of the disclosure.

FIG. 16 is a diagram illustrating a method of determining DMRS time resources according to an embodiment of the disclosure.

Referring to FIG. 16A, according to an embodiment of the disclosure, at least one of the patterns of FIGS. 14B to 14E and 15A to 15D may be combined with each other to be supported in the sidelink. For example, the DMRS pattern including one symbol DMRS in the sidelink may use the pattern of FIG. 14B. This is because the pattern of FIG. 15A does not include the DMRS in some frequency domains, so data decoding performance may deteriorate. In addition, for example, a DMRS pattern including two symbol DMRSs in the sidelink may be used in combination with FIGS. 14C and 15B, and in the pattern shown in FIG. 14C, only one DMRS symbol is supported in a short-length PSSCH. The pattern according to this embodiment may be as shown in FIG. 16. In addition to the patterns of FIG. 16, for example, a DMRS pattern including 3 symbol DMRSs in the sidelink may use FIG. 15C, and a DMRS pattern including 4 symbol DMRSs in the sidelink may use FIG. 15D.

According to examples provided in this embodiment of the disclosure, in FIGS. 14B, 14C, 14D, 14E, 15A, 15B, 15C, 15E, and 16, some or a combination of some of the patterns provided according to the length of the PSSCH and the length of the PSCCH may be used.

Other possible positions may be applied according to subcarrier spacing as the position of the symbol in which the DMRS is transmitted described in this embodiment. In the examples of FIGS. 14B, 14C, 14D, 14E, 15A, 15B, 15C, 15E, and 16 provided in this embodiment of the disclosure, some or a combinations of some of the patterns provided according to the length of the PSSCH and the length of the PSCCH may be used differently according to the subcarrier spacings.

The position of the symbol in which the DMRS is transmitted described in this embodiment may be applied by combining patterns of different positions according to the assigned length of the PSSCH. In the above, the assigned length of the PSSCH may be the number of symbols used for PSSCH transmission including DMRS excluding AGC symbols.

In addition, in the method provided in this embodiment of the disclosure, a PSSCH may be mapped to a DMRS symbol according to availability of available resources.

In addition, in the method provided in this embodiment of the disclosure, a part of control information may be mapped to the DMRS symbol according to the availability of available resources or resources of the PSSCH.

The DMRS pattern provided in this embodiment may be a physically absolute symbol position within a slot, but may be a relative symbol position according to an applied embodiment. For example, the position of the DMRS symbol may be changed according to the positions of symbols used for the sidelink within the slot. For example when p is the index of the first symbol of the PSCCH, the position of the DMRS symbol provided in this embodiment may be given as a relative offset value from p. As an example, when the first three symbols in a slot are used for downlink, an embodiment in which a part of FIG. 16 is applied may be implemented as in the pattern of FIG. 10D.

Figure 17:
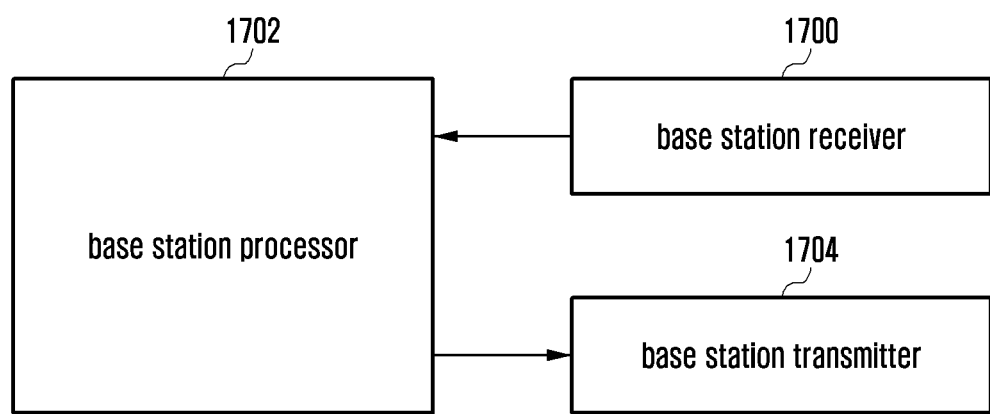
FIG. 17 is a diagram illustrating a structure of a terminal according to an embodiment of the disclosure.
Figure 18:
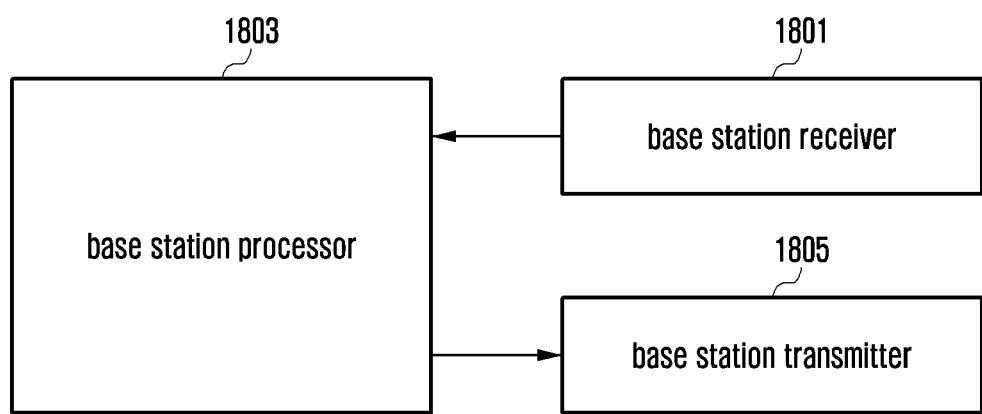
FIG. 18 is a diagram illustrating a structure of a base station according to an embodiment of the disclosure.

Transmitters, receivers, and processors of the terminal and the base station to carry out the above embodiments are shown in FIGS. 17 and 18, respectively. In order to perform sidelink-related operations proposed through the first to third embodiments of the disclosure, the receivers, the processors, and the transmitters of the base station and the terminal must operate according to the respective embodiments.

FIG. 17 is a block diagram illustrating an internal structure of a terminal according to an embodiment of the disclosure.

Referring to FIG. 17, the terminal of the disclosure may include a terminal receiver 1700, a terminal transmitter 1704, and a terminal processor 1702. The terminal receiver 1700 and the terminal transmitter 1704 may be collectively referred to as a transceiver in an embodiment. The transceiver may transmit and receive signals with the base station. The signal may include control information and data. To this end, the transceiver may include an RF transmitter that up-converts and amplifies a frequency of a transmitted signal, and an RF receiver that amplifies a received signal with low noise and down-converts a frequency. In addition, the transceiver may receive a signal through a wireless channel, output the same to the terminal processor 1702, and transmit a signal output from the terminal processor 1702 through the wireless channel. The terminal processor 1702 may control a series of processes so that the terminal can operate according to the embodiment described above.

FIG. 18 is a block diagram illustrating an internal structure of a base station according to an embodiment of the disclosure.

Referring to FIG. 18, the base station may include a base station receiver 1801, a base station transmitter 1805, and a base station processor 1803. The base station receiver 1801 and the base station transmitter 1805 may be collectively referred to as a transceiver in an embodiment. The transceiver may transmit and receive signals with the terminal. The signal may include control information and data. To this end, the transceiver may include an RF transmitter that up-converts and amplifies a frequency of a transmitted signal, and an RF receiver that amplifies a received signal with low noise and down-converts a frequency. In addition, the transceiver may receive a signal through a wireless channel, output it to the base station processing unit 1803, and transmit the signal output from the base station processor 1803 through the wireless channel. The base station processor 1803 may control a series of processes so that the base station can operate according to the above-described embodiment.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first terminal in a wireless communication system, the method comprising:
   identifying a number of symbols for physical sidelink shared channel (PSSCH) transmission and a number of symbols for PSSCH demodulation reference signal (DMRS);
   transmitting, to a second terminal, sidelink control information (SCI) for scheduling the PSSCH transmission, the SCI including DMRS pattern information identified based on the number of symbols for the PSSCH DMRS; and
   transmitting, to the second terminal, at least one PSSCH DMRS at a position identified based on the SCI,
   wherein at least one symbol index of the position at which the at least one PSSCH DMRS is transmitted is identified based on the number of symbols for the PSSCH transmission, a number of symbols for a physical sidelink control channel (PSCCH) through which the SCI is transmitted, and the number of symbols for the PSSCH DMRS.

2. The method of claim 1,
   wherein the at least one symbol index of the position at which the at least one PSSCH DMRS is transmitted is identified by one of a plurality of index groups included in a first index group for the number of symbols of the PSSCH DMRS being 2, a second index group for the number of symbols of the PSSCH DMRS being 3, and a third index group for the number of symbols of the PSSCH DMRS being 4, and
   wherein the first index group includes {1, 5}, {3, 8}, {3, 10}, {4, 8}, and {4, 10}, the second index group includes {1, 4, 7}, {1, 5, 9}, and {1, 6, 11}, and the third index group includes {1, 4, 7, 10}.

3. The method of claim 1,
   wherein, in case that the number of symbols for the PSSCH DMRS is 2, the number of symbols for the PSSCH transmission is 7 or 8, and the number of symbols for the PSCCH is 2 or 3, symbol indexes of the position at which the at least one PSSCH DMRS is transmitted are {1, 5},
   wherein, in case that the number of symbols for the PSSCH DMRS is 2, the number of symbols for the PSSCH transmission is 9 or 10, and the number of symbols for the PSCCH is 2, the symbol indexes of the position at which the at least one PSSCH DMRS is transmitted are {3, 8},
   wherein, in case that the number of symbols for the PSSCH DMRS is 2, the number of symbols for the PSSCH transmission is 9 or 10, and the number of symbols for the PSCCH is 3, the symbol indexes of the position at which the at least one PSSCH DMRS is transmitted are {4, 8},
   wherein, in case that the number of symbols for the PSSCH DMRS is 2, the number of symbols for the PSSCH transmission is 11, 12 or 13, and the number of symbols for the PSCCH is 2, the symbol indexes of the position at which the at least one PSSCH DMRS is transmitted are {3, 10}, and wherein, in case that the number of symbols for the PSSCH DMRS is 2, the number of symbols for the PSSCH transmission is 11, 12, or 13, and the number of symbols for the PSCCH is 3, the symbol indexes of the position at which the at least one PSSCH DMRS is transmitted are {4, 10}.

4. The method of claim 1, wherein, in case that the number of symbols for the PSSCH DMRS is 3, the number of symbols for the PSSCH transmission is 9 or 10, and the number of symbols for the PSCCH is 2 or 3, symbol indexes of the position at which the at least one PSSCH DMRS is transmitted are {1, 4, 7}, wherein, in case that the number of symbols for the PSSCH DMRS is 3, the number of symbols for the PSSCH transmission is 11 or 12, and the number of symbols for the PSCCH is 2 or 3, the symbol indexes of the position at which the at least one PSSCH DMRS is transmitted are {1, 5, 9}, and wherein, in case that the number of symbols for the PSSCH DMRS is 3, the number of symbols for the PSSCH transmission is 13, and the number of symbols for the PSCCH is 2 or 3, the symbol indexes of the position at which the at least one PSSCH DMRS is transmitted are {1, 6, 11}.

5. The method of claim 1, wherein, in case that the number of symbols for the PSSCH DMRS is 4, the number of symbols for the PSSCH transmission is 11, 12, or 13, and the number of symbols for the PSCCH is 2 or 3, symbol indexes of the position at which the at least one PSSCH DMRS is transmitted are {1, 4, 7, 10}.

6. A method performed by a second terminal in a wireless communication system, the method comprising:

receiving, from a first terminal, sidelink control information (SCI) for scheduling a physical sidelink shared channel (PSSCH) transmission, the SCI including demodulation reference signal (DMRS) pattern information identified based on a number of symbols for a PSSCH DMRS;

identifying a number of symbols for the PSSCH transmission and the number of symbols for the PSSCH DMRS, based on the SCI; and receiving, from the first terminal, at least one PSSCH DMRS at a position identified based on the SCI, wherein at least one symbol index of the position at which the at least one PSSCH DMRS is received is identified based on the number of symbols for the PSSCH transmission, a number of symbols for a physical sidelink control channel (PSCCH) through which the SCI is transmitted, and the number of symbols for the PSSCH DMRS.

7. The method of claim 6, wherein the at least one symbol index of the position at which the at least one PSSCH DMRS is received is identified by one of a plurality of index groups included in a first index group for the number of symbols of the PSSCH DMRS being 2, a second index group for the number of symbols of the PSSCH DMRS being 3, and a third index group for the number of symbols of the PSSCH DMRS being 4, and wherein the first index group includes {1, 5}, {3, 8}, {3, 10}, {4, 8}, and {4, 10}, the second index group includes {1, 4, 7}, {1, 5, 9}, and {1, 6, 11}, and the third index group includes {1, 4, 7, 10}.

8. The method of claim 6, wherein, in case that the number of symbols for the PSSCH DMRS is 2, the number of symbols for the PSSCH transmission is 7 or 8, and the number of symbols for the PSCCH is 2 or 3, symbol indexes of the position at which the at least one PSSCH DMRS is received are {1, 5}, wherein, in case that the number of symbols for the PSSCH DMRS is 2, the number of symbols for the PSSCH transmission is 9 or 10, and the number of symbols for PSCCH is 2, the symbol indexes of the position at which the at least one PSSCH DMRS is received are {3, 8}, wherein, in case that the number of symbols for the PSSCH DMRS is 2, the number of symbols for the PSSCH transmission is 9 or 10, and the number of symbols for the PSCCH is 3, the symbol indexes of the position at which the at least one PSSCH DMRS is received are {4, 8}, wherein, in case that the number of symbols for the PSSCH DMRS is 2, the number of symbols for the PSSCH transmission is 11, 12 or 13, and the number of symbols for the PSCCH is 2, the symbol indexes of the position at which the at least one PSSCH DMRS is received are {3, 10}, and wherein, in case that the number of symbols for the PSSCH DMRS is 2, the number of symbols for the PSSCH transmission is 11, 12, or 13, and the number of symbols for the PSCCH is 3, the symbol indexes of the position at which the at least one PSSCH DMRS is received are {4, 10}.

9. The method of claim 6, wherein, in case that the number of symbols for the PSSCH DMRS is 3, the number of symbols for the PSSCH transmission is 9 or 10, and the number of symbols for the PSCCH is 2 or 3, symbol indexes of the position at which the at least one PSSCH DMRS is received are {1, 4, 7}, wherein, in case that the number of symbols for the PSSCH DMRS is 3, the number of symbols for the PSSCH transmission is 11 or 12, and the number of symbols for the PSCCH is 2 or 3, the symbol indexes of the position at which the at least one PSSCH DMRS is received are {1, 5, 9}, and wherein, in case that the number of symbols for the PSSCH DMRS is 3, the number of symbols for the PSSCH transmission is 13, and the number of symbols for the PSCCH is 2 or 3, the symbol indexes of the position at which the at least one PSSCH DMRS is received are {1, 6, 11}.

10. The method of claim 6, wherein, in case that the number of symbols for the PSSCH DMRS is 4, the number of symbols for the PSSCH transmission is 11, 12, or 13, and the number of symbols for the PSCCH is 2 or 3, symbol indexes of the position at which the at least one PSSCH DMRS is received are {1, 4, 7, 10}.

11. A first terminal in a wireless communication system, the first terminal comprising:

a transceiver; and at least one processor coupled to the transceiver and configured to:

identify a number of symbols for physical sidelink shared channel (PSSCH) transmission and a number of symbols for PSSCH demodulation reference signal (DMRS),
transmit, to a second terminal, sidelink control information (SCI) for scheduling the PSSCH transmission, the SCI including DMRS pattern information identified based on the number of symbols for the PSSCH DMRS, and
transmit, to the second terminal, at least one PSSCH DMRS at a position identified based on the SCI,
wherein at least one symbol index of the position at which the at least one PSSCH DMRS is transmitted is identified based on the number of symbols for the PSSCH transmission, a number of symbols for a physical sidelink control channel (PSCCH) through which the SCI is transmitted, and the number of symbols for the PSSCH DMRS.

12. The first terminal of claim 11,
wherein the at least one symbol index of the position at which the at least one PSSCH DMRS is transmitted is identified by one of a plurality of index groups included in a first index group for the number of symbols of the PSSCH DMRS being 2, a second index group for the number of symbols of the PSSCH DMRS being 3, and a third index group for the number of symbols of the PSSCH DMRS being 4, and
wherein the first index group includes {1, 5}, {3, 8}, {3, 10}, {4, 8}, and {4, 10}, the second index group includes {1, 4, 7}, {1, 5, 9}, and {1, 6, 11}, and the third index group includes {1, 4, 7, 10}.

13. The first terminal of claim 11,
wherein, in case that the number of symbols for the PSSCH DMRS is 2, the number of symbols for the PSSCH transmission is 7 or 8, and the number of symbols for the PSCCH is 2 or 3, symbol indexes of the position at which the at least one PSSCH DMRS is transmitted are {1, 5},
wherein, in case that the number of symbols for the PSSCH DMRS is 2, the number of symbols for the PSSCH transmission is 9 or 10, and the number of symbols for the PSCCH is 2, the symbol indexes of the position at which the at least one PSSCH DMRS is transmitted are {3, 8},
wherein, in case that the number of symbols for the PSSCH DMRS is 2, the number of symbols for the PSSCH transmission is 9 or 10, and the number of symbols for the PSCCH is 3, the symbol indexes of the position at which the at least one PSSCH DMRS is transmitted are {4, 8},
wherein, in case that the number of symbols for the PSSCH DMRS is 2, the number of symbols for the PSSCH transmission is 11, 12 or 13, and the number of symbols for the PSCCH is 2, the symbol indexes of the position at which the at least one PSSCH DMRS is transmitted are {3, 10}, and
wherein, in case that the number of symbols for the PSSCH DMRS is 2, the number of symbols for the PSSCH transmission is 11, 12, or 13, and the number of symbols for the PSCCH is 3, the symbol indexes of the position at which the at least one PSSCH DMRS is transmitted are {4, 10}.

14. The first terminal of claim 11,
wherein, in case that the number of symbols for the PSSCH DMRS is 3, the number of symbols for the PSSCH transmission is 9 or 10, and the number of symbols for the PSCCH is 2 or 3, symbol indexes of the position at which the at least one PSSCH DMRS is transmitted are {1, 4, 7},
wherein, in case that the number of symbols for the PSSCH DMRS is 3, the number of symbols for the PSSCH transmission is 11 or 12, and the number of symbols for the PSCCH is 2 or 3, the symbol indexes of the position at which the at least one PSSCH DMRS is transmitted are {1, 5, 9}, and
wherein, in case that the number of symbols for the PSSCH DMRS is 3, the number of symbols for the PSSCH transmission is 13, and the number of symbols for the PSCCH is 2 or 3, the symbol indexes of the position at which the at least one PSSCH DMRS is transmitted are {1, 6, 11}.

15. The first terminal of claim 11,
wherein, in case that the number of symbols for the PSSCH DMRS is 4, the number of symbols for the PSSCH transmission is 11, 12, or 13, and the number of symbols for the PSCCH is 2 or 3, symbol indexes of the position at which the at least one PSSCH DMRS is transmitted are {1, 4, 7, 10}.

16. A second terminal in a wireless communication system, the second terminal comprising:
a transceiver; and
at least one processor coupled to the transceiver and configured to:
receive, from a first terminal, sidelink control information (SCI) for scheduling a physical sidelink shared channel (PSSCH) transmission, the SCI including demodulation reference signal (DMRS) pattern information identified based on a number of symbols for a PSSCH DMRS,
identify a number of symbols for the PSSCH transmission and the number of symbols for the PSSCH DMRS, based on the SCI, and
receive, from the first terminal, at least one PSSCH DMRS at a position identified based on the SCI,
wherein at least one symbol index of the position at which the at least one PSSCH DMRS is received is identified based on the number of symbols for the PSSCH transmission, a number of symbols for a physical sidelink control channel (PSCCH) through which the SCI is transmitted, and the number of symbols for the PSSCH DMRS.

17. The second terminal of claim 16,
wherein the at least one symbol index of the position at which the at least one PSSCH DMRS is received is identified by one of a plurality of index groups included in a first index group for the number of symbols of the PSSCH DMRS being 2, a second index group for the number of symbols of the PSSCH DMRS being 3, and a third index group for the number of symbols of the PSSCH DMRS being 4, and
wherein the first index group includes {1, 5}, {3, 8}, {3, 10}, {4, 8}, and {4, 10}, the second index group includes {1, 4, 7}, {1, 5, 9}, and {1, 6, 11}, and the third index group includes {1, 4, 7, 10}.

18. The second terminal of claim 16,
wherein, in case that the number of symbols for the PSSCH DMRS is 3, the number of symbols for the PSSCH transmission is 9 or 10, and the number of symbols for the PSCCH is 2 or 3, symbol indexes of the position at which the at least one PSSCH DMRS is received are {1, 4, 7},
wherein, in case that the number of symbols for the PSSCH DMRS is 3, the number of symbols for the PSSCH transmission is 11 or 12, and the number of symbols for the PSCCH is 2 or 3, the symbol indexes of the position at which the at least one PSSCH DMRS is received are {1, 5, 9}, and wherein, in case that the number of symbols for the PSSCH DMRS is 3, the number of symbols for the PSSCH transmission is 13, and the number of symbols for the PSCCH is 2 or 3, the symbol indexes of the position at which the at least one PSSCH DMRS is received are {1, 6, 11}.

19. The second terminal of claim 16, wherein, in case that the number of symbols for the PSSCH DMRS is 4, the number of symbols for the PSSCH transmission is 11, 12, or 13, and the number of symbols for the PSCCH is 2 or 3, symbol indexes of the position at which the at least one PSSCH DMRS is received are {1, 4, 7, 10}.

20. The second terminal of claim 16, wherein, in case that the number of symbols for the PSSCH DMRS is 2, the number of symbols for the PSSCH transmission is 7 or 8, and the number of symbols for the PSCCH is 2 or 3, symbol indexes of the position at which the at least one PSSCH DMRS is received are {1, 5}.

21. The second terminal of claim 16, wherein, in case that the number of symbols for the PSSCH DMRS is 2, the number of symbols for the PSSCH transmission is 9 or 10, and the number of symbols for the PSCCH is 2, the symbol indexes of the position at which the at least one PSSCH DMRS is received are {3, 8}, wherein, in case that the number of symbols for the PSSCH DMRS is 2, the number of symbols for the PSSCH transmission is 9 or 10, and the number of symbols for the PSCCH is 3, the symbol indexes of the position at which the at least one PSSCH DMRS is received are {4, 8}, wherein, in case that the number of symbols for the PSSCH DMRS is 2, the number of symbols for the PSSCH transmission is 11, 12 or 13, and the number of symbols for the PSCCH is 2, the symbol indexes of the position at which the at least one PSSCH DMRS is received are {3, 10}, and wherein, in case that the number of symbols for the PSSCH DMRS is 2, the number of symbols for the PSSCH transmission is 11, 12, or 13, and the number of symbols for the PSCCH is 3, the symbol indexes of the position at which the at least one PSSCH DMRS is received are {4, 10}.

\* \* \* \* \*